United States Patent
Kang et al.

(10) Patent No.: US 11,864,192 B2
(45) Date of Patent: Jan. 2, 2024

(54) METHOD FOR TRANSMITTING AND RECEIVING PLURALITY OF PHYSICAL DOWNLINK SHARED CHANNELS IN WIRELESS COMMUNICATION SYSTEM, AND DEVICE FOR SAME

(71) Applicant: LG ELECTRONICS INC., Seoul (KR)

(72) Inventors: Jiwon Kang, Seoul (KR); Hyungtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 403 days.

(21) Appl. No.: 17/282,819

(22) PCT Filed: Oct. 21, 2019

(86) PCT No.: PCT/KR2019/013845
§ 371 (c)(1),
(2) Date: Apr. 5, 2021

(87) PCT Pub. No.: WO2020/080917
PCT Pub. Date: Apr. 23, 2020

(65) Prior Publication Data
US 2021/0352705 A1    Nov. 11, 2021

(30) Foreign Application Priority Data
Oct. 19, 2018    (KR) .................. 10-2018-0125434

(51) Int. Cl.
*H04W 72/12* (2023.01)
*H04W 72/23* (2023.01)
(Continued)

(52) U.S. Cl.
CPC ....... *H04W 72/23* (2023.01); *H04W 72/0446* (2013.01); *H04W 72/1273* (2013.01); *H04W 72/54* (2023.01)

(58) Field of Classification Search
CPC . H04L 27/2602; H04L 1/0025; H04L 5/0044; H04L 5/0082; H04L 5/001;
(Continued)

(56) References Cited

U.S. PATENT DOCUMENTS

2018/0227886 A1    8/2018    Chou et al.
2020/0137751 A1*   4/2020    Nam .................... H04L 27/2602
2022/0132551 A1*   4/2022    Jiang .................... H04L 1/0025

OTHER PUBLICATIONS

Intel Corporation, "Remaining Issues on Beam Management," R1-1810751, 3GPP TSG RAN WG1 Meeting #94b, Chengdu, China, dated Oct. 8-12, 2018, 15 pages.
(Continued)

*Primary Examiner* — Vinncelas Louis
(74) *Attorney, Agent, or Firm* — Fish & Richardson P.C.

(57) ABSTRACT

The present specification provides a method for transmitting and receiving downlink data in a wireless communication system and a device for same. In particular, the method carried out by a terminal may comprise the steps of: receiving downlink control information for scheduling the downlink data in a first time unit and a second time unit; receiving information on mappings between layer groups and transmission configuration indication (TCI) states; receiving downlink data, which is related to a first layer group, in the first time unit on the basis of a first TCI state; receiving downlink data, which is related to a second layer group, in the first time unit on the basis of a second TCI state; and receiving downlink data, which is related to a third layer group, in the second time unit on the basis of a third TCI state.

17 Claims, 24 Drawing Sheets

(51) Int. Cl.
*H04W 72/0446* (2023.01)
*H04W 72/1273* (2023.01)
*H04W 72/54* (2023.01)

(58) Field of Classification Search
CPC ....... H04L 5/14; H04L 1/0027; H04L 5/0023; H04L 5/0048; H04L 5/0091; H04L 1/0026; H04W 72/23; H04W 72/0446; H04W 72/1273; H04W 72/54; H04B 7/0695
See application file for complete search history.

(56) References Cited

OTHER PUBLICATIONS

PCT International Search Report in International Appln. No. PCT/KR2019/013845, dated Feb. 6, 2020, 5 pages (with English translation).
Qualcomm Incorporated, "Beam management for NR," R1-1811633, 3GPP TSG-RAN WG1 Meeting #94bis, Chengdu, China, dated Oct. 8-12, 2018, 13 pages.
Samsung, "Remaining Issues on Beam Management," R1-1810839, 3GPP TSG RAN WG1 Meeting #94bis, Chengdu, China, dated Oct. 8-12, 2018, 6 pages.
Sony, "Remaining issues on Rel.15 beam management," R1-1810628, 3GPP TSG-RAN WG1 #94bis, Chengdu, China, dated Oct. 8-12, 2018, 5 pages.

* cited by examiner

[Fig. 1]
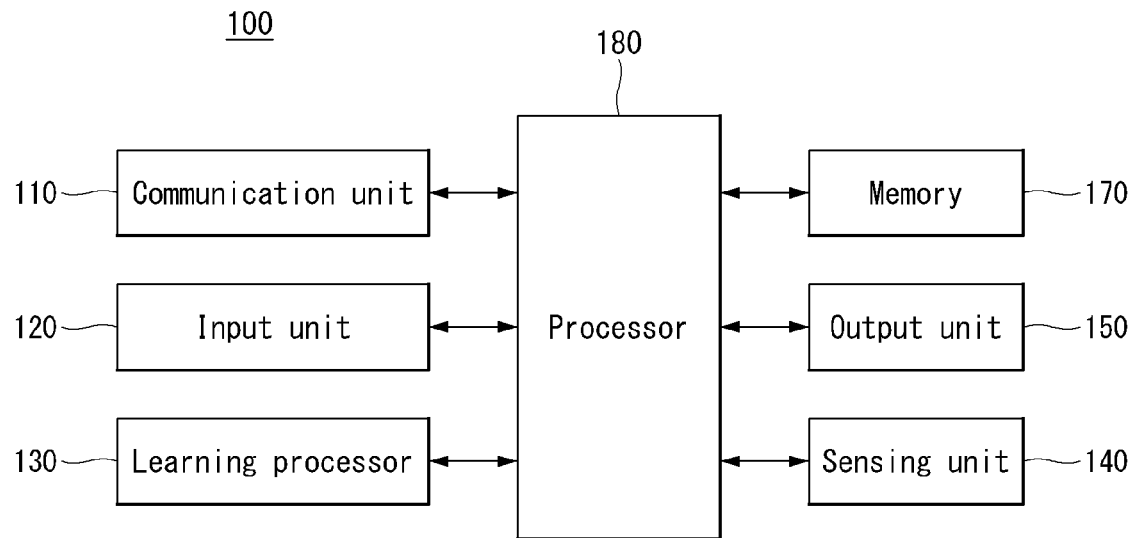
[Fig. 2]
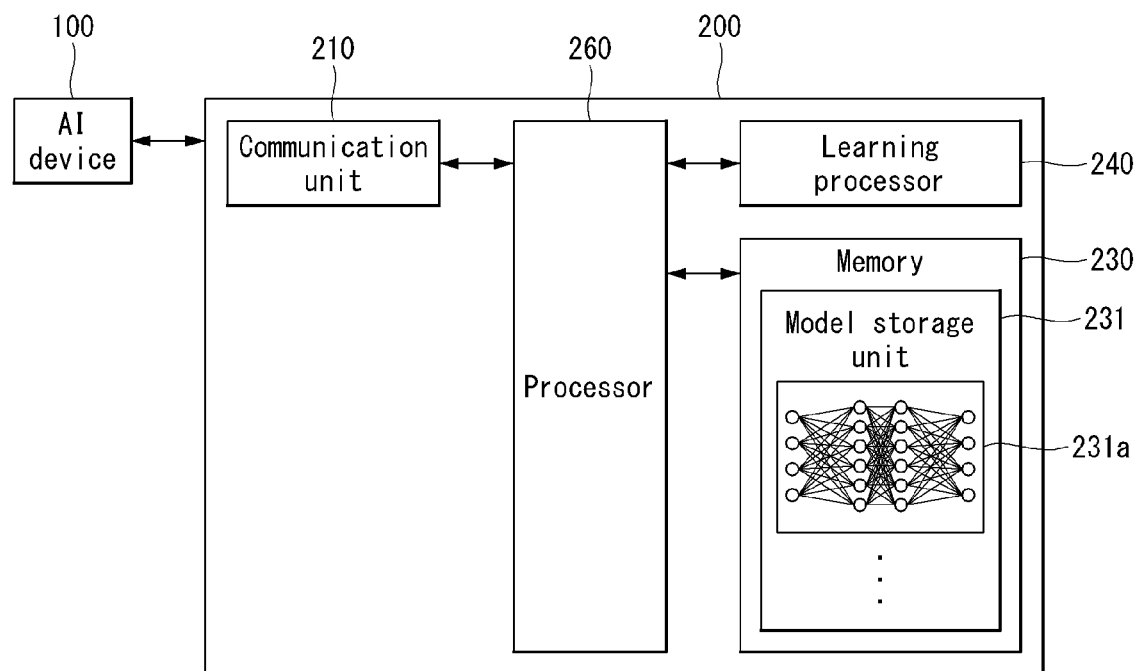

[Fig. 3]
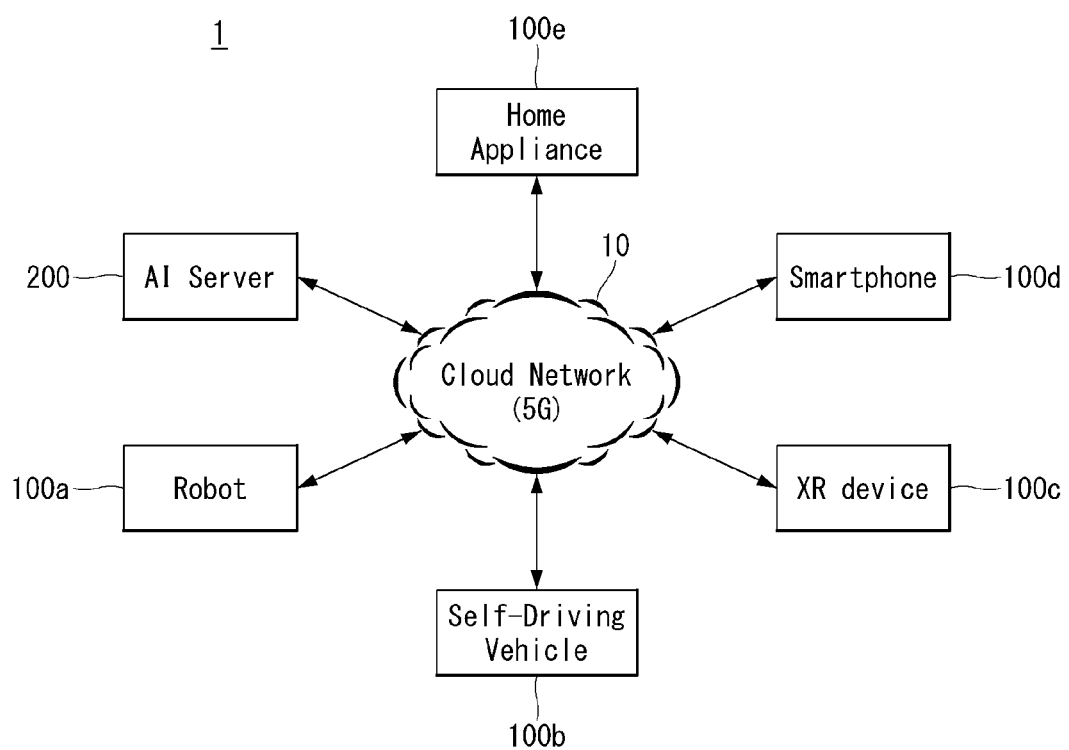

[Fig. 4]
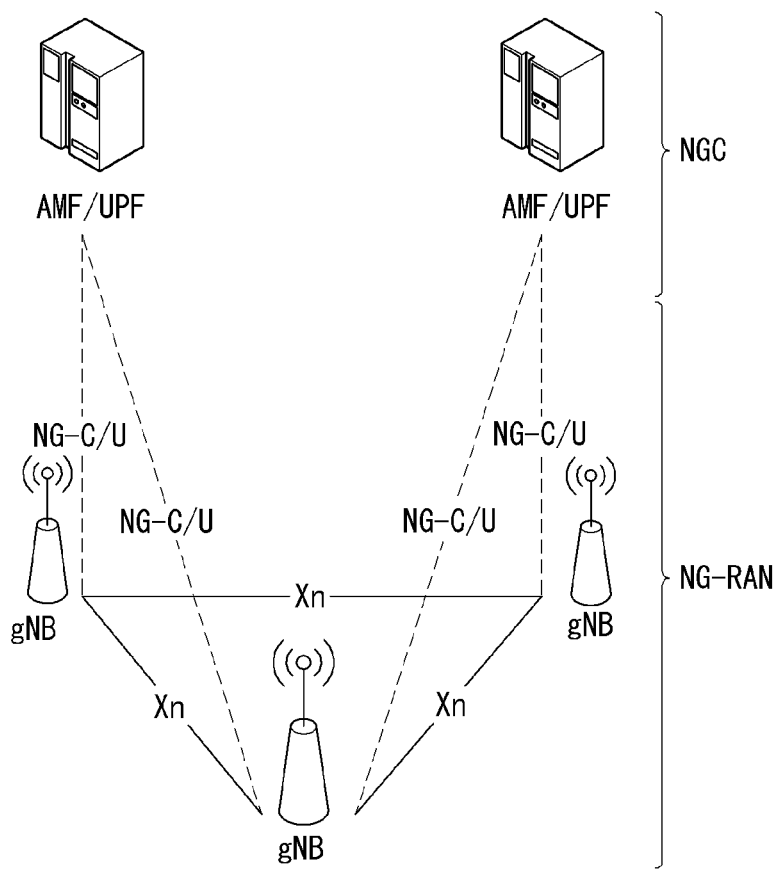
[Fig. 5]
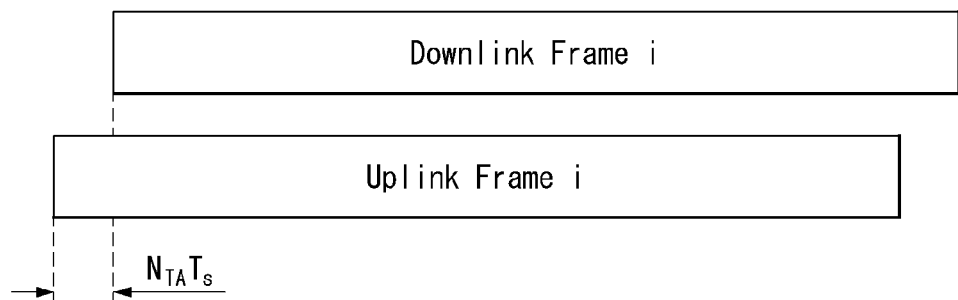

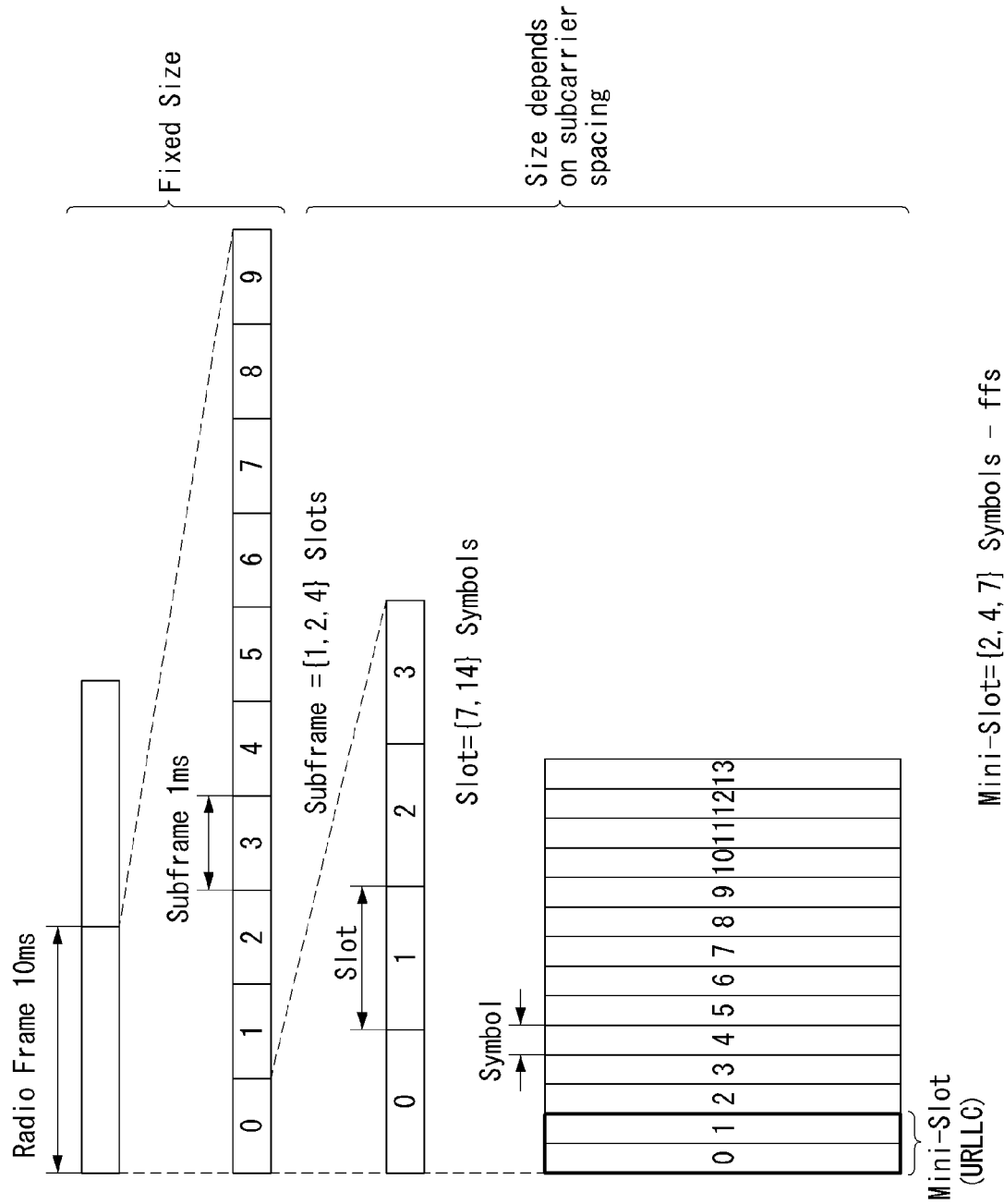
[Fig. 6]

[Fig. 7]
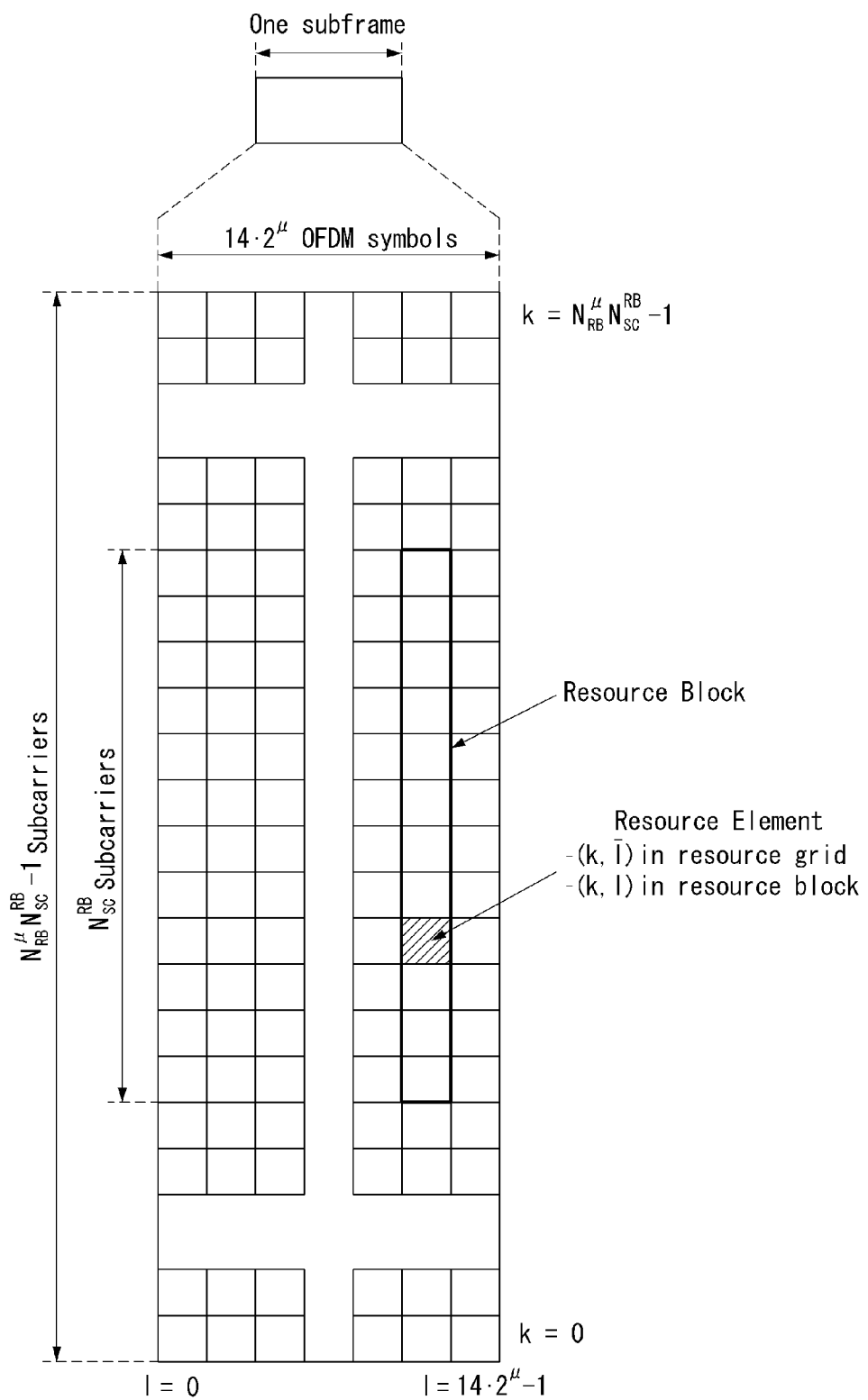

[Fig. 8]
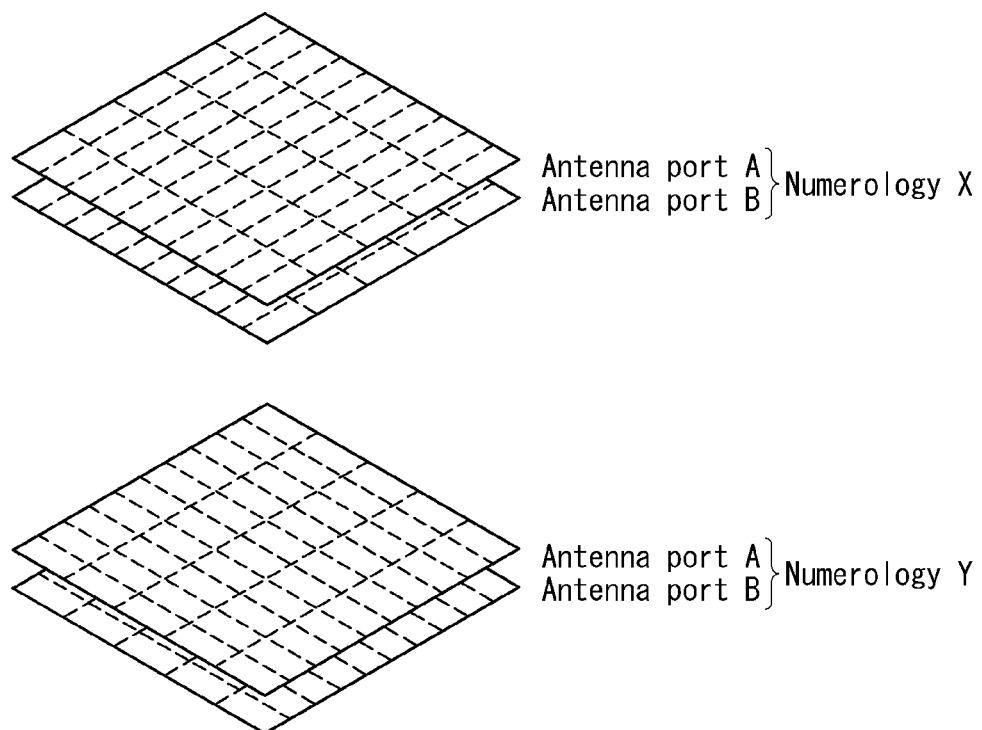

[Fig. 9]
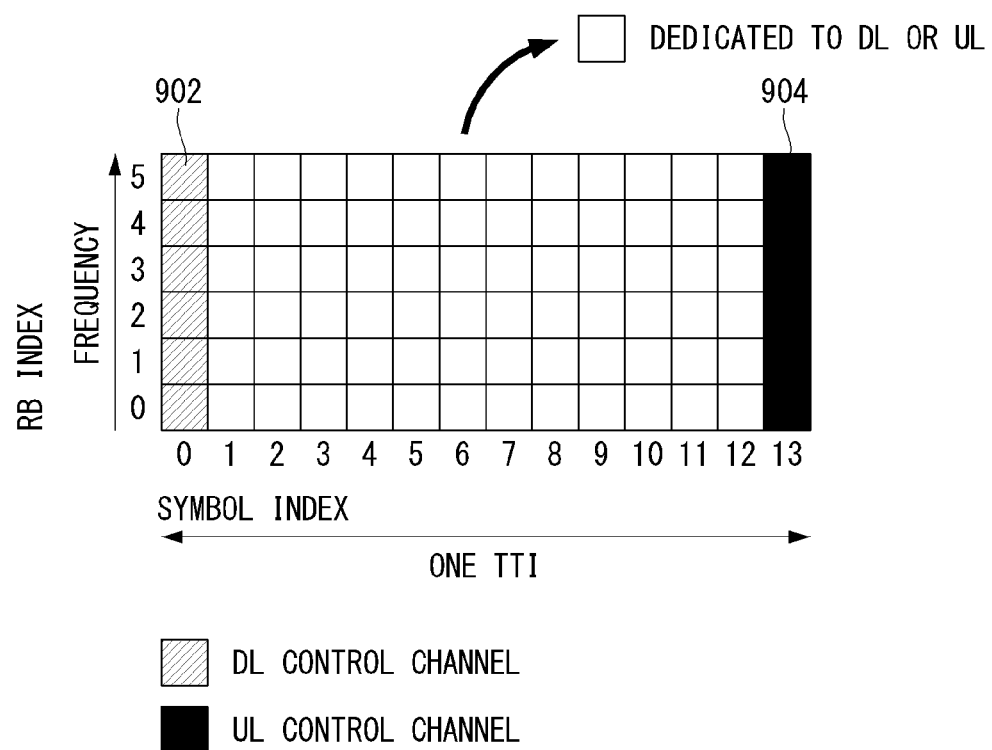

[Fig. 10]
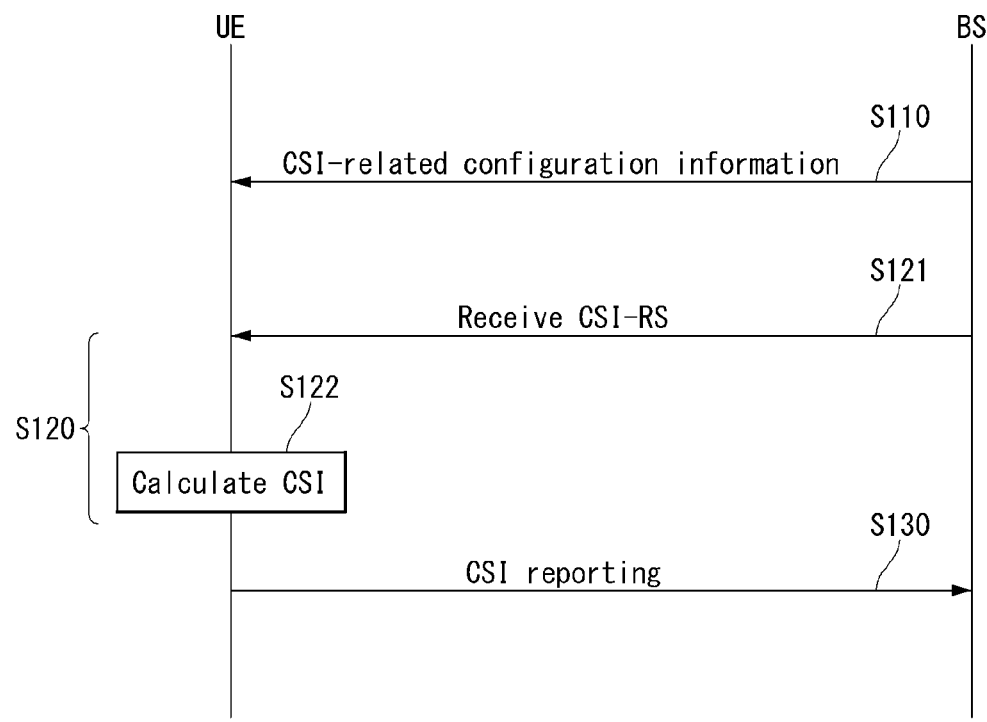

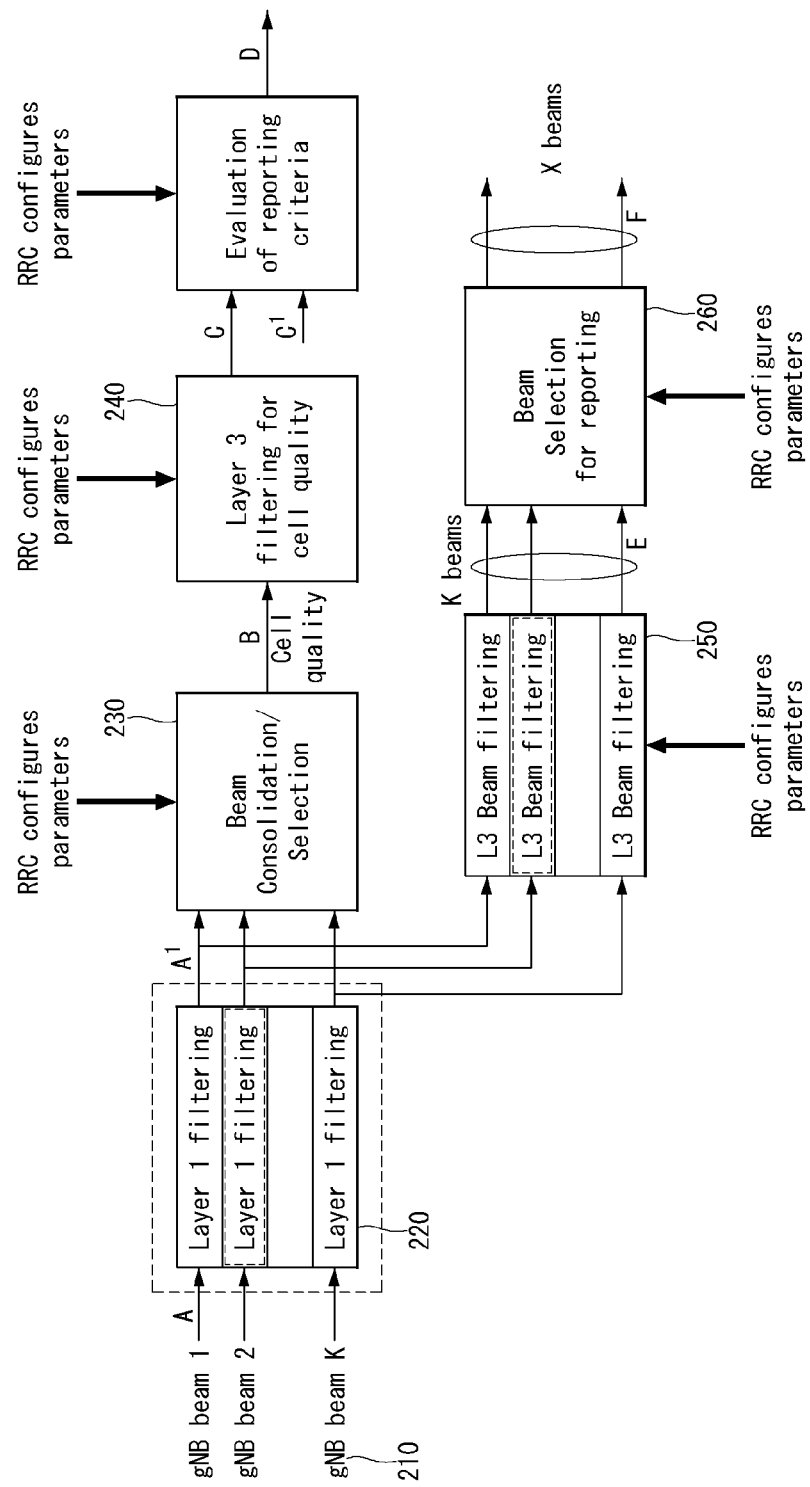

[Fig. 12]
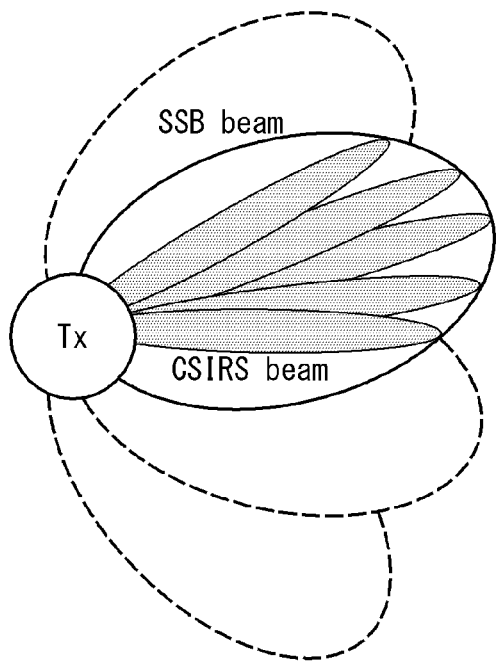
[Fig. 13]
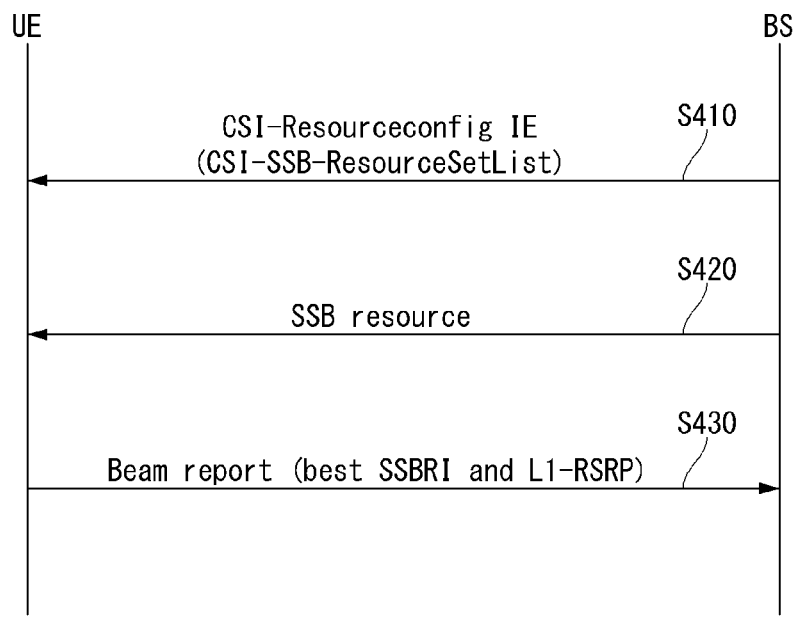

[Fig. 14]
(a) 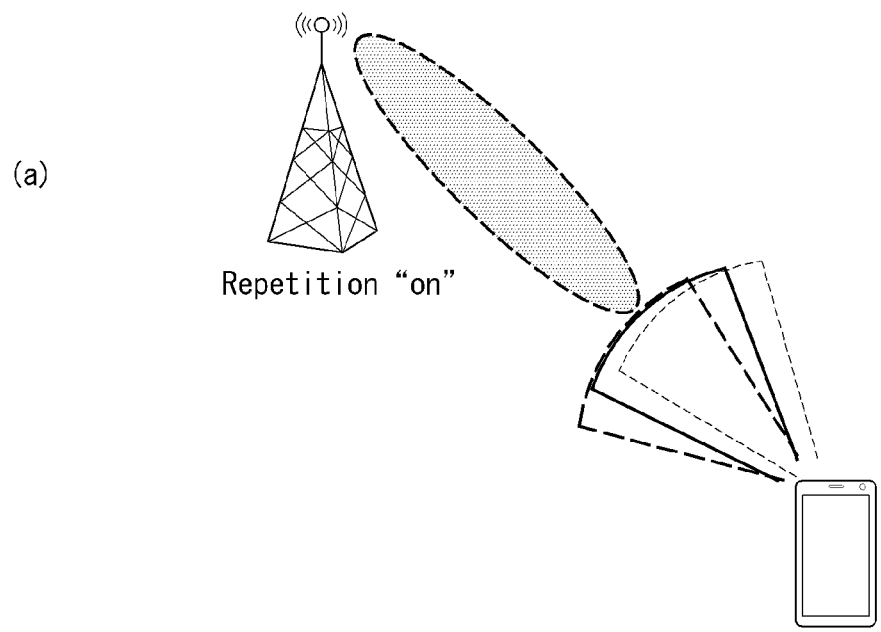
(b) 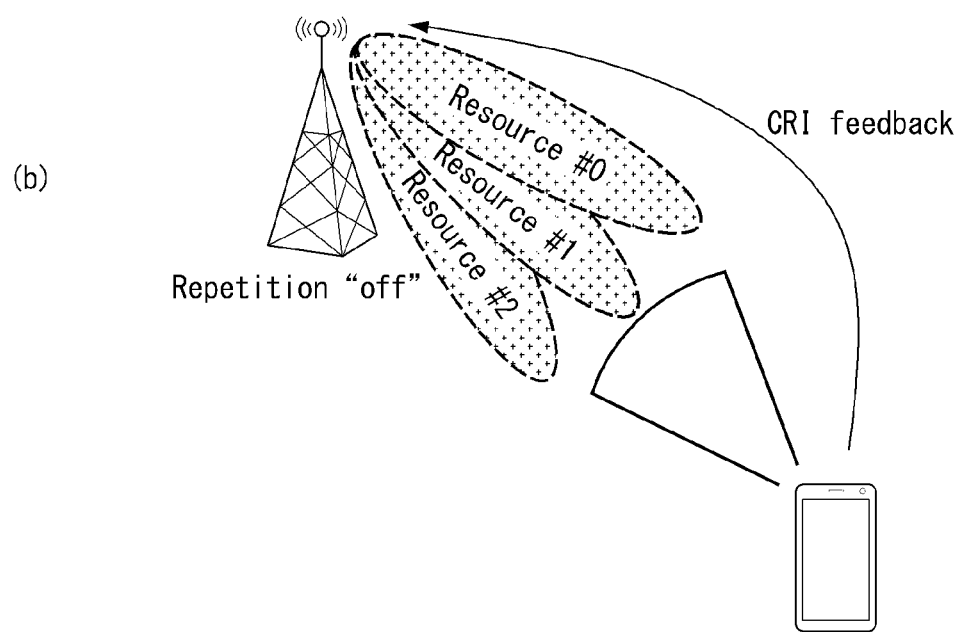

[Fig. 15]
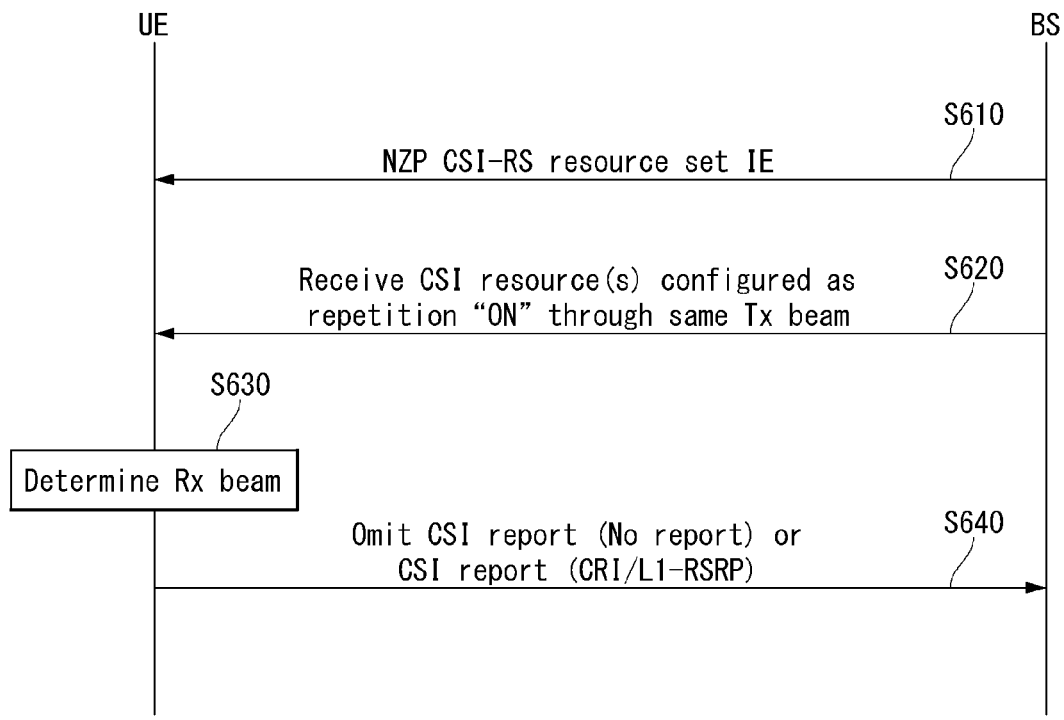

[Fig. 16]
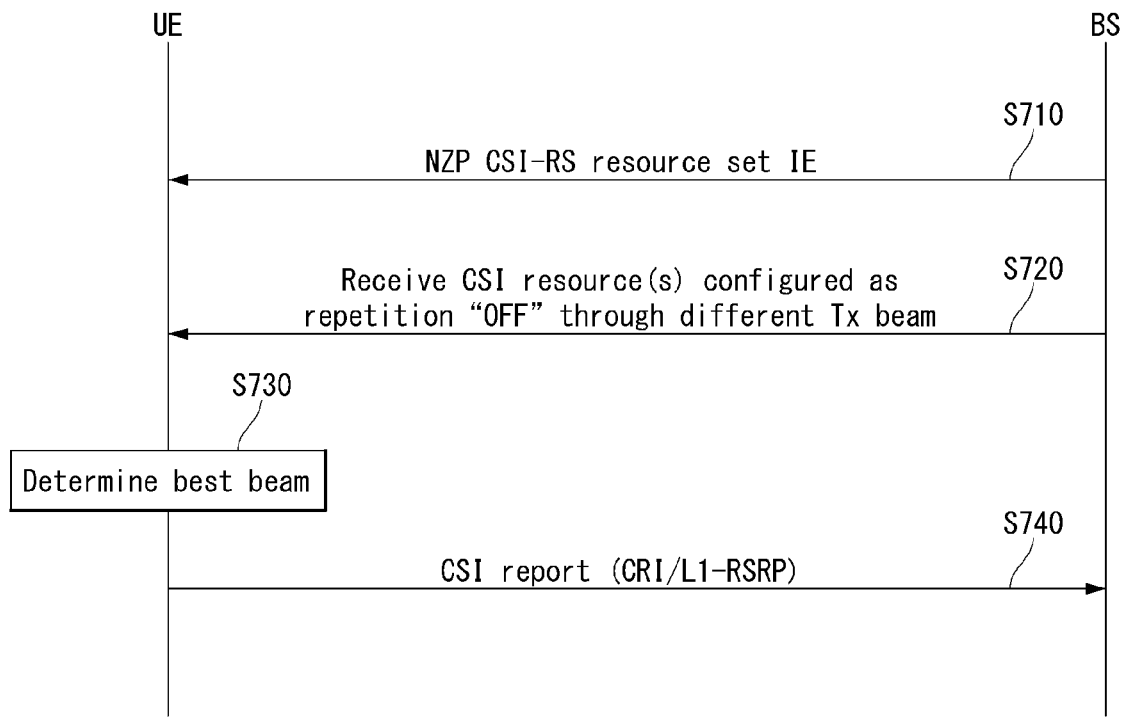
[Fig. 17]
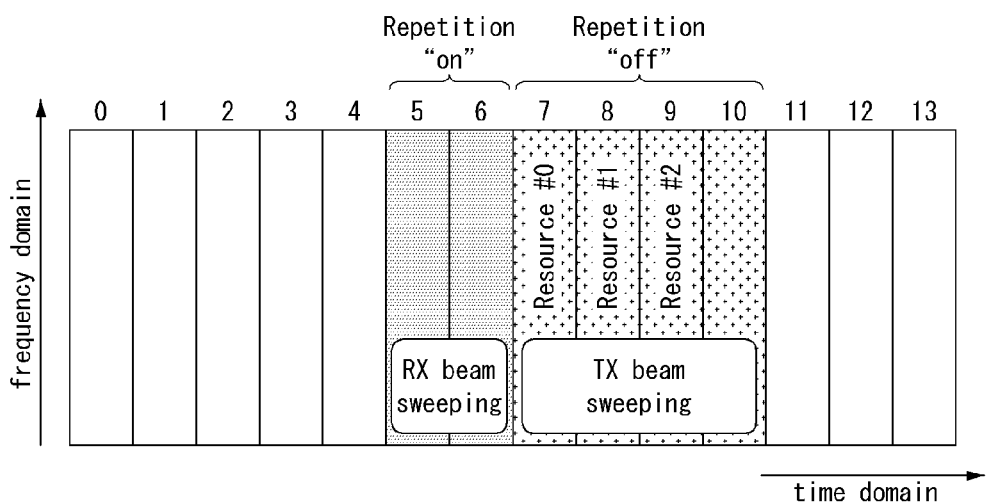

[Fig. 18]
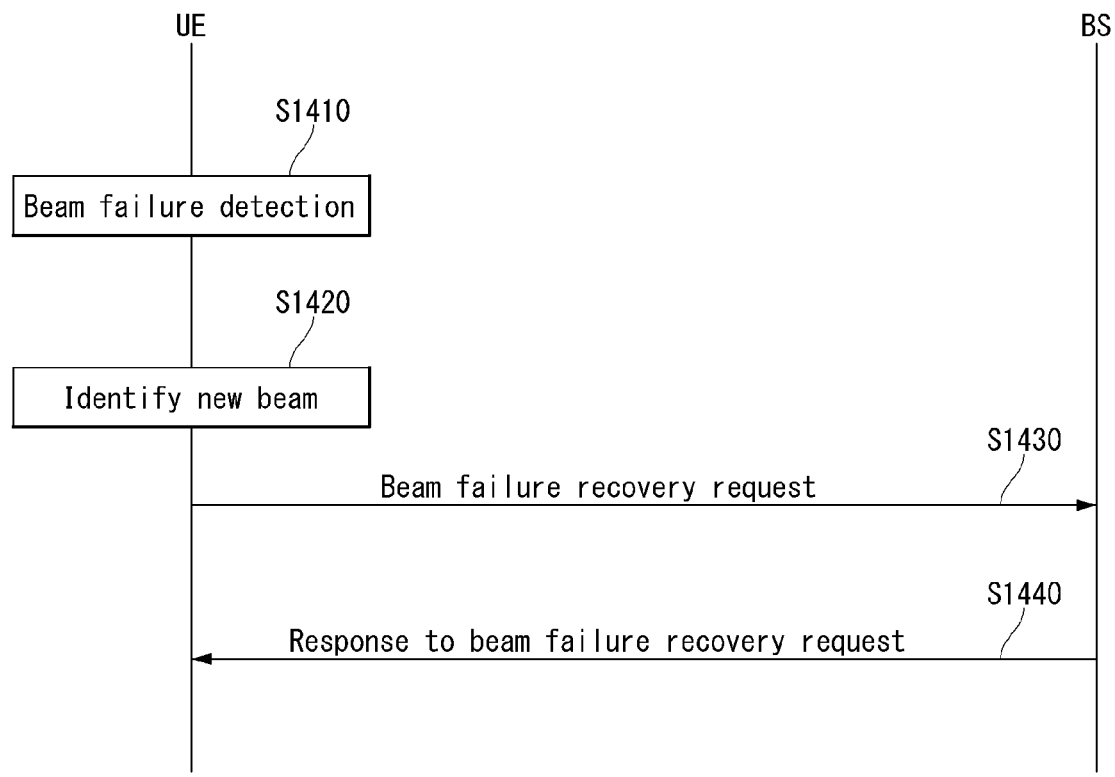

[Fig. 19]
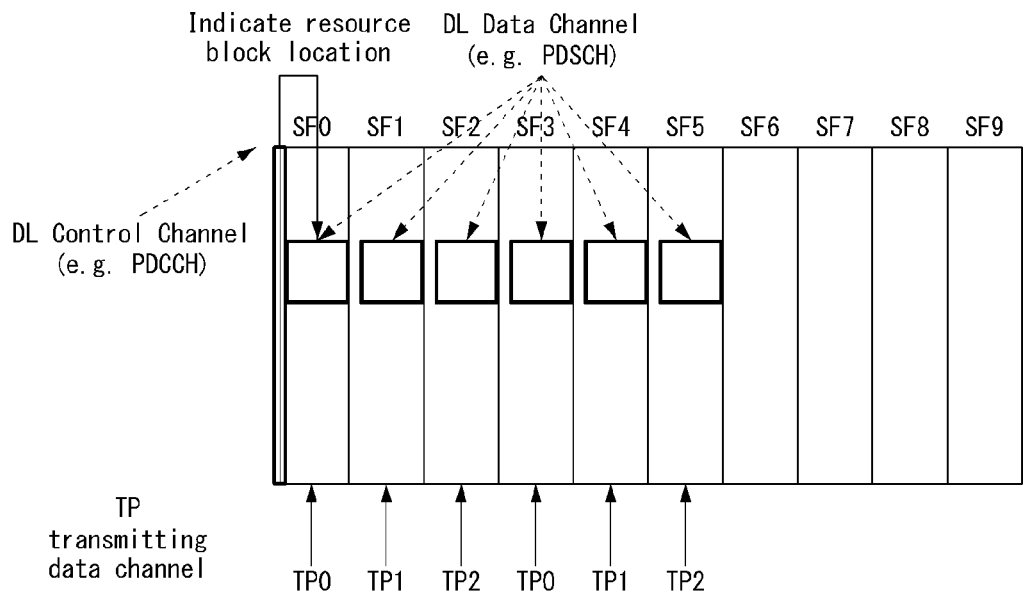
[Fig. 20]
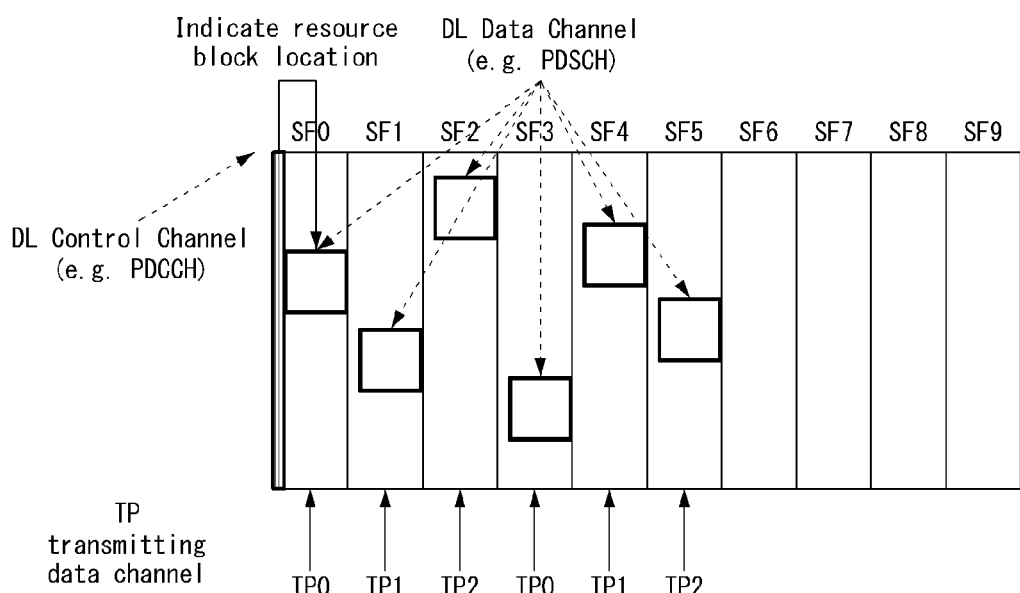

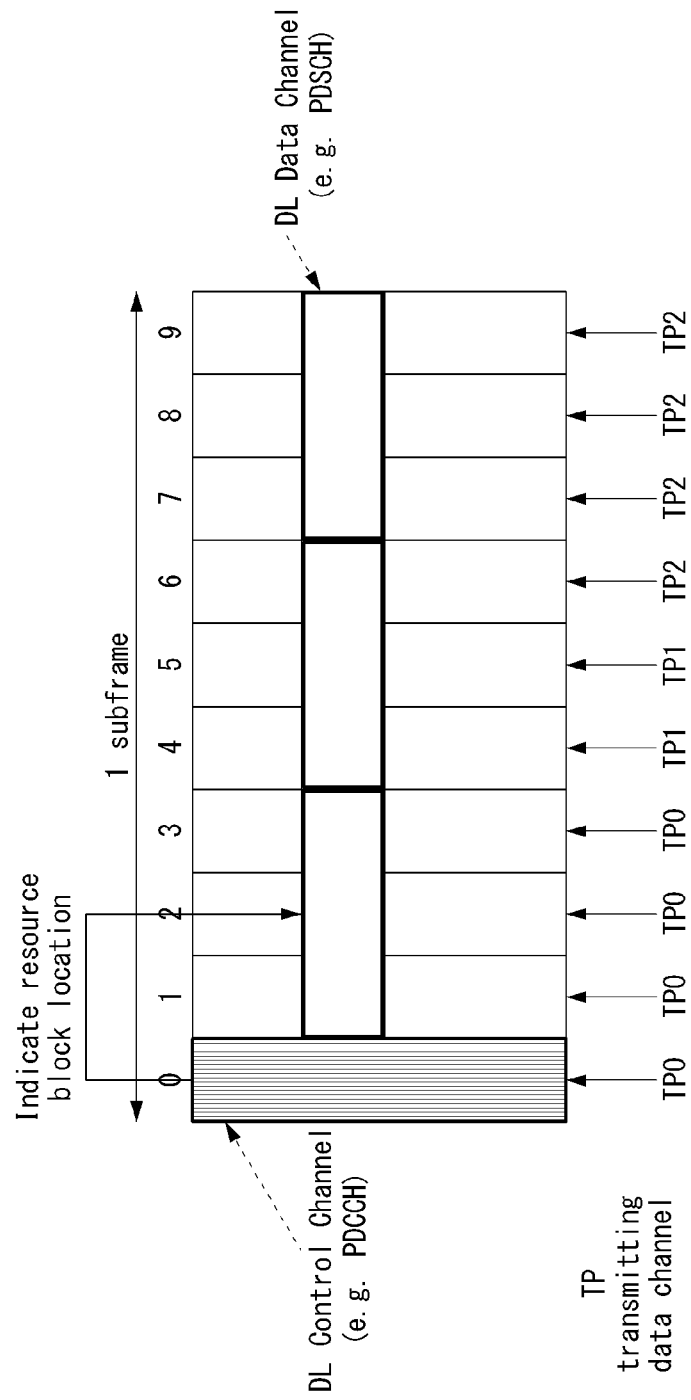

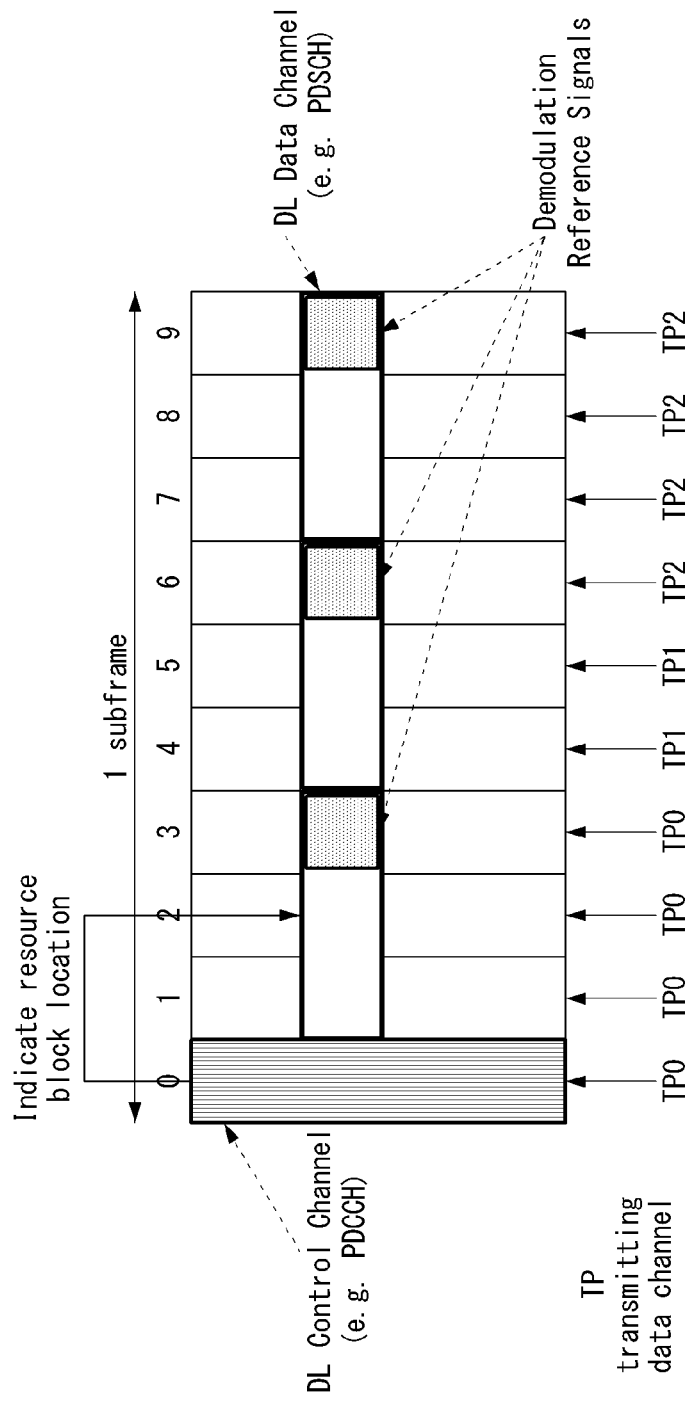

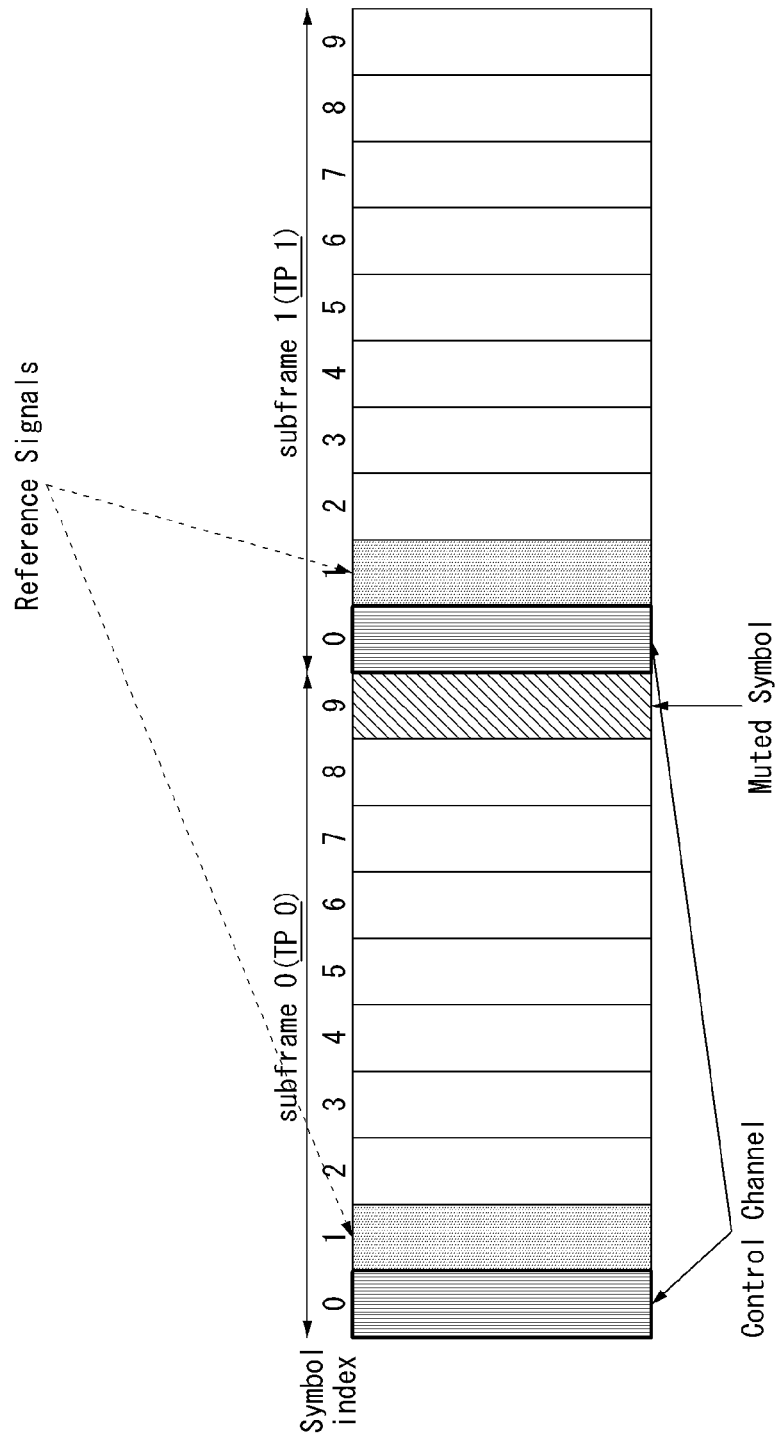
[Fig. 23]

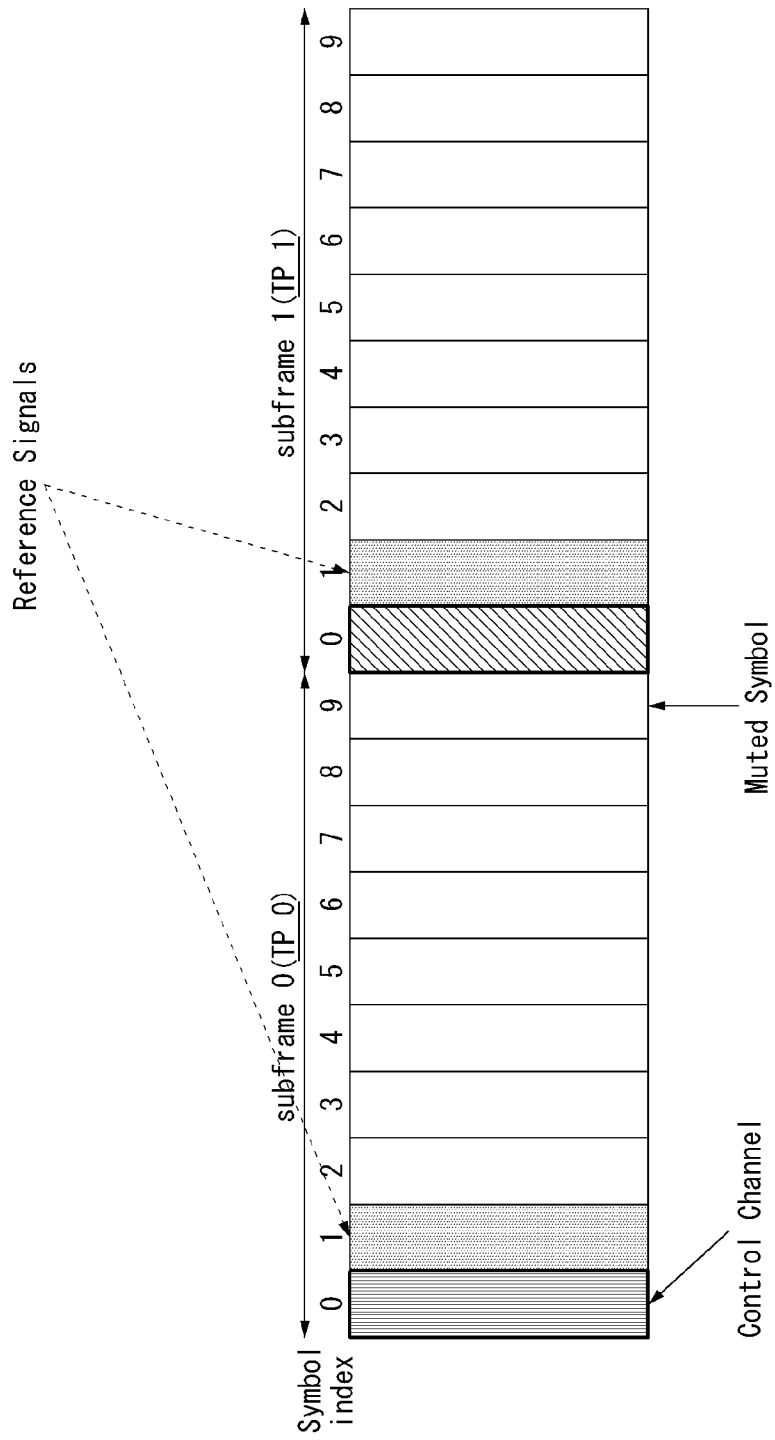

[Fig. 25]
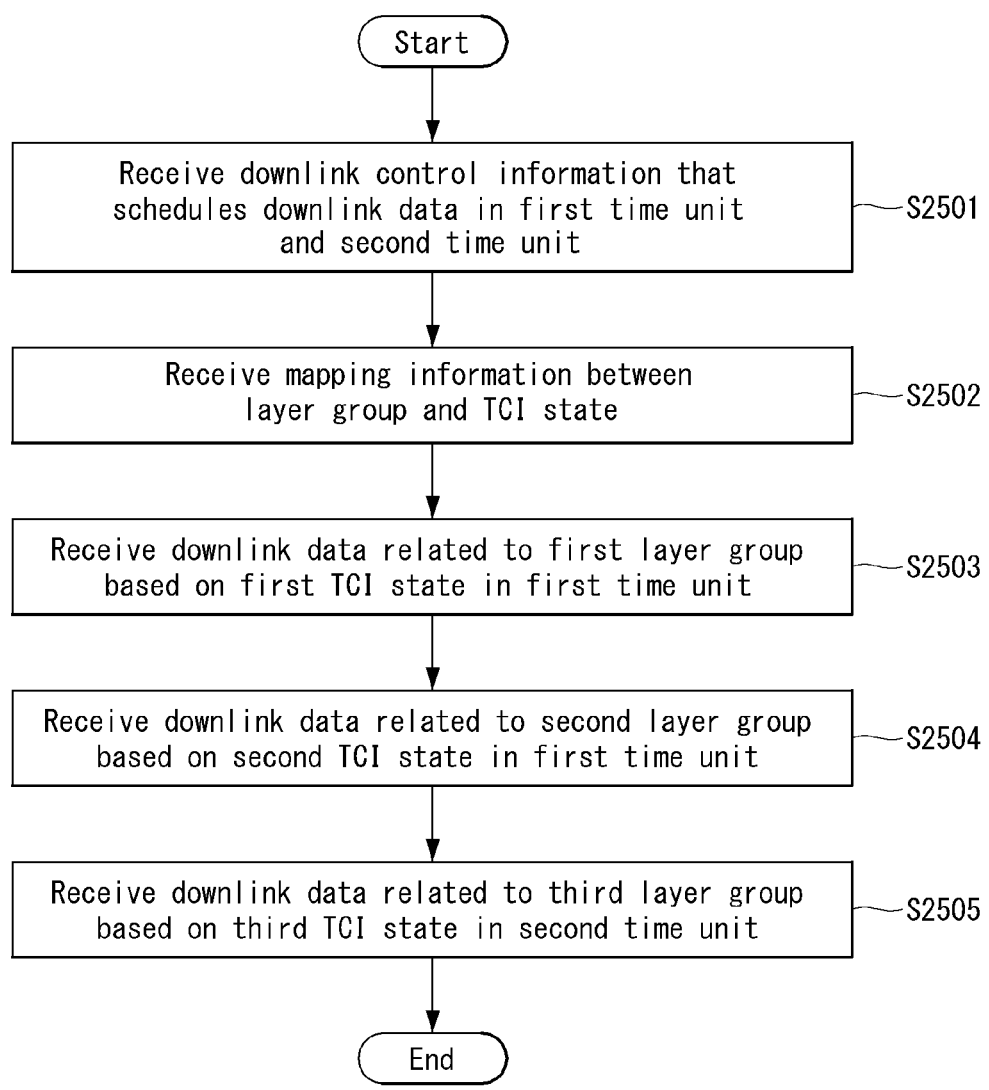

[Fig. 26]
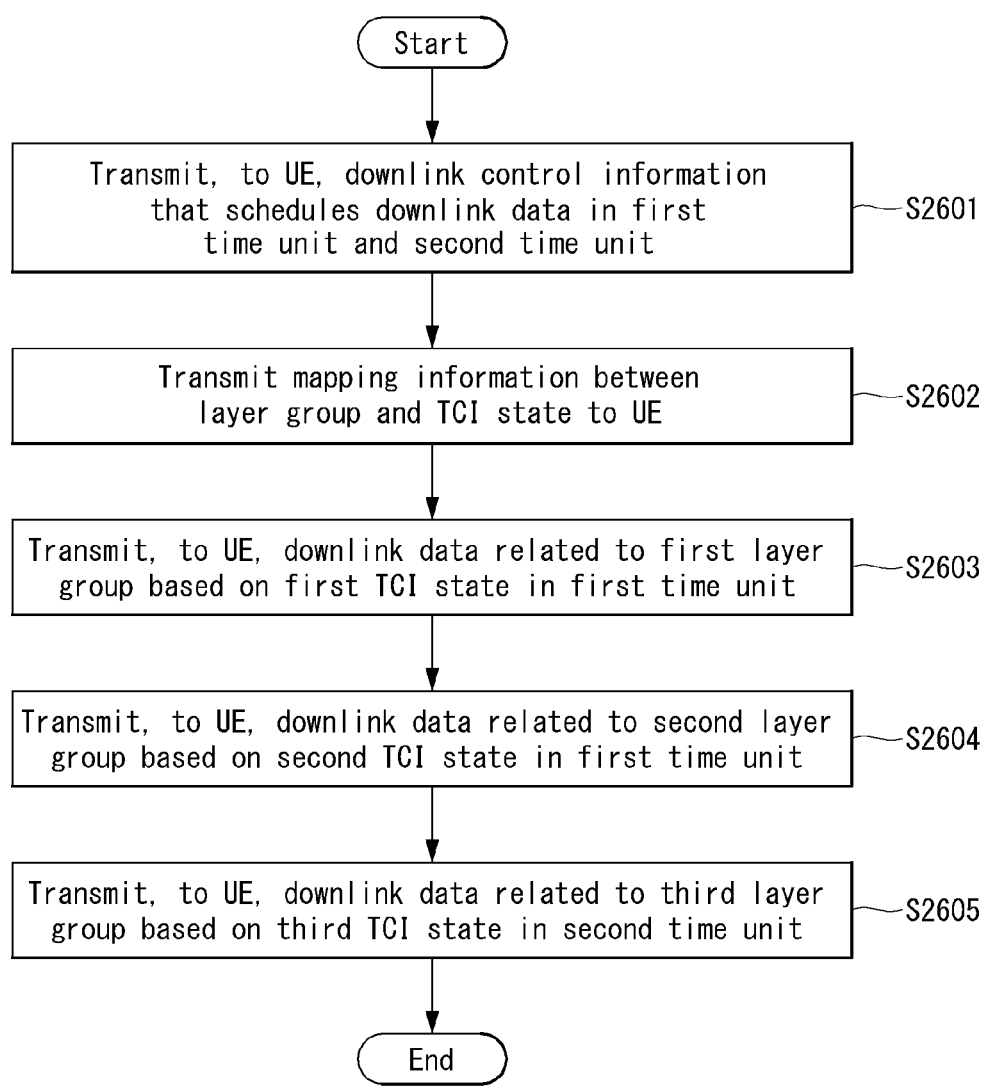

[Fig. 27]
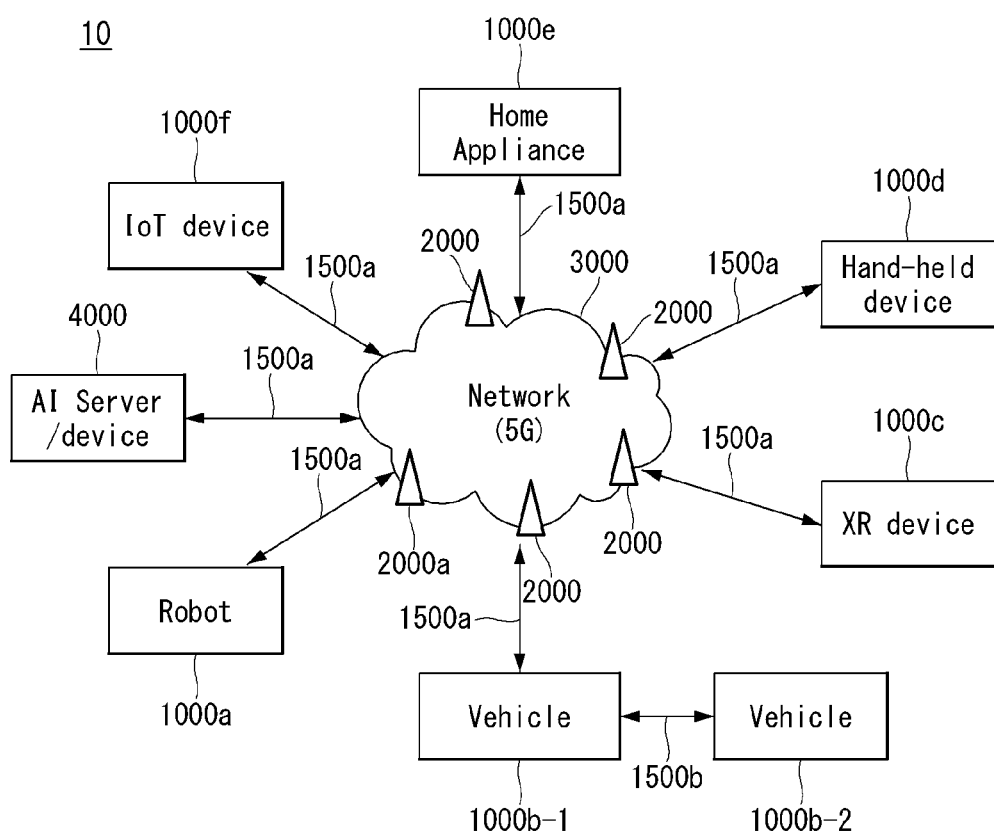

[Fig. 28]
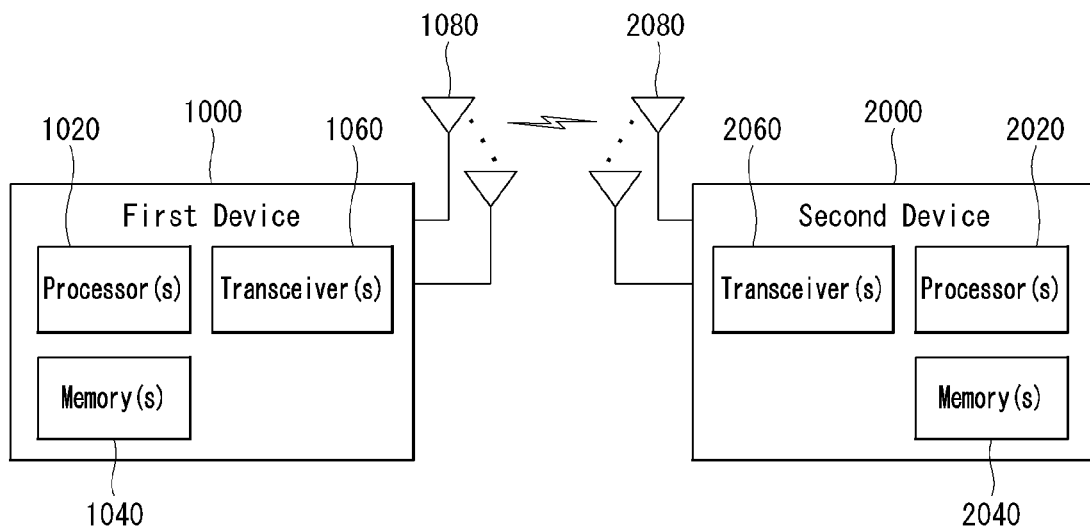
[Fig. 29]
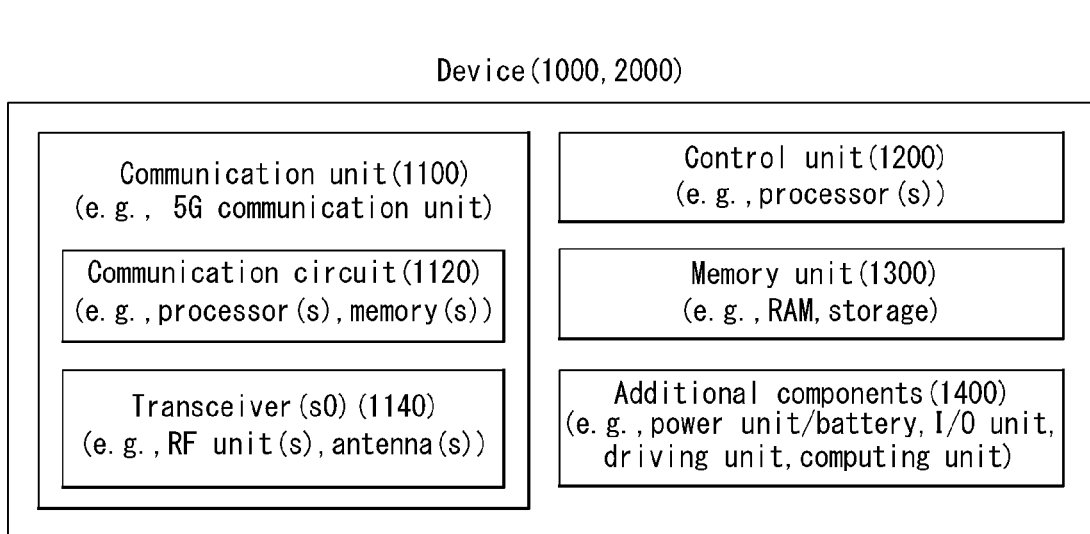

[Fig. 30]
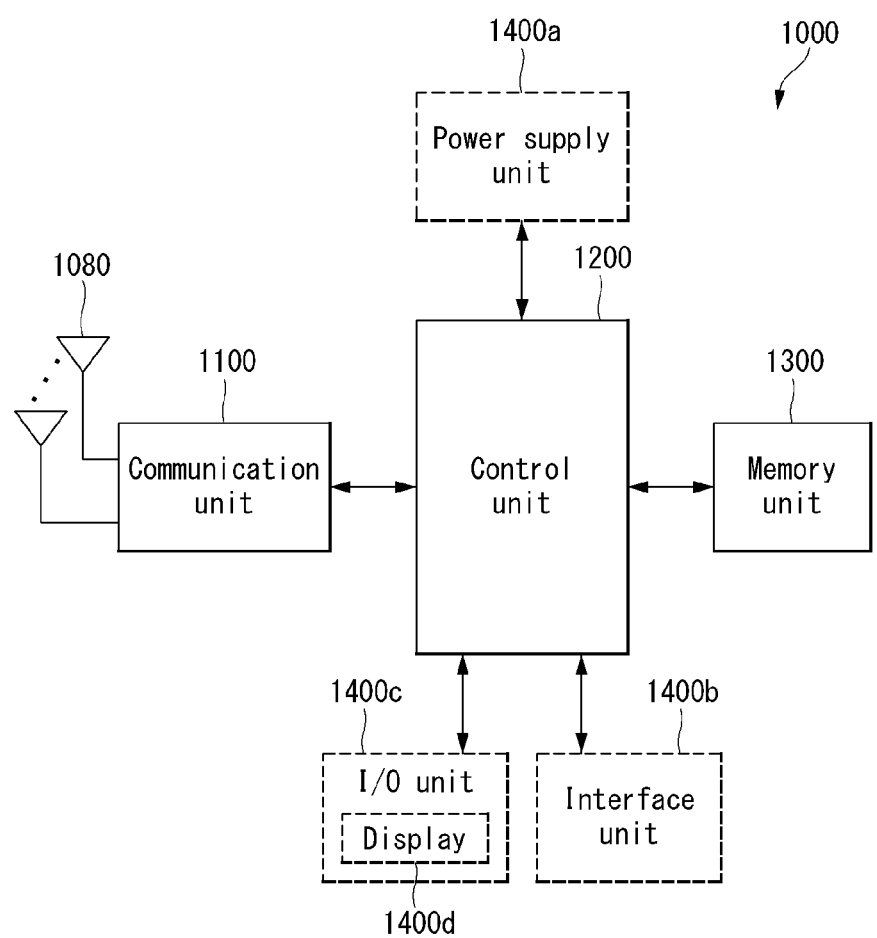

METHOD FOR TRANSMITTING AND RECEIVING PLURALITY OF PHYSICAL DOWNLINK SHARED CHANNELS IN WIRELESS COMMUNICATION SYSTEM, AND DEVICE FOR SAME

CROSS-REFERENCE TO RELATED APPLICATIONS

This application is the National Stage filing under 35 U.S.C. 371 of International Application No. PCT/KR2019/013845, filed on Oct. 21, 2019, which claims the benefit of Korean Application No. 10-2018-0125434, filed on Oct. 19, 2018, the contents of which are all hereby incorporated by reference herein in their entirety.

TECHNICAL FIELD

The present disclosure relates to a wireless communication system and, more particularly, to a method of transmitting and receiving downlink data (e.g., a PDSCH) and an apparatus supporting the same.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to be able to support the accommodation of explosive data traffic, a dramatic increase in the data rate per user, the accommodation of a significant increase in the number of connected devices, very low end-to-end latency, and high energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

The present disclosure proposes a method of mapping multiple time units and multiple TCI states (or QCL reference signals (RSs)) when a plurality of downlink data (e.g., the PDSCH) is transmitted and received through multiple transmission points, and an apparatus therefor.

Furthermore, the present disclosure proposes a method of mapping a TCI state for each layer (or layer group) of a time unit and an apparatus therefor.

Technical problems to be solved by the disclosure are not limited by the above-mentioned technical problems, and other technical problems which are not mentioned above can be clearly understood from the following description by those skilled in the art to which the disclosure pertains.

Technical Solution

The present disclosure proposes a method of receiving downlink data in a wireless communication system. The method performed by a user equipment (UE) may include receiving, in a first time unit and a second time unit, downlink control information scheduling the downlink data, receiving mapping information between a layer group and a transmission configuration indication (TCI) state, receiving, in the first time unit, downlink data related to a first layer group based on a first TCI state, receiving, in the first time unit, downlink data related to a second layer group based on a second TCI state, and receiving, in the second time unit, downlink data related to a third layer group based on a third TCI state.

Furthermore, in the method of the present disclosure, the TCI state may include information for a quasi co-location (QCL) reference signal and information for a QCL type.

Furthermore, in the method of the present disclosure, a demodulation reference signal antenna port of downlink data related to each layer group may be assumed to have a QCL relation with an antenna port of a QCL reference signal mapped to each layer group.

Furthermore, in the method of the present disclosure layers included in each layer group may be determined according to a predefined rule based on a transmission rank.

Furthermore, in the method of the present disclosure, layers included in each layer group may be determined by a configuration of a base station based on a transmission rank.

Furthermore, the method of the present disclosure may further include receiving, in the second time unit, downlink data related to a fourth layer group based on a fourth TCI state. The third layer group may be identical with the first layer group, and the fourth layer group may be identical with the second layer group.

Furthermore, in the method of the present disclosure, the third TCI state may be identical with the first TCI state, and the fourth TCI state may be identical with the second TCI state.

Furthermore, in the method of the present disclosure, each of the first time unit and the second time unit may include at least one of one or more slots and/or one or more symbols.

Furthermore, in the method of the present disclosure, the downlink data may be received from a different transmission point, panel, or beam for each time unit.

Furthermore, the method of the present disclosure may further include receiving information for a plurality of TCI states.

Furthermore, a user equipment (UE) receiving downlink data in a wireless communication system of the present disclosure includes a transceiver for transmitting and receiving radio signals and a processor functionally coupled to the transceiver. The processor may be configured to control to receive, in a first time unit and a second time unit, downlink control information scheduling the downlink data, receive mapping information between a layer group and a transmission configuration indication (TCI) state, receive, in the first time unit, downlink data related to a first layer group based on a first TCI state, receive, in the first time unit, downlink data related to a second layer group based on a second TCI state, and receive, in the second time unit, downlink data related to a third layer group based on a third TCI state.

Furthermore, a base station transmitting downlink data in a wireless communication system of the present disclosure includes a transceiver for transmitting and receiving radio signals and a processor functionally coupled to the transceiver. The processor may be configured to control to transmit, to a user equipment (UE), downlink control information scheduling the downlink data in a first time unit and a second time unit, transmit, to the UE, mapping information between a layer group and a transmission configuration indication (TCI) state, transmit, to the UE, downlink data related to a first layer group in the first time unit based on a first TCI state, transmit, to the UE, downlink data related to a second layer group in the first time unit based on a second TCI state, and transmit, to the UE, downlink data related to a third layer group in the second time unit based on a third TCI state.

Furthermore, in the base station of the present disclosure, the TCI state may include information for a quasi co-location (QCL) reference signal and information for a QCL type.

Furthermore, in the base station of the present disclosure, a demodulation reference signal antenna port of downlink data related to each layer group may be assumed to have a QCL relation with an antenna port of a QCL reference signal mapped to each layer group.

Furthermore, in the base station of the present disclosure, each of the first time unit and the second time unit may include at least one of one or more slots and/or one or more symbols.

Furthermore, in the base station of the present disclosure, the downlink data may be received from a different transmission point, panel, or beam for each time unit.

Furthermore, in the base station of the present disclosure, the processor may be configured to control to transmit information for a plurality of TCI states to the UE.

Advantageous Effects

According to the present disclosure, the present disclosure has an effect in that a plurality of downlink data can be transmitted and received through different transmission points for each time unit by mapping multiple time units and multiple TCI states (or QCL reference signals (RSs)) when a plurality of downlink data (e.g., PDSCHs) is transmitted and received multiple transmission points.

Furthermore, the present disclosure has an effect in that a plurality of downlink data can be transmitted and received through different transmission points for each layer by mapping a TCI state for each layer (layer group) of a time unit.

Furthermore, according to the present disclosure, there is an effect in that communication reliability can be improved by transmitting and receiving a plurality of downlink data through different transmission points for each time unit or layer (or layer group).

Furthermore, according to the present disclosure, there is an effect in that a communication system having high reliability and low latency can be implemented.

Effects which may be obtained in the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

FIG. 1 is a diagram showing an AI device to which a method proposed in the disclosure may be applied.

FIG. 2 is a diagram showing an AI server to which a method proposed in the disclosure may be applied.

FIG. 3 is a diagram showing an AI system to which a method proposed in the disclosure may be applied.

FIG. 4 illustrates an example of an overall structure of an NR system to which a method proposed in the disclosure may be applied.

FIG. 5 illustrates the relation between an uplink frame and a downlink frame in a wireless communication system to which a method proposed in the disclosure may be applied.

FIG. 6 illustrates an example of a frame structure in an NR system.

FIG. 7 illustrates an example of a resource grid supported in a wireless communication system to which a method proposed in the disclosure may be applied.

FIG. 8 illustrates examples of a resource grid per antenna port and numerology to which a method proposed in the disclosure may be applied.

FIG. 9 illustrates an example of a self-contained structure to which a method proposed in the disclosure may be applied FIG. 10 is a flowchart illustrating an example of a CSI-related procedure.

FIG. 11 is a concept view illustrating an example of a beam-related measurement model.

FIG. 12 is a diagram illustrating an example of a DL BM procedure-related Tx beam.

FIG. 13 is a flowchart illustrating an example of a DL BM procedure using an SSB.

FIG. 14 is a diagram illustrating an example of a DL BM procedure using a CSI-RS.

FIG. 15 is a flowchart illustrating an example of a process of determining, by a UE, a received beam.

FIG. 16 is a flowchart illustrating an example of a method of determining, by a base station, a transmission beam.

FIG. 17 is a diagram illustrating an example of resource allocation in time and frequency domains, which is related to the operation of FIG. 14.

FIG. 18 is a flowchart illustrating an example of a beam failure recovery procedure.

FIGS. 19 and 20 illustrate examples of cross-cell scheduling.

FIG. 21 illustrates a scheme in which a plurality of TPs groups symbols by three symbols and alternately transmitting the symbols.

FIG. 22 illustrates an example in which a TU is three symbols.

FIG. 23 illustrates an example in which the last symbol of a data channel is punctured or rate-matched.

FIG. 24 illustrates an example in which the transmission of a control channel transmitted in the first symbol of a subframe that is consecutively and subsequently transmitted is omitted in a TP1 that transmits a corresponding subframe.

FIG. 25 is a flowchart for describing an operating method of a UE which is proposed in the present disclosure.

FIG. 26 is a flowchart for describing an operating method of a base station, which is proposed in the present disclosure.

FIG. 27 illustrates a communication system 10 to which the present disclosure is applied.

FIG. 28 illustrates a wireless device to which the present disclosure may be applied.

FIG. 29 illustrates another example of a wireless device to which the present disclosure is applied.

FIG. 30 illustrates a handheld device to which the present disclosure is applied.

MODE FOR INVENTION

Reference will now be made in detail to embodiments of the disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

In the present disclosure, a base station (BS) means a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced with terms such as a fixed station, Node B, evolved-NodeB (eNB), a base transceiver system (BTS), an access point (AP), gNB (general NB), and the like. Further, a 'terminal' may be fixed or movable and may be replaced with terms such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

In the following, downlink (DL) means communication from the base station to the terminal, and uplink (UL) means communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

Embodiments of the present disclosure may be supported by standard documents disclosed in at least one of IEEE 802, 3GPP, and 3GPP2 which are the wireless access systems. That is, steps or parts in the embodiments of the present disclosure which are not described to clearly show the technical spirit of the present disclosure may be supported by the standard documents. Further, all terms described in this document may be described by the standard document.

3GPP LTE/LTE-A/New RAT (NR) is primarily described for clear description, but technical features of the present disclosure are not limited thereto.

Hereinafter, examples of 5G use scenarios to which a method proposed in the disclosure may be applied are described.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billion. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

Self-Driving (Autonomous-Driving)

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 is a diagram showing an AI device 100 to which a method proposed in the disclosure may be applied.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

FIG. 2 is a diagram showing the AI server 200 to which a method proposed in the disclosure may be applied.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231*a*) which is being trained or has been trained through the learning processor 240.

The learning processor 240 may train the artificial neural network 231*a* using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 3 is a diagram showing an AI system 1 to which a method proposed in the disclosure may be applied.

Referring to FIG. 3, the AI system 1 is connected to at least one of the AI server 200, a robot 100*a*, a self-driving vehicle 100*b*, an XR device 100*c*, a smartphone 100*d* or home appliances 100*e* over a cloud network 10. In this case, the robot 100*a*, the self-driving vehicle 100*b*, the XR device 100*c*, the smartphone 100*d* or the home appliances 100*e* to which the AI technology has been applied may be called AI devices 100*a* to 100*e*.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100*a* to 100*e* (200) configuring the AI system 1 may be interconnected over the cloud network 10. Particularly, the devices 100*a* to 100*e* and 200 may communicate with each other through a base station, but may directly communicate with each other without the intervention of a base station.

The AI server 200 may include a server for performing AI processing and a server for performing calculation on big data.

The AI server 200 is connected to at least one of the robot 100*a*, the self-driving vehicle 100*b*, the XR device 100*c*, the smartphone 100*d* or the home appliances 100*e*, that is, AI devices configuring the AI system 1, over the cloud network 10, and may help at least some of the AI processing of the connected AI devices 100*a* to 100*e*.

In this case, the AI server 200 may train an artificial neural network based on a machine learning algorithm in place of the AI devices 100*a* to 100*e*, may directly store a learning model or may transmit the learning model to the AI devices 100*a* to 100*e*.

In this case, the AI server 200 may receive input data from the AI devices 100*a* to 100*e*, may deduce a result value of the received input data using the learning model, may generate a response or control command based on the deduced result value, and may transmit the response or control command to the AI devices 100*a* to 100*e*.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 3 may be considered to be detailed embodiments of the AI device 100 shown in FIG. 1.

AI+Robot

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowport and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

AI+Self-Driving

An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100b may perform the above operations using a learning model configured with at least one artificial neural network. For example, the self-driving vehicle 100b may recognize a surrounding environment and object using a learning model, and may determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model and perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

AI+XR

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information for a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

AI+Robot+Self-Driving

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously run along a given flow without control of a user or that autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through a LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

AI+Robot+XR

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI+Self-Driving+XR

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

As the spread of smartphones and IoT (Internet of Things) terminals is rapidly spreading, the amount of information exchanged through a communication network is increasing. As a result, next-generation wireless access technologies can provide faster service to more users than traditional communication systems (or traditional radio access technologies) (e.g., enhanced mobile broadband communication) Needs to be considered.

To this end, the design of a communication system that considers Machine Type Communication (MTC), which provides services by connecting a number of devices and objects, is being discussed. It is also being discussed as a multiuser of communication systems (e.g., Ultra-Reliable and Low Latency Communication, URLLC) that take into account the reliability and/or latency-sensitive services (service) and/or a user equipment.

Hereinafter, in the present disclosure, for convenience of description, the next generation radio access technology is referred to as NR (New RAT), and the radio communication system to which the NR is applied is referred to as an NR system.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 4 illustrates an example of an overall structure of an NR system to which a method proposed in the disclosure may be applied.

Referring to FIG. 4, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

NR supports multiple numerologies (or subcarrier spacings (SCSs)) for supporting various 5G services. For example, the NR supports a wide area in typical cellular bands when the SCS is 15 kHz, supports a dense urban, lower latency and a wider carrier bandwidth when the SCS is 30 kHz/60 kHz, and supports a bandwidth greater than 24.25 GHz in order to overcome phase noise when the SCS is 60 kHz or higher.

An NR frequency band is defined as a frequency range of two types FR1 and FR2. The FR1 and the FR2 may be configured as in Table 1 below. Furthermore, the FR2 may mean a millimeter wave (mmW).

TABLE 1

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 2.

TABLE 2

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms In this case, there may be a set of UL frames and a set of DL frames.

FIG. 5 illustrates the relation between an uplink frame and a downlink frame in a wireless communication system to which a method proposed in the disclosure may be applied.

As illustrated in FIG. 5, uplink frame number i for transmission from a user equipment (UE) shall start $T_{TA}=N_{TA}T_S$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe and are numbered in increasing order of $n_{s,f}^\mu \in \{0, \ldots, N_{frame}^{slots,\mu}-1\}$ within a radio frame. One slot consists of consecutive OFDM symbols of $N_{symb}^{slots,\mu}$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number slot of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame, \mu}$ | $N_{slot}^{frame, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{frame, \mu}$ |
|---|---|---|---|
| 2 | 12 | 40 | 4 |

FIG. 6 illustrates an example of a frame structure in an NR system. FIG. 6 is merely for convenience of explanation and does not limit the scope of the disclosure.

In Table 4, in case of μ=2, i.e., as an example in which a subcarrier spacing (SCS) is 60 kHz, one subframe (or frame) may include four slots with reference to Table 4, and one subframe={1, 2, 4} slots shown in FIG. 3, for example, the number of slot(s) that may be included in one subframe may be defined as in Table 4.

Further, a mini-slot may consist of 2, 4, or 7 symbols, or may consist of more symbols or less symbols.

In relation to physical resources in the NR system, an antenna port, a resource grid, a resource element, a resource block, a carrier part, etc. may be considered.

Hereinafter, the above physical resources that can be considered in the NR system are described in more detail.

First, in relation to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. In this case, the large-scale properties may include at least one of delay spread, Doppler spread, frequency shift, average received power, and received timing.

FIG. 7 illustrates an example of a resource grid supported in a wireless communication system to which a method proposed in the disclosure may be applied.

Referring to FIG. 7, a resource grid consists of $N_{RB}^\mu N_{sc}^{RB}$ subcarriers on a frequency domain, each subframe consisting of 14·2μ OFDM symbols, but the disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu} \cdot N_{RB}^{max,\mu}$ denotes a maximum transmission bandwidth and may change not only between numerologies but also between uplink and downlink.

In this case, as illustrated in FIG. 8, one resource grid may be configured per numerology P and antenna port p.

FIG. 8 illustrates examples of a resource grid per antenna port and numerology to which a method proposed in the disclosure may be applied.

Each element of the resource grid for the numerology μ and the antenna port p is called a resource element and is uniquely identified by an index pair (k,l̄) where k=0, . . . , $N_{RB}^\mu N_{sc}^{RB}-1$ is an index on a frequency domain, and l̄=0, . . . , $2^\mu N_{symb}^{(\mu)}-1$ refers to a location of a symbol in a subframe. The index pair (k,l̄) is used to refer to a resource element in a slot, where l=0, . . . , $N_{symb}^\mu-1$.

The resource element (k,l̄) for the numerology μ and the antenna port p corresponds to a complex value $a_{k,\bar{l}}^{(p,\mu)}$. When there is no risk for confusion or when a specific antenna port or numerology is not specified, the indexes p and μ may be dropped, and as a result, the complex value may be $a_{k,\bar{l}}^{(p)}$ or $a_{k,\bar{l}}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^\mu$ in the frequency domain and resource elements (k, l) for the subcarrier spacing configuration/may be given by the following Equation 1.

$$n_{CRB}^{\mu} = \left\lfloor \frac{k}{N_{sc}^{RB}} \right\rfloor \quad \text{[Equation 1]}$$

In this case, k may be defined relative to the point A so that k=0 corresponds to a subcarrier centered around the point A. Physical resource blocks are defined within a bandwidth part (BWP) and are numbered from 0 to $N_{BWP,i}^{size}-1$ where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

In this case, $N_{BWP,i}^{start}$ may be the common resource block where the BWP starts relative to the common resource block 0.

Self-Contained Structure

A time division duplexing (TDD) structure considered in the NR system is a structure in which both uplink (UL) and downlink (DL) are processed in one slot (or subframe). The structure is to minimize a latency of data transmission in a TDD system and may be referred to as a self-contained structure or a self-contained slot.

FIG. 9 illustrates an example of a self-contained structure to which a method proposed in the disclosure may be applied. FIG. 9 is merely for convenience of explanation and does not limit the scope of the disclosure.

Referring to FIG. 9, as in legacy LTE, it is assumed that one transmission unit (e.g., slot, subframe) consists of 14 orthogonal frequency division multiplexing (OFDM) symbols.

In FIG. 9, a region 902 means a downlink control region, and a region 904 means an uplink control region. Further, regions (i.e., regions without separate indication) other than the region 902 and the region 904 may be used for transmission of downlink data or uplink data.

That is, uplink control information and downlink control information may be transmitted in one self-contained slot. On the other hand, in case of data, uplink data or downlink data is transmitted in one self-contained slot.

When the structure illustrated in FIG. 9 is used, in one self-contained slot, downlink transmission and uplink transmission may sequentially proceed, and downlink data transmission and uplink ACK/NACK reception may be performed.

As a result, if an error occurs in the data transmission, time required until retransmission of data can be reduced. Hence, the latency related to data transfer can be minimized.

In the self-contained slot structure illustrated in FIG. 9, a base station (e.g., eNodeB, eNB, gNB) and/or a user equipment (UE) (e.g., terminal) require a time gap for a process for converting a transmission mode into a reception mode or a process for converting a reception mode into a transmission mode. In relation to the time gap, if uplink transmission is performed after downlink transmission in the self-contained slot, some OFDM symbol(s) may be configured as a guard period (GP).

Channel State Information (CSI) Related Procedure

In a new radio (NR) system, a channel state information-reference signal (CSI-RS) is used for time/frequency tracking, CSI computation, layer 1 (L1)-reference signal received power (RSRP) computation, and mobility.

"A and/or B" used in the present disclosure may be interpreted as the same meaning as that "A and/or B" includes at least one of A or B."

The CSI computation is related to CSI acquisition, and the L1-RSRP computation is related to beam management (BM).

Channel state information (CSI generally refers to information which may indicate the quality of a radio channel (or also called a link) formed between a UE and an antenna port.

An operation of a UE for a CSI-related procedure is described.

FIG. 10 is a flowchart illustrating an example of a CSI-related procedure.

In order to perform one of uses of a CSI-RS described above, a terminal (e.g., user equipment (UE)) receives, from a base station (e.g., general Node B or gNB), configuration information related to CSI through radio resource control (RRC) signaling (S110).

The configuration information related to the CSI may include at least one of CSI-interference management (IM) resource-related information, CSI measurement configuration-related information, CSI resource configuration-related information, CSI-RS resource-related information, or CSI report configuration-related information.

The CSI-IM resource-related information may include CSI-IM resource information, CSI-IM resource set information, etc.

A CSI-IM resource set is identified by a CSI-IM resource set identifier (ID). One resource set includes at least one CSI-IM resource.

Each CSI-IM resource is identified by a CSI-IM resource ID.

The CSI resource configuration-related information defines a group including at least one of a non zero power (NZP) CSI-RS resource set, a CSI-IM resource set, or a CSI-SSB resource set.

That is, the CSI resource configuration-related information includes a CSI-RS resource set list. The CSI-RS resource set list may include at least one of an NZP CSI-RS resource set list, a CSI-IM resource set list, or a CSI-SSB resource set list.

The CSI resource configuration-related information may be represented as a CSI-ResourceConfig IE.

The CSI-RS resource set is identified by a CSI-RS resource set ID. One resource set includes at least one CSI-RS resource.

Each CSI-RS resource is identified by a CSI-RS resource ID.

As in Table 5, parameters (e.g., a BM-related "repetition" parameter and a tracking-related "trs-Info" parameter) indicating the use of a CSI-RS for each NZP CSI-RS resource set may be configured.

Table 5 illustrates an example of the NZP CSI-RS resource set IE.

TABLE 5

-- ASN1START
-- TAG-NZP-CSI-RS-RESOURCESET-START
NZP-CSI-RS-ResourceSet ::=        SEQUENCE {
    nzp-CSI-ResourceSetId         NZP-CSI-RS-ResourceSetId,
    nzp-CSI-RS-Resources          SEQUENCE (SIZE (1..maxNrofNZP-CSI- TABLE 5-continued

```
RS-ResourcesPerSet)) OF NZP-CSI-RS-ResourceId,
    repetition                    ENUMERATED { on, off }
    aperiodicTriggeringOffset     INTEGER(0..4)
    trs-Info                      ENUMERATED {true}
    ...
}
-- TAG-NZP-CSI-RS-RESOURCESET-STOP
-- ASN1STOP
```

In Table 5, the repetition parameter is a parameter indicating whether the same beam is repeatedly transmitted, and indicates whether a repetition is "ON" or "OFF" for each NZP CSI-RS resource set. A transmission (Tx) beam used in the present disclosure may be interpreted as the same meaning as a spatial domain transmission filter. A received (Rx) beam used in the present disclosure may be interpreted as the same meaning as a spatial domain reception filter.

For example, if the repetition parameter in Table 5 is configured as "OFF", a UE does not assume that an NZP CSI-RS resource(s) within a resource set is transmitted as the same Nrofports as the same DL spatial domain transmission filter in all symbols.

Furthermore, the repetition parameter corresponding to a higher layer parameter corresponds to "CSI-RS-ResourceRep" of an L1 parameter.

The CSI report configuration-related information includes a report configuration type (reportConfigType) parameter indicating a time domain behavior and a report quantity (reportQuantity) parameter indicating CSI-related quantity for reporting.

The time domain behavior may be periodic, aperiodic or semi-persistent.

Furthermore, the CSI report configuration-related information may be represented as a CSI-ReportConfig IE. Table 6 below illustrates an example of a CSI-ReportConfig IE.

TABLE 6

```
-- ASN1START
-- TAG-CSI-RESOURCECONFIG-START
CSI-ReportConfig ::=    SEQUENCE {
    reportConfigId                              CSI-ReportConfigId,
    carrier                                     ServCellIndex
OPTIONAL, -- Need S
    resourcesForChannelMeasurement              CSI-ResourceConfigId,
    csi-IM-ResourcesForInterference             CSI-ResourceConfigId
    OPTIONAL, -- Need R
    nzp-CSI-RS-ResourcesForInterference         CSI-ResourceConfigId
    OPTIONAL, -- Need R
    reportConfigType                            CHOICE {
        periodic                                    SEQUENCE {
            reportSlotConfig                            CSI-ReportPeriodicityAndOffset,
            pucch-CSI-ResourceList                      SEQUENCE (SIZE
(1..maxNrofBWPs)) OF PUCCH-CSI-Resource
        },
        semiPersistentOnPUCCH                       SEQUENCE {
            reportSlotConfig                            CSI-ReportPeriodicityAndOffset,
            pucch-CSI-ResourceList                      SEQUENCE (SIZE
(1..maxNrofBWPs)) OF PUCCH-CSI-Resource
        },
        semiPersistentOnPUSCH                       SEQUENCE {
            reportSlotConfig                            ENUMERATED {sl5, sl10, sl20,
sl40, sl80, sl160, sl320},
            reportSlotOffsetList                        SEQUENCE (SIZE (1.. maxNrofUL-
Allocations)) OF INTEGER(0..32),
            p0alpha                                     P0-PUSCH-AlphaSetId
        },
        aperiodic                                   SEQUENCE {
            reportSlotOffsetList                        SEQUENCE (SIZE (1..maxNrofUL-
Allocations)) OF INTEGER(0..32)
        }
    },
    reportQuantity                              CHOICE {
        none                                        NULL,
        cri-RI-PMI-CQI                              NULL,
        cri-RI-i1                                   NULL,
        cri-RI-i1-CQI                               SEQUENCE {
            pdsch-BundleSizeForCSI                          ENUMERATED {n2, n4}
OPTIONAL
        },
        cri-RI-CQI                                  NULL,
        cri-RSRP                                    NULL,
        ssb-Index-RSRP                              NULL,
        cri-RI-LI-PMI-CQI                           NULL
    },
```

Furthermore, the UE measures CSI based on the configuration information related to CSI (S120). The CSI measurement may include (1) a CSI-RS reception process S121 of the UE and (2) a process S122 of computing CSI through a received CSI-RS.

A sequence for a CSI-RS is generated by Equation 3 below. An initialization value of a pseudo-random sequence C(i) is defined by Equation 4.

$$r(m) = \frac{1}{\sqrt{2}}(1 - 2 \cdot c(2m)) + j\frac{1}{\sqrt{2}}(1 - 2 \cdot c(2m+1)) \quad \text{[Equation 3]}$$

$$c_{init} = (2^{10}(N_{symb}^{slot}n_{s,f}^{\mu} + l + 1)(2n_{ID} + 1) + n_{ID})\bmod 2^{31} \quad \text{[Equation 4]}$$

In Equations 3 and 4, $n_{s,f}^{\mu}$ indicates a slot number within a radio frame, and a pseudo-random sequence generator is initialized as Cint at the start of each OFDM symbol, that is, $n_{s,f}^{\mu}$.

Furthermore, I is an OFDM symbol number within a slot. $n_{ID}$ is identical with a higher-layer parameter scramblingID.

Furthermore, in the CSI-RS, resource element (RE) mapping of a CSI-RS resource is configured in time and frequency domains by a higher layer parameter CSI-RS-ResourceMapping.

Table 7 illustrates an example of a CSI-RS-ResourceMapping IE.

TABLE 7

```
-- ASN1START
-- TAG-CSI-RS-RESOURCEMAPPING-START
CSI-RS-ResourceMapping ::=         SEQUENCE {
    frequencyDomainAllocation          CHOICE {
        row1                               BIT STRING (SIZE (4)),
        row2                               BIT STRING (SIZE (12)),
        row4                               BIT STRING (SIZE (3)),
        other                              BIT STRING (SIZE (6))
    },
    nrofPorts                          ENUMERATED
{p1,p2,p4,p8,p12,p16,p24,p32},
        firstOFDMSymbolInTimeDomain        INTEGER (0..13),
        firstOFDMSymbolInTimeDomain2       INTEGER (2..12)
        cdm-Type                           ENUMERATED {noCDM, fd-CDM2, cdm4-
FD2-TD2, cdm8-FD2-TD4},
    density                            CHOICE {
        dot5                               ENUMERATED {evenPRBs, oddPRBs},
        one                                NULL,
        three                              NULL,
        spare                              NULL
    },
    freqBand                           CSI-FrequencyOccupation,
    ...
}
```

In Table 7, density D indicates the density of CSI-RS resources measured in an RE/port/physical resource block (PRB). nrofPorts indicates the number of antenna ports. Furthermore, the UE reports the measured CSI to the base station (S130).

In this case, if the quantity of CSI-ReportConfig is configured as "none (or No report)" in Table 6, the UE may omit the report.

However, although the quantity is configured as "none (or No report)", the UE may report the measured CSI to the base station.

A case where the quantity is configured as "none" is a case where an aperiodic TRS is triggered or a case where a repetition is configured.

In this case, the reporting of the UE may be defined to be omitted only when the repetition is configured as "ON."

In summary, if the repetition is configured as "ON" and "OFF", CSI reporting may include all of "No report", "SSB resource indicator (SSBRI) and L1-RSRP", and "CSI-RS resource indicator (CRI) and L1-RSRP."

Alternatively, if the repetition is "OFF", the CSI reporting of "SSBRI and L1-RSRP" or "CRI and L1-RSRP" may be defined to be transmitted. If the repetition is "ON", the CSI reporting of "No report", "SSBRI and L1-RSRP", or "CRI and L1-RSRP" may be defined to be transmitted.

Beam Management (BM) Procedure

A beam management (BM) procedure defined in new radio (NR) is described.

The BM procedure corresponds to layer 1 (L1)/L2 (layer 2) procedures for obtaining and maintaining a set of base station (e.g., gNB or TRP) and/or a terminal (e.g., UE) beams which may be used for downlink (DL) and uplink (UL) transmission/reception, and may include the following procedure and terms.

Beam measurement: an operation of measuring characteristics of a beamforming signal received by a base station or a UE.

Beam determination: an operation of selecting, by a base station or a UE, its own transmission (Tx) beam/received (Rx) beam.

Beam sweeping: an operation of covering a space region by using a Tx and/or Rx beam for a given time interval in a predetermined manner.

Beam report: an operation of reporting, by a UE, information of a beamformed signal based on beam measurement.

FIG. 11 is a concept view illustrating an example of a beam-related measurement model.

For beam measurement, an SS block (or SS/PBCH block (SSB)) or a channel state information reference signal (CSI-RS) is used in the downlink. A sounding reference signal (SRS) is used in the uplink.

In RRC_CONNECTED, a UE measures multiple beams (or at least one beam) of a cell. The UE may average measurement results (RSRP, RSRQ, SINR, etc.) in order to derive cell quality.

Accordingly, the UE may be configured to consider a sub-set of a detected beam(s).

Beam measurement-related filtering occurs in different two levels (in a physical layer that derives beam quality and an RRC level in which cell quality is derived from multiple beams).

Cell quality from beam measurement is derived in the same manner with respect to a serving cell(s) and a non-serving cell)(s).

If a UE is configured by a gNB to report measurement results for a specific beam(s), a measurement report includes measurement results for X best beams. The beam measurement results may be reported as L1-reference signal received power (RSRP).

In FIG. 11, K beams (gNB beam 1, gNB beam 2, . . . , gNB beam k) 210 are configured for L3 mobility by a gNB, and correspond to the measurement of a synchronization signal (SS) block (SSB) or CSI-RS resource detected by a UE in the L1.

In FIG. 11, layer 1 filtering 220 means internal layer 1 filtering of an input measured at a point A.

Furthermore, in beam consolidation/selection 230, beam-specific measurements are integrated (or merged) in order to derive cell quality.

Layer 3 filtering 240 for cell quality means filtering performed on measurement provided at a point B.

A UE evaluates a reporting criterion whenever new measurement results are reported at least at points C and C1.

D corresponds to measurement report information (message) transmitted at a radio interface.

In L3 beam filtering 250, filtering is performed on measurement (beam-specific measurement) provided at a point A1.

In beam selection 260 for a beam report, X measurement values are selected in measurement provided at a point E.

F indicates beam measurement information included in a measurement report (transmission) in a radio interface.

Furthermore, the BM procedure may be divided into (1) a DL BM procedure using a synchronization signal (SS)/physical broadcast channel (PBCH) Block or CSI-RS and (2) an UL BM procedure using a sounding reference signal (SRS).

Furthermore, each of the BM procedures may include Tx beam sweeping for determining a Tx beam and Rx beam sweeping for determining an Rx beam.

DL BM Procedure

First, the DL BM procedure is described.

The DL BM procedure may include (1) the transmission of beamformed DL reference signals (RSs) (e.g., CSI-RS or SS block (SSB)) of a base station and (2) beam reporting of a UE.

In this case, the beam reporting may include a preferred DL RS identifier (ID)(s) and L1-reference signal received power (RSRP) corresponding thereto.

The DL RS ID may be an SSB resource indicator (SSBRI) or a CSI-RS resource indicator (CRI).

FIG. 12 is a diagram illustrating an example of a DL BM procedure-related Tx beam.

As illustrated in FIG. 12, an SSB beam and a CSI-RS beam may be used for beam measurement.

In this case, a measurement metric is L1-RSRP for each resource/block.

An SSB may be used for coarse beam measurement, and a CSI-RS may be used for fine beam measurement.

Furthermore, the SSB may be used for both Tx beam sweeping and Rx beam sweeping.

A UE may perform the Rx beam sweeping using an SSB while changing an Rx beam with respect to the same SSBRI across multiple SSB bursts.

In this case, one SS burst includes one or more SSBs, and one SS burst set includes one or more SSB bursts.

DL BM Procedure Using SSB

FIG. 13 is a flowchart illustrating an example of a DL BM procedure using an SSB.

A configuration for a beam report using an SSB is performed upon CSI/beam configuration in an RRC connected state (or RRC connected mode).

As in a CSI-ResourceConfig IE of Table 8, a BM configuration using an SSB is not separately defined, and an SSB is configured like a CSI-RS resource.

Table 8 illustrates an example of the CSI-ResourceConfig IE.

TABLE 8

```
-- ASN1START
-- TAG-CSI-RESOURCECONFIG-START
CSI-ResourceConfig ::=            SEQUENCE {
    csi-ResourceConfigId              CSI-ResourceConfigId,
    csi-RS-ResourceSetList            CHOICE {
        nzp-CSI-RS-SSB                    SEQUENCE {
            nzp-CSI-RS-ResourceSetList        SEQUENCE (SIZE
(1..maxNrofNZP-CSI-RS-ResourceSetsPerConfig)) OF NZP-CSI-RS-
ResourceSetId OPTIONAL,
            csi-SSB-ResourceSetList           SEQUENCE (SIZE
(1..maxNrofCSI-SSB-ResourceSetsPerConfig)) OF CSI-SSB-ResourceSetId
    OPTIONAL
        },
        csi-IM-ResourceSetList            SEQUENCE (SIZE (1..maxNrofCSI-IM-
ResourceSetsPerConfig)) OF CSI-IM-ResourceSetId
    },
    bwp-Id                            BWP-Id,
    resourceType                      ENUMERATED { aperiodic, semiPersistent,
periodic },
    ...
}
-- TAG-CSI-RESOURCECONFIGTOADDMOD-STOP
-- ASN1STOP
```

In Table 8, the csi-SSB-ResourceSetList parameter indicates a list of SSB resources used for beam management and reporting in one resource set. A UE receives, from a base station, a CSI-ResourceConfig IE including CSI-SSB-ResourceSetList including SSB resources used for BM (S410).

In this case, the SSB resource set may be configured with {SSBx1, SSBx2, SSBx3, SSBx4, . . . }.

An SSB index may be defined from 0 to 63.

Furthermore, the UE receives an SSB resource from the base station based on the CSI-SSB-ResourceSetList (S420).

Furthermore, if CSI-RS reportConfig related to a report for an SSBRI and L1-RSRP has been configured, the UE (beam) reports, to the base station, the best SSBRI and L1-RSRP corresponding thereto (S430).

That is, if reportQuantity of the CSI-RS reportConfig IE is configured as "ssb-Index-RSRP", the UE reports the best SSBRI and the L1-RSRP corresponding thereto to the base station.

Furthermore, if a CSI-RS resource is configured in an OFDM symbol(s) identical with an SS/PBCH block (SSB) and "QCL-TypeD" is applicable, the UE may assume that a CSI-RS and an SSB are quasi co-located from a "QCL-TypeD" viewpoint.

In this case, the QCL TypeD may mean that antenna ports have been QCLed from a spatial Rx parameter viewpoint. When the UE receives a plurality of DL antenna ports having a QCL Type D relation, the same Rx beam may be applied.

Furthermore, the UE does not expect that a CSI-RS will be configured in an RE that overlaps an RE of an SSB.

DL BM Procedure Using CSI-RS

If a UE is configured with NZP-CSI-RS-ResourceSet having a (higher layer parameter) repetition configured as "ON", the UE may assume that at least one CSI-RS resource within the NZP-CSI-RS-ResourceSet is transmitted as the same downlink spatial domain transmission filter.

That is, at least one CSI-RS resource within the NZP-CSI-RS-ResourceSet is transmitted through the same Tx beam.

In this case, the at least one CSI-RS resource within the NZP-CSI-RS-ResourceSet may be transmitted in different OFDM symbols or may be transmitted in different frequency domains (i.e., through FDM).

A case where the at least one CSI-RS resource is FDMed is a case where a UE is a multi-panel UE.

Furthermore, a case where a repetition is configured as "ON" is related to an Rx beam sweeping procedure of a UE.

The UE does not expect that different periodicities will be received in periodicityAndOffset in all CSI-RS resources within NZP-CSI-RS-Resourceset.

Furthermore, if the repetition is configured as "OFF", the UE does not assume that at least one CSI-RS resource within NZP-CSI-RS-ResourceSet is transmitted as the same downlink spatial domain transmission filter.

That is, the at least one CSI-RS resource within NZP-CSI-RS-ResourceSet is transmitted through different Tx beams.

A case where the repetition is configured as "OFF" is related to a Tx beam sweeping procedure of a base station.

Furthermore, the repetition parameter may be configured only with respect to CSI-RS resource sets associated with CSI-ReportConfig having the reporting of L1 RSRP or "No Report (or None)."

If a UE is configured with CSI-ReportConfig having reportQuantity configured as "cri-RSRP" or "none" and CSI-ResourceConfig (higher layer parameter resourcesForChannelMeasurement) for channel measurement does not include a higher layer parameter "trs-Info" and includes NZP-CSI-RS-ResourceSet configured (repetition=ON) as a higher layer parameter "repetition", the UE may be configured with only the same number of ports (1-port or 2-port) having a higher layer parameter "nrofPorts" with respect to all CSI-RS resources within the NZP-CSI-RS-ResourceSet.

More specifically, CSI-RS uses are described. If a repetition parameter is configured in a specific CSI-RS resource set and TRS_info is not configured, a CSI-RS is used for beam management.

Furthermore, if a repetition parameter is not configured and TRS_info is configured, a CSI-RS is used for a tracking reference signal (TRS).

Furthermore, if a repetition parameter is not configured and TRS_info is not configured, a CSI-RS is used for CSI acquisition.

FIG. 14 is a diagram illustrating an example of a DL BM procedure using a CSI-RS.

FIG. 14(*a*) illustrates an Rx beam determination (or refinement) procedure of a UE. FIG. 14(*b*) indicates a Tx beam determination procedure of a base station.

Furthermore, FIG. 14(*a*) corresponds to a case where the repetition parameter is configured as "ON", and FIG. 14(*b*) corresponds to a case where the repetition parameter is configured as "OFF."

An Rx beam determination process of a UE is described with reference to FIGS. 14(*a*) and 15.

FIG. 15 is a flowchart illustrating an example of a received beam determination process of a UE.

The UE receives, from a base station, an NZP CSI-RS resource set IE including a higher layer parameter repetition through RRC signaling (S610).

In this case, the repetition parameter is configured as "ON."

Furthermore, the UE repeatedly receives a resource(s) within a CSI-RS resource set configured as a repetition "ON" in different OFDM symbols through the same Tx beam (or DL spatial domain transmission filter) of the base station (S620).

Accordingly, the UE determines its own Rx beam (S630).

In this case, the UE omits a CSI report or transmits, to the base station, a CSI report including a CRI/L1-RSRP (S640).

In this case, reportQuantity of the CSI report config may be configured as "No report (or None)" or "CRI+L1-RSRP."

That is, if a repetition "ON" is configured, the UE may omit a CSI report. Alternatively, the UE may report ID information (CRI) for a beam pair-related preference beam and a corresponding quality value (L1-RSRP).

A Tx beam determination process of a base station is described with reference to FIGS. 14(*b*) and 16.

FIG. 16 is a flowchart illustrating an example of a method of determining, by a base station, a transmission beam.

A UE receives, from a base station, an NZP CSI-RS resource set IE including a higher layer parameter repetition through RRC signaling (S710).

In this case, the repetition parameter is configured as "OFF", and is related to a Tx beam sweeping procedure of the base station.

Furthermore, the UE receives resources within the CSI-RS resource set configured as the repetition "OFF" through different Tx beams (DL spatial domain transmission filters) of the base station (S720).

Furthermore, the UE selects (or determines) the best beam (S740), and reports an ID for the selected beam and related quality information (e.g., L1-RSRP) to the base station (S740).

In this case, reportQuantity of the CSI report config may be configured as "CRI+L1-RSRP."

That is, the UE reports a CRI and corresponding L1-RSRP to the base station if a CSI-RS is transmitted for BM.

FIG. 17 is a diagram illustrating an example of resource allocation in time and frequency domains related to the operation of FIG. 14.

That is, it may be seen that if the repetition "ON" has been configured in a CSI-RS resource set, a plurality of CSI-RS resources is repeatedly used by applying the same Tx beam, and if a repetition "OFF" has been configured in the CSI-RS resource set, different CSI-RS resources are transmitted through different Tx beams.

DL BM-Related Beam Indication

A UE may be RRC-configured with a list of a maximum of M candidate transmission configuration indication (TCI) states for an object of at least quasi co-location (QCL) indication. In this case, M may be 64.

Each of the TCI states may be configured as one RS set.

Each ID of a DL RS for at least a spatial QCL purpose (QCL Type D) within the RS set may refer to one of DL RS types, such as an SSB, a P-CSI RS, an SP-CSI RS, and an A-CSI RS.

The initialization/update of an ID of a DL RS(s) within the RS set used for the at least spatial QCL purpose may be performed through at least explicit signaling.

Table 9 illustrates an example of a TCI-State IE.

The TCI-State IE associates one or two DL reference signals (RS) with a corresponding quasi co-location (QCL) type.

channel on which another symbol on the same antenna port is carried. If the properties of a channel on which a symbol on one antenna port is carried can be derived from a channel on which a symbol on another antenna port is carried, the two antenna ports may be said to have a quasi co-located or quasi co-location (QC/QCL) relation.

In this case, the properties of the channel includes one or more of delay spread, Doppler spread, a frequency shift, average received power, received timing, and a spatial RX parameter. In this case, the spatial Rx parameter means a spatial (reception) channel property parameter, such as an angle of arrival.

In order to decode a PDSCH according to a detected PDCCH having intended DCI with respect to a corresponding UE and a given serving cell, a UE may be configured with a list of up to M TCI-State configurations within higher layer parameter PDSCH-Config. The M depends on a UE capability.

Each of the TCI-States includes a parameter for configuring a quasi co-location relation between one or two DL reference signals and the DM-RS port of a PDSCH.

The quasi co-location relation is configured as a higher layer parameter qcl-Type1 for a first DL RS and a higher layer parameter qcl-Type2 (if configured) for a second DL RS.

TABLE 9

```
-- ASN1START
-- TAG-TCI-STATE-START
TCI-State::=            SEQUENCE {
    tci-StateId             TCI-StateId,
    qcl-Type1               QCL-Info,
    qcl-Type2               QCL-Info
    ...
}
QCL-Info ::=            SEQUENCE {
    cell                    ServCellIndex
    bwp-Id                  BWP-Id
    referenceSignal             CHOICE {
        csi-rs                  NZP-CSI-RS-ResourceId,
        ssb                     SSB-Index
    },
    qcl-Type                ENUMERATED {typeA, typeB, typeC, typeD},
    ...
}
-- TAG-TCI-STATE-STOP
-- ASN1STOP
```

In Table 9, the bwp-Id parameter indicates a DL BWP where an RS is located. The cell parameter indicates a carrier where an RS is located. The reference signal parameter indicates a reference antenna port(s) that becomes the source of a quasi co-location for a corresponding target antenna port(s) or a reference signal including the reference antenna port(s). A target antenna port(s) may be a CSI-RS, a PDCCH DMRS, or a PDSCH DMRS. For example, in order to indicate QCL reference RS information for an NZP CSI-RS, a corresponding TCI state ID may be indicated in NZP CSI-RS resource configuration information. Furthermore, for example, in order to indicate QCL reference information for a PDCCH DMRS antenna port(s), a TCI state ID may be indicated in a CORESET configuration. Furthermore, for example, in order to indicate QCL reference information for a PDSCH DMRS antenna port(s), a TCI state ID may be indicated through DCI.

Quasi-Co Location (QCL)

An antenna port is defined so that a channel on which a symbol on an antenna port is carried is inferred from a In the case of the two DL RSs, QCL types are not the same regardless of whether reference is the same DL RS or different DL RSs.

A quasi co-location type corresponding to each DL RS is given by a higher layer parameter qcl-Type of QCL-Info, and may take one of the following values:

"QCL-TypeA": {Doppler shift, Doppler spread, average delay, delay spread}
"QCL-TypeB": {Doppler shift, Doppler spread}
"QCL-TypeC": {Doppler shift, average delay}
"QCL-TypeD": {Spatial Rx parameter}

For example, if a target antenna port is a specific NZP CSI-RS, it may be indicated/configured that corresponding NZP CSI-RS antenna ports have been QCLed with a specific TRS from a QCL-Type A viewpoint and with a specific SSB from a QCL-Type D viewpoint. A UE configured with such an indication/configuration may receive a corresponding NZP CSI-RS by using Doppler, delay value measured in a QCL-TypeA TRS, and may apply, to the reception of the corresponding NZP CSI-RS, an Rx beam used for the reception of a QCL-TypeD SSB.

The UE receives an activation command used to map up to eight TCI states to the codepoint of a DCI field "Transmission Configuration Indication."

Beam Failure Detection (BFD) and Beam Failure Recovery (BFR) Procedure

A beam failure detection and beam failure recovery procedure is described below.

In a beamformed system, a radio link failure (RLF) may frequently occur due to the rotation, movement or beam blockage of a UE.

Accordingly, in order to prevent a frequent RLF from occurring, BFR is supported in NR.

BFR is similar to a radio link failure recovery procedure, and may be supported if a UE is aware of a new candidate beam(s).

If the active TCI-state for the PDCCH includes two RSs, the UE expects that one RS has QCL-TypeD and will use one RS for radio link monitoring. In this case, the UE does not expect that both the RSs will have QCL-TypeD.

The UE does not use an aperiodic RS for radio link monitoring.

Table 10 below illustrates an example of an RadioLinkMonitoringConfig IE.

The RadioLinkMonitoringConfig IE is used to configure radio link monitoring for the detection of a beam failure and/or a cell radio link failure.

TABLE 10

```
-- ASN1START
-- TAG-RADIOLINKMONITORINGCONFIG-START
RadioLinkMonitoringConfig ::=         SEQUENCE {
    failureDetectionResourcesToAddModList       SEQUENCE
(SIZE(1..maxNrofFailureDetectionResources)) OF RadioLinkMonitoringRS
        OPTIONAL, -- Need N
    failureDetectionResourcesToReleaseList       SEQUENCE
(SIZE(1..maxNrofFailureDetectionResources)) OF RadioLinkMonitoringRS-Id
        OPTIONAL,-- Need N
    beamFailureInstanceMaxCount                  ENUMERATED {n1, n2, n3, n4, n5,
n6, n8, n10}                                     OPTIONAL, -- Need S
    beamFailureDetectionTimer                    ENUMERATED {pbfd1, pbfd2,
pbfd3, pbfd4, pbfd5, pbfd6, pbfd8, pbfd10}       OPTIONAL, -- Need R
    ...
}
RadioLinkMonitoringRS ::=             SEQUENCE {
    radioLinkMonitoringRS-Id              RadioLinkMonitoringRS-Id,
    purpose                               ENUMERATED {beamFailure, rlf, both},
    detectionResource                     CHOICE {
        ssb-Index                             SSB-Index,
        csi-RS-Index                          NZP-CSI-RS-ResourceId
    },
    ...
}
-- TAG-RADIOLINKMONITORINGCONFIG-STOP
-- ASN1STOP
```

For convenience of understanding, (1) a radio link monitoring procedure and (2) a link recovery procedure are first described in brief.

Radio Link Monitorinq

Downlink radio link quality of a primary cell is monitored by a UE for the purpose of indicating an out-of-sync or in-sync state for higher layers.

A cell used in the present disclosure may also be represented as a component carrier, a carrier, a BW, etc.

A UE does not need to monitor downlink radio link quality in a DL BWP other than an active DL BWP on a primary cell.

The UE may be configured with respect to each DL BWP of SpCell having a set of resource indices through a corresponding set of (higher layer parameter) RadioLinkMonitoringRS for radio link monitoring by a higher layer parameter failureDetectionResources.

A higher layer parameter RadioLinkMonitoringRS having a CSI-RS resource configuration index (csi-RS-Index) or an SS/PBCH block index (ssb-Index) is provided to the UE.

If RadioLinkMonitoringRS is not provided to a UE and the UE is provided with a TCI-state for a PDCCH including one or more RSs including one or more of a CSI-RS and/or an SS/PBCH block, if an active TCI-state for the PDCCH includes only one RS, the UE uses, for radio link monitoring, an RS provided for the active TCI-state for the PDCCH.

In Table 10, the beamFailureDetectionTimer parameter is a timer for beam failure detection. The beamFailureInstanceMaxCount parameter indicates that a UE triggers beam failure recovery after how many beam failure events.

The value n1 corresponds to one beam failure instance, and the value n2 corresponds to two beam failure instances. If a network reconfigures a corresponding field, a UE resets a counter related to on-goingbeamFailureDetectionTimer and beamFailureInstanceMaxCount.

If a corresponding field is not present, the UE does not trigger beam failure recovery.

Table 11 illustrates an example of an BeamFailureRecoveryConfig IE.

The BeamFailureRecoveryConfig IE is used to configure, in a UE, RACH resources and candidate beams for beam failure recovery in a beam failure detection situation.

TABLE 11

```
-- ASN1START
-- TAG-BEAM-FAILURE-RECOVERY-CONFIG-START
BeamFailureRecoveryConfig ::=          SEQUENCE {
    rootSequenceIndex-BFR              INTEGER (0..137)
    rach-ConfigBFR                     RACH-ConfigGeneric
    rsrp-ThresholdSSB                  RSRP-Range
    candidateBeamRSList                      SEQUENCE
(SIZE(1..maxNrofCandidateBeams)) OF PRACH-ResourceDedicatedBFR
    OPTIONAL, -- Need M
    ssb-perRACH-Occasion               ENUMERATED {oneEighth, oneFourth,
oneHalf, one, two, four, eight, sixteen}   OPTIONAL, -- Need M
    ra-ssb-OccasionMaskIndex           INTEGER (0..15)
    recoverySearchSpaceId              SearchSpaceId
    ra-Prioritization                  RA-Prioritization
    beamFailureRecoveryTimer           ENUMERATED {ms10, ms20, ms40,
ms60, ms80, ms100, ms150, ms200}       OPTIONAL, -- Need M
    ...
}
PRACH-ResourceDedicatedBFR ::=              CHOICE {
    ssb                                BFR-SSB-Resource,
    csi-RS                             BFR-CSIRS-Resource
}
BFR-SSB-Resource ::=                   SEQUENCE {
    ssb                                SSB-Index,
    ra-PreambleIndex                   INTEGER (0..63),
    ...
}
BFR-CSIRS-Resource ::=                 SEQUENCE {
    csi-RS                             NZP-CSI-RS-ResourceId,
    ra-OccasionList                    SEQUENCE (SIZE(1..maxRA-
OccasionsPerCSIRS)) OF INTEGER (0..maxRA-Occasions-1) OPTIONAL, --
Need R
    ra-PreambleIndex                   INTEGER (0..63)
    ...
}
-- TAG-BEAM-FAILURE-RECOVERY-CONFIG-STOP
-- ASN1STOP
```

In Table 11, the beamFailureRecoveryTimer parameter is a parameter indicating a timer for beam failure recovery, and a value thereof may be set as ms. The candidateBeamRSList parameter indicates a list of reference signals (CSI-RSs and/or SSBs) for identifying random access (RA) parameters associated with candidate beams for recovery.

The RecoverySearchSpaceId parameter indicates a search space used for a BFR random access response (RAR).

When radio link quality is poorer than a threshold value Qout for all resources within a set of resources for radio link monitoring, the physical layer of a UE indicates out-of-sync through a higher layer in frames in which radio link quality is evaluated.

When radio link quality for a given resource within a resource set for radio link monitoring is better than a threshold value Qin, the physical layer of the UE indicates in-sync through a higher layer in a frame in which radio link quality is evaluated.

Link Recovery Procedure

With respect to a serving cell, a UE is provided with a q0 set of periodic CSI-RS resource configuration indices by a higher layer parameter failureDetectionResources and a q1 set of periodic CSI-RS resource configuration indices and/or SS/PBCH block indices by candidateBeamRSList for radio link quality measurement on a serving cell.

If a UE is not provided with failureDetectionResources, the UE determines the q0 set to include an SS/PBCH block index and a periodic CSI-RS resource configuration index having the same value as an RS index within an RS set indicated by a TCI state for each control resource set used for its own PDCCH monitoring.

A threshold value Qout_LR corresponds to a default value of a higher layer parameter rlmInSyncOutOfSyncThreshold and a value provided by a higher layer parameter rsrp-ThresholdSSB.

The physical layer of the UE evaluates radio link quality based on the q0 set of a resource configuration for the threshold Qout_LR.

With respect to the set q0, the UE evaluates radio link quality based on only periodic CSI-RS resource configuration and SSBs quasi co-located with the DM_RS reception of a PDCCH, which is monitored by the UE.

The UE applies a Qin_LR threshold value to an L1-RSRP measurement value obtained from an SS/PBCH block.

After scaling each CSI-RS received power into a value provided by powerControlOffsetSS, the UE applies the Qin_LR threshold value to the L1-RSRP measurement value obtained with respect to the CSI-RS resource.

The physical layer of the UE provides indication to a higher layer when radio link quality of all corresponding resource configurations within a set used for the UE to evaluate the radio link quality is poorer than the threshold value Qout_LR.

The physical layer provides notification to a higher layer when the radio link quality is poorer than the threshold Qout_LR having periodicity determined as a maximum value between the shortest periodicity of an SS/PBCH block and 2 msec in a periodic CSI-RS configuration or in the q0 set used for the UE to evaluate the radio link quality.

In response to a request from a higher layer, the UE provides the higher layer with a periodic CSI-RS configuration index and/or SS/PBCH block index from the q1 set and a corresponding L1-RSRP measurement value equal to or identical with a corresponding threshold value.

A UE may be provided with a control resource set through a link with a search space set provided by recoverySearchSpaceId in order to monitor a PDCCH in the control resource set.

If the UE is provided with recoverySearchSpaceId, the UE does not expect that another search space will be provided in order to monitor a PDCCH in a control resource set associated with a search space provided by recoverySearchSpaceId.

The aforementioned beam failure detection (BFD) and beam failure recovery (BFR) procedure is subsequently described.

When a beam failure is detected on a serving SSB or a CSI-RS(s), a beam failure recovery procedure used to indicate a new SSB or CSI-RS for a serving base station may be configured by RRC.

RRC configures BeamFailureRecoveryConfig for a beam failure detection and recovery procedure.

FIG. 18 is a flowchart illustrating an example of a beam failure recovery procedure.

The BFR procedure may include (1) a beam failure detection step S1410, (2) a new beam identification step S1420, (3) a beam failure recovery request (BFRQ) step S1430 and (4) the step S1440 of monitoring a response to BFRQ from a base station.

In this case, a PRACH preamble or a PUCCH may be used for the step (3), that is, for BFRQ transmission.

The step (1), that is, the beam failure detection, is more specifically is described.

When the block error rates (BLERs) of all serving beams are a threshold or more, this is called a beam failure instance.

RSs(qo) to be monitored by a UE is explicitly configured by RRC or is implicitly determined by a beam RS for a control channel.

The indication of a beam failure instance is periodic through a higher layer, and an indication interval is determined by the lowest periodicity of beam failure detection (BFD) RSs.

If evaluation is lower than a beam failure instance BLER threshold, an indication through a higher layer is not performed.

If N consecutive beam failure instances occur, a beam failure is declared.

In this case, N is a NrofBeamFailureInstance parameter configured by RRC.

1-port CSI-RS and SSB is supported for a BFD RS set.

Next, the step (2), that is, new beam indication is described.

A network NW may configure one or multiple PRACH resources/sequences for a UE.

A PRACH sequence is mapped to at least one new candidate beam.

The UE selects a new beam among candidate beams each having L1-RSRP set to be equal to or higher than a threshold set by RRC, and transmits a PRACH through the selected beam. In this case, which beam is selected by the UE may be a UE implementation issue.

Next, the steps (3) and (4), that is, BFRQ transmission and the monitoring of a response to BFRQ are is described.

A UE may be configured with a dedicated CORESET by RRC in order to monitor time duration of a window and a response to BFRQ from a base station.

The UE starts monitoring after 4 slots of PRACH transmission.

The UE assumes that the dedicated CORESET has been spatially QCLed with the DL RS of a UE-identified candidate beam in a beam failure recovery request.

If a timer expires or the number of PRACH transmissions reaches a maximum number, the UE stops the BFR procedure.

In this case, a maximum number and timer of PRACH transmissions is configured by RRC.

Slot Aggregation in NR

In Rel-15 new ratio (NR), a method of increasing reliability by repetitively transmitting one transport block (TB) to one layer in a plurality of contiguous slots has been standardized as described in a predefined rule (e.g., 3GPP TS 38.214, 5.1.2.1., 6.1.2.1.) with respect to the transmission of a physical downlink shared channel (PDSCH) and a physical uplink shared channel (PUSCH), that is, physical channels capable of transmitting data and control information. In this case, each of aggregationFactorDL and aggregationFactorUL may have one value of {2,4,8} (refer to 3GPP TS 38.331). That is, the same data may be repeatedly transmitted in contiguous 2 slots, 4 slots, or 8 slots.

If a UE is configured with aggregationFactorDL>1, the same symbol allocation may also be applied to aggregationFactorDL contiguous slots. The UE may expect that a TB is repeated within each symbol allocation within the AggregationFactorDL contiguous slots and a PDSCH will be limited to a single transmission layer. A redundancy version to be applied to an n-th transmission occasion of the TB may be determined according to Table 12.

Table 12 illustrates a redundancy version applied when aggregationFactorDL>1.

TABLE 12

| $rv_{id}$ indicated by | $rv_{id}$ applied to an $n^{th}$ transmission occasion | | | |
|---|---|---|---|---|
| DCI that schedules a PDSCH | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Table 13 illustrates a redundancy version when aggregationFactorUL>1.

TABLE 13

| $rv_{id}$ indicated by | $rv_{id}$ applied to an $n^{th}$ transmission occasion | | | |
|---|---|---|---|---|
| DCI that schedules a PUSCH | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Furthermore, in NR, the same uplink control information (UCI) may be repeatedly transmitted in a plurality of contiguous slots (in which available UL resource is present) with respect to a physical uplink control channel (PUCCH), that is, a channel in which uplink control information is transmitted, as described in a predefined rule (e.g., 3GPP TS 38.213, 9.2.6.).

As described above, if a multi-slot PUSCH in which repetitive transmissions for a TB are performed and/or a multi-slot PUCCH in which repetitive transmissions for UCI are performed is configured and/or indicated, when a collision occurs between a PUSCH and/or PUCCH resource and another PUCCH resource and/or PUSCH resource (transmission is indicated in the same symbol and/or slot) during repetitive transmissions in contiguous slots in which an available uplink (UL) resource is present, an operation of not transmitting the TB and/or the UCI in a corresponding slot or piggybacking (or multiplexing) and transmitting the TB and/or the UCI in a resource in which a collision has occurred, etc. is defined.

Cell/Base Station Diversity Improvement

In a resource of ultra-reliable, low latency communications (URLLC) service, to secure reliability in relation to a radio channel state is a challenging issue. In general, a requirement for a radio section of reliability are defined so that the probability that a packet of y bytes needs to be transmitted within x msec is z % or more (e.g., x=1, y=100, z=99.999). In order to satisfy such a requirement, the most difficult point is that the capability of a corresponding channel does not fundamentally satisfy the condition because the quality of a radio channel itself is too deteriorated.

The present disclosure is to solve the issue by obtaining cell and/or base station diversity in such an environment. That is, the present disclosure is to satisfy reliability requirement by allowing multiple cells, base stations and/or transmission points (TPs) to transmit the same data so that a UE can receive information from another cell and/or base station having a relatively good channel state although a radio channel for a specific cell, base station and/or TP is too deteriorated. Hereinafter, in the present disclosure, as a method of obtaining cell and/or base station diversity, cell cycling downlink transmission, cross-cell scheduling, UE demodulation, downlink control signaling for indicating the sequence of TPs, symbol muting for cell cycling, and a UE synchronization operation are sequentially described.

Cell Cycling Downlink Transmission

In downlink transmission, a plurality of cells, base stations and/or TPs may alternately perform data transmission to a specific UE in an agreed sequence between a base station and the UE. In the consecutive transmission, downlink scheduling information (downlink grant) has a characteristic in that it is signaled to a UE only once.

If this method is applied, various methods may be considered in configuring a signal to be transmitted for each cell, base station and/or TP. For example, a method of repetitively transmitting the same signal in each cell, base station and/or TP may be considered. That is, this method is a method of sequentially and repetitively transmitting, by each cell, base station and/or TP, signals to which the same channel coding has been applied from the same information bit.

And/or a method of performing coding at a lower coding rate in proportion to the number of participating cells, base stations and/or TPs from one information bit and dividing and transmitting, by the cell, the base station and/or the TP, encoded bits may also be considered. Such methods are summarized as follows.

1) Extended Channel Coding

This is a scheme of applying channel coding so that different cells, base stations and/or TPs can decode different parity bits of an encoded codeword in one decoder. The scheme may be divided as follows depending on whether an information bit is repeated.

(1) Information bit repetition channel coding: this is a method of identically setting, by different cells, base stations and/or TPs, information bits within a transport block (TB) and differently setting parity bits. By designating a parity bit to be previously used upon encoding, parity bits of different cells, base stations and/or TPs do not overlap.

This may be similar when the TB of each cell, base station and/or TP is considered as the retransmission of an incremental (IR)-hybrid automatic repeat and request (HARQ). For example, if the number of cells, base stations and/or TPs is N, parity bits generated upon encoding are divided into N groups and only the parity bit within the group is used in each cell, base station and/or TP. A device that has received a corresponding signal is aware of parity group information transmitted in each cell, base station and/or TP, and each cell, base station and/or TP may arrange parity bits within a received TB and perform decoding for each group.

(2) Information bit non-repetition channel coding: this is a method of generating, by different cells, base stations and/or TPs, one group TB by grouping TBs and performing channel coding based on a group TB size. The corresponding scheme has an advantage in that a channel coding gain is the greatest and has a disadvantage in that decoding is possible only when all the TBs of each cell, base station and/or TP are received.

2) Separated Channel Coding (1) Repetition-based LLR combining: this is a scheme for applying, by different cells, base stations and/or TPs, a TB having the same size and repeatedly transmitting the same TB. A device that has received a corresponding signal obtains a log likelihood ratio (LLR) value by independently performing a process prior to decoding. The sum value of computed LLR values may be used as an input value for one decoder.

(2) Hard value combining: this is a scheme for applying, different cells, base stations and/or TPs, a TB having the same size and repeatedly transmitting the same TB. Furthermore, the different cells, base stations and/or TPs independently decode received TBs and determine that the reception of signals is successful when succeeding in the decoding any one of the TBs of each cell, base station and/or TP.

Cross-Cell Scheduling

A network (or base station) schedules scheduling information for a plurality of contiguous subframes in the first subframe only once. In downlink transmission in the plurality of contiguous subframes, a plurality of cells, base stations and/or TPs participates in the transmission.

In the application of cross-cell scheduling, information for whether to perform downlink scheduling on a plurality of contiguous subframes may be previously signaled through a layer 2 and/or layer 3 message or may be transmitted to a UE through a layer 1 message along with downlink scheduling information. And/or if a UE can be previously aware that URLLC information will be transmitted, this information may be omitted.

In the application of cross-cell scheduling, a rule by which a UE does not perform a behavior (e.g., blind decoding) of finding a DL grant during contiguous N subframes after receiving the DL grant in a specific subframe may be defined, agreed and/or configured.

FIGS. 19 and 20 illustrate examples of cross-cell scheduling. FIG. 19 illustrates an example in which a resource scheduled in the first subframe continues for a plurality of contiguous subframes. FIG. 20 illustrates another example in which a resource scheduled in the first subframe is hopped according to a predetermined rule during a plurality of contiguous subframes. If resource hopping occurs, there is an advantage in that a higher frequency diversity gain can be obtained in the situation in which channel quality measurement for multiple cells is not sufficiently handled. If both the case where resource hopping occurs and the case where resource hopping does not occur are supported, signaling related to the hopping may be indicated for a UE as physical layer, layer 2, and/or, layer 3 information.

In the description of the cross-cell scheduling method, a basic unit in which transmission is switched between cells, base stations and/or TPs is assumed to be a subframe, but is not limited thereto. For example, a scheme for switching transmission in a plurality of symbol group units is possible. FIG. 21 illustrates a scheme for grouping a plurality of TPs by three symbols and alternately performing transmission.

In the present disclosure, for convenience of description, a unit time (e.g., a subframe, N symbols) in which each cell, base station and/or TP alternately performs transmission for each base station is called a time unit (TU).

UE Demodulation Behavior

UEs that have received downlink allocation information for contiguous TUs independently use reference signals transmitted in TUs in the demodulation of downlink data channels. An integrated estimation scheme (e.g., channel interpolation techniques) is not applied between the TUs in channel estimation.

A UE demodulation behavior may assume that a reference signal is transmitted in each TU. In this case, since different cells, base stations and/or TPs perform transmission in different TUs, there is a restriction in that channel estimation independently occurs. FIG. 22 illustrates an example in which 1 TU=three symbols. As in FIG. 22, if a reference signal is transmitted in a symbol 3, 6, 9, a channel estimation value using a reference signal in the symbol 3 is used for the demodulation of {1, 2} symbols. Likewise, a channel estimation value using a reference signal in the symbol 9 with respect to symbol 6, {7, 8} symbols is used with respect to {4, 5} symbols. In this case, upon channel estimation, a channel interpolation scheme may not be applied to reference signals transmitted in each TU.

DL Control Signaling for Indicating the Sequence of TPs

A network (or base station) may signal, to a UE, one or more of pieces of the following information (a) to (b) with respect to a plurality of cells, base stations and/or TPs which will participate in downlink data transmission.

(a) cell identifier (ID), base station ID and/or TP ID information transmitted in each TU (b) physical resource location information and/or sequence information of a reference signal transmitted in each TU (c) indicator of quasi co-location (QCL) with other reference signals transmitted in each TU with respect to a reference signal (transmitted in a serving cell)

Physical resource locations (time and/or frequency) and/or sequences corresponding to different cell IDs and/or TP IDs may be used because reference signals transmitted in TUs are transmitted in different cells and/or TP. Accordingly, in order to receive the reference signals and perform channel estimation, a UE may need to signal the information. For example, as in (a), a participating cell ID and/or TP ID may be directly transmitted. And/or as in (b), the scrambling ID of a reference signal may be transmitted. In this case, a network (or base station) may notify the UE of scrambling ID set information of reference signals consecutively transmitted through a layer 1, layer 2 and/or layer 3 control message. And/or as in (c), by indicating whether QCL is performed between reference signals or between antenna ports, whether the same base station, cell and/or TP participates in transmission in each TU may be notified.

In applying the proposal, only information for reference signals except information for the first TU may be subsequently signaled because a cell ID and/or TP ID regulated for a cell and/or a TP (e.g., a serving cell) that provides a DL grant and a scrambling ID for a reference signal can be used in the first TU.

Symbol Muting for Cell Cycling

A base station, a cell and/or a TP that transmits contiguous TUs may mute a symbol at a TU boundary point.

As Example 1, upon N consecutive TU transmission, the last symbols of the $1^{st}$ to $(N-1)^{th}$ TUs may be muted.

As Example 2, upon N consecutive TU transmission, the first symbols of the $2^{nd}$ to $N^{th}$ TUs may be muted.

This method corresponds to contents proposed because interference may occur due to a collision between symbols at a TU boundary because time synchronization is different for each TU if a UE receives signals from base stations physically located at different distance.

The muting operation may be variously interpreted as transmission omission for a specific physical signal or channel, or a puncturing operation and/or a rate matching operation for resource elements corresponding to a symbol corresponding to a specific physical channel.

FIG. 23 illustrates an example in which the last symbol of a data channel is punctured or rate-matched as in Example 1.

FIG. 24 illustrates an example in which the transmission of a control channel transmitted in the first symbol of a subframe which is consecutively and subsequently transmitted is omitted in a TP1 in which the corresponding subframe is transmitted, as in Example 2.

UE Synchronization

Method 1: a network (or base station) may transmit, to a UE, a list of base stations, cells and/or TPs having the possibility that it can perform consecutive transmission through a layer 2 and/or layer 3 message. The UE that has received the corresponding message may previously store configuration values for making time and/or frequency synchronization in reparation for a case where base stations, cells and/or TPs included in the corresponding list will perform consecutive transmission.

Method 2: when receiving a data channel transmitted in each TU, a UE may adjust time and/or frequency synchronization for each TU by using a reference signal transmitted in the corresponding TU.

In Methods 1 and 2, time and/or frequency synchronization need to be separately performed because different base stations, cells and/or TPs are transmitted in different TUs. To this end, Method 1 is a scheme for previously providing notification of a corresponding base station, cell and/or TP candidate group so that a synchronization signal can be received. Method 2 is a scheme for performing an adjustment operation on a difference between synchronizations compared to a previous base station, cell and/or TP by using a reference signal transmitted in a corresponding TU.

Methods 1 and 2 may be used separately or together. If the methods are used together, Method 2 may be used for fine adjustment for synchronization.

The present disclosure has been described based on a downlink shared channel (PDSCH), but may also be applied to an uplink channel (e.g., a PUSCH, a PUCCH, or a PRACH) in addition to a physical downlink control channel (PDCCH).

In the present disclosure, transmission at different base stations, cells and/or TPs physically spaced apart from one another, but the present disclosure is not limited thereto. For example, the present disclosure may also be applied to transmission in different panels and/or beams in the same base station. In the present disclosure, if multiple frequency bands (carriers) are operated in base stations physically implemented at the same location, the method of the present disclosure may be applied by operating each frequency band as an independent logical cell. That is, the present disclosure may be extended to a technology for cyclic transmission in an agreed sequence at different carriers in order to obtain a frequency diversity gain. Likewise, the present disclosure may also be extended to different carriers of different base stations, cells and/or TPs.

In the present disclosure, "/" may mean "and" or "or" depending on context. For example, in the present disclosure, "A/B" may be interpreted as the same meaning as "includes at least one of A or B." In the present disclosure, an idea is described based on a PDSCH, but is not limited thereto. The same and/or similar method may also be applied to a PDCCH configured in a plurality of time units (TU).

In the proposed method, one data packet (e.g., TB, code block group (CBG)) configured in a specific unit is repetitively transmitted across several time units (TUs), but a transmission source (e.g., TP, beam or panel) is different each TU or TU group so that a transmission source is different for each TU (group) in addition to time diversity and combining diversity by repetitive transmission and a QCL reference (or source) necessary for (fine synchronization and) channel estimation by a UE is different for each TU (or TU group).

In other words, the present disclosure proposes a method of obtaining time diversity and combining diversity and enabling more accurate channel estimation if one data packet is repeatedly transmitted across multiple TUs in the proposed methods.

Hereinafter, the present disclosure proposes a method of mapping a plurality of QCL references and/or transmission sources in a TU (or TU group) unit. In particular, the present disclosure proposes a method and/or a rule for mapping a plurality of transmission sources and TUs based on a total number N of scheduled TUs and a total number M of transmission sources (a total number of QCL references and/or a total number of TCIs).

Hereinafter, the present disclosure assumes a TU=a slot (or slot group), for convenience of description, but is not limited thereto. It is evident that the present disclosure may also be applied to a case where a TU is configured in a symbol (or symbol group) level. Alternatively, in the present disclosure, a TU (or TU group) may be defined, agreed and/or configured in various units, such as a slot (or slot group) and one or more symbols. Furthermore, information for such a unit may be separately signaled to a UE. Furthermore, in the present disclosure, a term "time unit (TU)" may be used as various terms, such as a transmission occasion and a repetition occasion and a transmission unit.

Prior to the description of a detailed method, a representative information exchange and/or operation between a base station and a UE if the present disclosure is applied, is as follows.

A base station may configure and/or indicate, in a UE, multi-TU PDSCH transmission and a TU group configuration for a corresponding multi-TU PDSCH. Next, the base station may configure and/or indicate, in the UE, QCL reference RS information to be applied (to a specific QCL parameter set) for each TU group. Next, the base station may transmit a PDSCH (and/or DMRS) by using a TRP, panel and/or beam identical with a QCL reference RS configured and/or indicated for a corresponding TU group. Next, the pieces of configuration and/or indication information may be transmitted to the UE simultaneously or sequentially through different messages.

If the base station operates as described above, the UE may receive a TU group construction configuration and/or indication for multi-TU PDSCH transmission to the base station and a corresponding multi-TU PDSCH. Next, the UE may receive (some of) QCL reference RS information to be applied (to a specific QCL parameter set) for each TU group. Next, the UE may receive multi-TU PDSCH scheduling downlink control information (DCI). In this case, the UE may also receive (some of) the QCL reference RS information to be applied (to a specific QCL parameter set) for each TU group. Next, the UE may receive the PDSCH of a corresponding TU group, assuming that (a specific) QCL parameter(s) estimated and/or obtained from QCL reference RSs indicated and/or configured for each TU group of the multi-TU PDSCH is identical with a QCL parameter(s) (of a DMRS) of a PDSCH TU group mapped to the corresponding QCL reference RS.

The present disclosure can increase a communication success probability because link quality with another TRP, panel and/or beam is not greatly deteriorated although link quality between a specific TRP, panel and/or beam and a UE is deteriorated due to the blockage of a ray and/or a beam, UE rotation, UE mobility, etc. by (repeatedly) transmitting a signal (containing the same information) through different transmission reception points (TRPs) or different panels and/or beams of the same TRP for each TU group (or TU). In other words, the present disclosure can increase a communication success probability through another TRP, panel and/or beam although link quality between a specific TRP, panel and/or beam and a UE is deteriorated due to the blockage of a ray and/or a beam, UE rotation, UE mobility, etc. by (repeatedly) transmitting a signal (containing the same information) through different TRPs, or different panels and/or beams of the same TRP for each TU group (or TU).

Hereinafter, the present disclosure proposes a method of configuring K QCL reference RSs for multiple TUs (or TU groups) (hereinafter a first embodiment), a method of configuring QCL reference RSs for each layer of a TU (hereinafter a second embodiment), and a method of mapping, to K QCL reference RSs, N TUs that configure a PDSCH (hereinafter a third embodiment).

Hereinafter, embodiments described in the present disclosure have been divided for convenience of description, and some methods and/or some configurations, etc. of any embodiment may be substituted with a method and/or configuration, etc. of another embodiment or they may be combined and applied.

First Embodiment

First, a method of configuring K QCL reference RSs for multiple TUs (or TU groups) is described.

Hereinafter, the first embodiment is divided and described as a base station operation and a UE operation, for convenience of description.

In particular, the first embodiment is divided and described as an operating method of a base station for configuring K QCL reference RSs and an operating method of a UE if a base station operates as described above.

The following methods have been divided for convenience of description, and a configuration of any method may be substituted with a configuration of another method or the configurations may be combined and applied.

First, an operation of a base station is specifically described.

The base station that has configured and/or indicated an N-TU PDSCH in a UE may divide N TUs into K TU groups according to the following proposed method(s) and may separately indicate and/or configure a QCL reference RS(s) to be applied by the UE for each TU group.

(Method 1)—(Single TCI State for Multiple QCL References)

When a base station configures TCI state(s) (through RRC) in a UE, a specific TCI state(s) may be configured as K(>1) QCL reference signals (RSs) with respect to the same QCL parameter(s). In the present disclosure, a "QCL reference RS" may mean a QCL RS or a QCL source. Furthermore, in the present disclosure, a "QCL reference RS" may be substituted with a "TCI state."

Next, if the base station allocates a multi-TU PDSCH (N>1) to the corresponding UE and attempts to transmit a TRP, panel and/or beam while changing the TRP, panel and/or beam in a TU group unit, the base station may indicate and/or configure one of TCI state(s) having the characteristic based on downlink control information (DCI). In the present disclosure, a "multi-TU PDSCH" may mean PDSCHs transmitted and received in multiple TUs.

Next, the base station may divide, into K TU groups, N TUs that configure a corresponding PDSCH previously configured in the UE or configured according to a method agreed based on a specific rule, and may transmit (k=1, ..., K) a PDSCH and PDSCH DMRS transmitted in a k-th TU group at a TRP, panel and/or beam that has transmitted a k-th QCL reference RS. In this case, a case where a k1-th QCL reference RS and a k2-th QCL reference RS (k1≠k2) overlap may be permitted.

For example, when a QCL reference RS is the same for all ks, this may indicate that this case corresponds to a case where one TRP, panel and/or beam transmits an N-TU PDSCH. For example, when a QCL reference RS is the same for all ks, this may indicate that this case corresponds to a case where an N-TU PDSCH is transmitted in one TRP, panel and/or beam.

(Method 2)—(Multi-TCI State Indication)

If a base station allocates a multi-TU PDSCH (N>1) to a corresponding UE and attempts to transmit a TRP, panel and/or beam while changing the TRP, panel and/or beam in a TU group unit, the base station may separately indicate and/or configure a TCI state indicative of a QCL reference RS to be applied for each TU group through radio resource control (RRC), a medium access control (MAC)-control element (CE) and/or downlink control information (DCI).

For example, the base station may previously configure all K TCI states through a higher layer message (e.g., RRC and/or MAC-CE), may omit TCI state indication in multi-TU PDSCH scheduling DCI or may indicate a given TCI state (not related to a TCI state that will participate in actual transmission) (Method 2-1).

And/or the base station may previously configure and/or indicate the remaining (K-D) TCI states other than a TCI state to be applied to a specific TU group, among K TCI states, through a higher layer message, and may indicate (e.g., D=1) a TCI state to be applied to the specific TU group(s) through multi-TU PDSCH scheduling DCI (Method 2-2).

In Method 2-2, for more efficient signaling, a default TCI value (e.g., a TCI value of a PDCCH that schedules a corresponding PDSCH, a TCI value of the lowest CORESET or a default TCI value set by the base station) to be used when TCI indication is omitted from scheduling DCI between the UE and the base station may be agreed, defined, regulated and/or configured. In this case, if a TRP, a panel and/or a beam corresponding to a default TCI attempts to transmit the PDSCH to the specific TU group, the TCI state indication may be omitted from the DCI. An example of the default TCI may include the TCI of a PDCCH that schedules the corresponding PDSCH or a TCI state corresponding to the lowest CORESET ID (of the latest TU) if a plurality of control resource sets (CORESETs) is configured. As an example of the specific TU group, a TU group that is first transmitted or a TU group corresponding to the lowest TU group index, among a plurality of TU groups that configure the corresponding PDSCH, may be regulated.

And/or the base station may indicate all the K TCI states through multi-TU PDSCH scheduling DCI (Method 2-3). In the method, in order to reduce DCI overhead, some of the K TCI states may be regulated and/or configured to use a default TCI state. In this case, only the remaining TCI states except a TU group(s) that will apply a default TCI state among the K TCI states may be indicated through DCI.

For example, the base station may configure and/or transmit a list of TCI states to the UE through RRC signaling. Next, the base station may group the TCI states included in the list through a MAC CE by K TCI states with respect to the UE. In this case, the grouping number K may be configured and/or determined as the number of TRPs participating in the repetition of a PDSCH. Next, the base station may indicate, in the UE, the ID of a specific group of TCI state groups through DCI. The UE may use K TCI states, included in a corresponding specific group, to receive K TU groups (or TUs).

As a detailed example (K=2), the base station may configure and/or transmit, to the UE, a list of TCI states {TCI state 00, TCI state 01, TCI state 02, TCI state 03, TCI state 04, TCI state 05 ... }. Next, the base station may transmit, to the UE, grouping information (combination 00 {TCI state 00, TCI state 01}, combination 01 {TCI state 02, TCI state 03}, combination 02 {TCI state 04, TCI state 05}, combination 03 {TCI state 06, TCI state 07} ... ). Next, the base station may indicate the combination 03 in the UE through DCI. The UE may receive a PDSCH from a first TRP by using the TCI state 06, and may receive a PDSCH from a second TRP by using the TCI state 07.

For example, the mapping of K TU groups (or TU) and K TCI states may be performed by the method of the third embodiment. Through such a method, the present disclosure may indicate multiple TCI states through DCI having a small field size. In other words, the present disclosure can reduce a DCI size for indicating TCI states although a PDSCH is transmitted and received through multiple TRPs.

In order to reduce DCI overhead in the method, a (compact) TCI state list to be used in the case of a multi-TU PDSCH separately from a TCI state list generally used in the existing PDSCH, PDCCH and/or CSI-RS may be configured through higher layer signaling. In this case, the payload size of DCI corresponding to each TCI state may be configured and/or regulated based on the size of the list.

In applying the method, a list of TCI state s to be used may be separately configured depending on the number K of TCI states indicated through DCI. For example, as K becomes great, a list configured with a smaller number of TCI states may be configured in order to reduce DCI payload as much as possible by reducing the number of candidate TCI states for each TU group (e.g., 64 TCI states for K=1 (6 bits)), 8 TCI states for K=2 (3 bits), 4 TCI states for K=3 (2 bits)).

And/or the methods may be together (or mixed or merged) used. For example, a rule by which the method of Method 2-3 is used when K is a specific value or less and to dynamically indicate TCI states through DCI is abandoned and the method of Method 2-1 or Method 2-2 is used when K is a specific value or more may be defined, agreed and/or configured.

Through the aforementioned methods, illustratively, a base station may perform the following signal exchange and/or operation. First, the base station may configure an N-TU PDSCH in a UE. Next, the base station may divide N-slots into K TU groups. Next, the base station may determine a QCL reference RS (and/or determine a TRP, panel and/or beam that will transmit a PDSCH for each TU group) for each TU group. Next, the base station may indicate, in the UE, the QCL reference RS determined for each TU group (transmitted in a TRP, a panel and/or a beam).

Accordingly, the present disclosure can increase a communication success probability through another TRP, panel and/or beam although link quality between a specific TRP, panel and/or beam and a UE is deteriorated due to the blockage of a ray and/or a beam, UE rotation, UE mobility, etc. by (repeatedly) transmitting a signal (containing the same information) through different TRPs or panels and/or beams of the same TRP for each TU group (or TU).

Hereinafter, in the present disclosure, a UE operation when the proposed methods are applied is specifically described.

Each method and/or example in the base station operation may correspond to each method and/or example of the following UE operation.

A UE for which an N-TU PDSCH is configured and/or indicated may divide N TUs into K TU groups through the following proposed method(s), and may configure a QCL reference RS(s) to be assumed for each TU group. In the present disclosure, an "N-TU PDSCH" may mean that a PDSCH is transmitted or received in N TUs.

(Method 1)—(Single TCI State for Multiple QCL References)

A UE may be configured with a TCI state list, including a TCI state(s) indicating K(>1) QCL reference RSs with respect to the same QCL parameter(s), from a base station (through a higher layer message). Next, the UE for which one of the TCI state(s) having the characteristic has been indicated through DCI that schedules a multi-TU PDSCH may divide, into K TU groups, N TUs that configure the corresponding PDSCH according to a method previously configured (through a RRC message, etc.) or agreed according to a specific rule, and may assume that a PDSCH DMRS antenna port(s) (and the PDSCH REs of a corresponding TU) transmitted in a k-th TU group has been QCLed with a k-th QCL reference RS and (with respect to a QCL parameter(s)) indicated in a TCI state (with respect to the same QCL parameter(s)) (k=1, . . . , K).

(Method 2)—(Multi-TCI State Indication)

A UE configured with the reception of a TCI state list and a multi-TU PDSCH (N>1) (through a higher layer message) may divide, into K TU groups, N TUs that configure a corresponding PDSCH according to a method previously configured (through a RRC message, etc.) or agreed according to a specific rule. The UE for which K TCI states for a corresponding PDSCH has been indicated through RRC, a MAC-CE and/or DCI may obtain information for a QCL reference RS to be applied to a K-th slot group, from the indicated K-th TCI state (k=1, . . . , K). In the method, the TCI state list may have a characteristic including only one QCL reference RS with respect to the same QCL parameter(s).

For example, the UE may be previously configured with all K TCI states through a higher layer message (e.g., RRC and/or MAC-CE) (Method 2-1). In this case, the UE may expect that it will not receive TCI state indication in DCI that schedules a multi-TU PDSCH. Alternatively, the UE may neglect TCI state indication indicating DCI that schedules a multi-TU PDSCH. That is, the UE may neglect a TCI value indicated through DCI, and may apply TCI states configured through a higher layer message.

And/or the remaining (K-D) TCI states except a TCI state to be applied to a specific TU group, among K TCI states, may be previously configured and/or indicated for the UE through a higher layer message, and a TCI state to be applied to a specific TU group(s) may be indicated for the UE through multi-TU PDSCH scheduling DCI (e.g., D=1) (Method 2-2).

In Method 2-2, for more efficient signaling, a default TCI value (e.g., a TCI value of a PDCCH that schedules a corresponding PDSCH, a TCI value of the lowest CORESET, or a default TCI value preset by a base station) to be used when TCI indication is omitted from scheduling DCI between a UE and the base station may be agreed and/or regulated. If the TCI state indication is omitted from the DCI, a PDSCH (DMRS) received from a specific TU group may be assumed to be QCLed with a QCL reference RS corresponding to a default TCI.

For example, the default TCI may be a TCI state corresponding to the lowest CORESET ID (of the latest TU) if a TCI of a PDCCH that schedules a corresponding PDSCH or a plurality of CORESET is configured. For example, the specific TU group may be regulated as a TU group that is first transmitted or a TU group corresponding to the lowest TU group index, among a plurality of TU groups that configure the corresponding PDSCH.

And/or all K TCI states may be indicated for the UE through multi-TU PDSCH scheduling DCI (Method 2-3). In the method, some of the K TCI states may be regulated and/or configured to use the default TCI state proposed in Method 2-2. In this case, only the TCI states except a TU group(s) that will apply the default TCI state among the K TCI states may be indicated through DCI.

In the method, if a (compact) TCI state list to be used in the case of a multi-TU PDSCH separately from a TCI state list generally used in the existing PDSCH, PDCCH and/or CSI-RS is configured through higher layer signaling, the payload size of DCI corresponding to each TCI state may be configured and/or regulated based on the size of the list.

In applying the method, a TCI state list to be used based on the number K of TCI states indicated through DCI may be separately configured. For example, it may be expected that as K increases, a list configured with the same or smaller number of TCI states is configured in order to reduce DCI payload as much as possible by reducing the number of candidate TCI states for each TU group (e.g., 64 TCI states for K=1 64 (6 bits), 8 TCI states for K=2 (3 bits), 4 TCI states for K=3 (2 bits))

And/or the methods may also be applied together (or mixed or merged). For example, it may be regulated that the method of Method 2-3 is used when K is a specific value or less and to dynamically indicate TCI states through DCI is abandoned and the method of Method 2-1 or Method 2-2 is used when K is a specific value or more.

Through the aforementioned methods, illustratively, a UE may perform the following signal exchange and/or operation.

The UE may obtain division information indicating that N-TUs are divided into K TU groups with respect to an N-TU PDSCH. Next, the UE may receive N-TU PDSCH scheduling DCI. Next, the UE may obtain QCL reference RS information mapped to each TU group (with respect to a specific QCL parameter) (based on configured and/or indicated information). Next, when receiving a PDSCH (and DMRS) in each TU group, the UE may assume that (a specific) QCL parameter(s) (e.g., Doppler, delay and a spatial RX parameter) estimated from the mapped QCL reference RS (antenna port) is identical with the corresponding PDSCH and a (specific) QCL parameter(s) of PDSCH DMRS antenna ports.

Accordingly, the present disclosure can increase a communication success probability through another TRP, panel and/or beam although link quality between a specific TRP, panel and/or beam and a UE is deteriorated due to the blockage of a ray and/or a beam, UE rotation, UE mobility, etc. by (repeatedly) transmitting a signal (containing the same information) through different TRP, different panels and/or beams of the same TRP for each TU group (or TU).

Second Embodiment

Next, a method of configuring a QCL reference RS for each layer of a TU is specifically described.

A method (so-called non-coherent joint transmission or independent layer joint transmission) of separately configuring and/or designating a QCL reference RS for each layer group when transmitting and receiving a plurality of layers in a PDSCH transmitted and received in one TU may also be applied along with the proposed method of the first embodiment.

When the present disclosure is applied, a representative information exchange and/or operation between a base station and a UE is as follows.

First, the base station may configure and/or indicate multi-TU PDSCH and/or DMRS group-based transmission in the UE. Furthermore, a DMRS grouping information configuration and/or indication is possible. Furthermore, a TU grouping information configuration and/or indication is possible.

Next, the base station may configure and/or indicate QCL reference RS information to be applied (to a specific QCL parameter set) for each TU group and/or each DMRS group (or layer group) in the UE. The base station may transmit a PDSCH (and DMRS) by using a TRP, panel and/or beam identical with a QCL reference RS configured and/or indicated with respect to a corresponding DMRS group of a corresponding TU group. The configuration and/or indication information may be transmitted to the UE simultaneously or sequentially through different messages.

If the base station operates as described above, the UE may receive the multi-TU PDSCH and/or DMRS group-based transmission configuration and/or indication from the base station. Furthermore, DMRS grouping information may be configured and/or indicated for the UE. Furthermore, TU grouping information may be configured and/or indicated for the UE. Next, the UE may receive (some of) QCL reference RS information to be applied (to a specific QCL parameter set) for each TU group and each DMRS group.

Next, the UE may receive multi-TU PDSCH scheduling DCI from the base station. In this case, the UE may also receive (some of) QCL reference RS information to be applied (to a specific QCL parameter set) for each TU group and each DMRS group.

Next, the UE may assume that a (specific) QCL parameter(s) estimated and/or obtained from QCL reference RSs indicated and/or configured for each DMRS group of each TU group of the multi-TU PDSCH from the base station is identical with a QCL parameter(s) of the DMRS group of a PDSCH TU group mapped to the corresponding QCL reference RS, and may receive the PDSCH of the corresponding TU group.

The present disclosure can increase a communication success probability through link quality with another TRP, panel and/or beam although link quality between a specific TRP, panel and/or beam and a UE is deteriorated due to the blockage of a ray and/or a beam, UE rotation, UE mobility, etc. by transmitting a signal through different TRPs, different panels or different beams of the same TRP for each TU group (or TU), each DMRS group, each codeword (CW) and/or each TB.

In particular, the present disclosure can increase the probability that when the same information is repeatedly transmitted for each TU, both a TB1 and a TB2 will be successfully received by a UE although a link with a specific TRP, panel and/or beam is deteriorated, by changing a TRP, panel and/or beam combination in which a TU group #1 transmits the TB1 and the TB2 and a TRP, panel and/or beam combination in which a TU group #2 transmits the TB1 and the TB2.

For example, if two TU PDSCHs are indicated and rank 4 transmission is indicated, a QCL reference RS #0 for the $1^{st}$ and $2^{nd}$ layers of a PDSCH transmitted and/or received in a first TU, a QCL reference RS #1 for the $3^{rd}$ and $4^{th}$ layers of the PDSCH transmitted and/or received in the first TU, a QCL reference RS #3 for the $1^{st}$ and $2^{nd}$ layers of a PDSCH transmitted and/or received in a second TU, and a QCL reference RS #4 for the $3^{rd}$ and $4^{th}$ layers of the PDSCH transmitted and/or received in the second TU may be separately configured and/or indicated. That is, if the first embodiment is a method of indicating a k-th QCL reference RS for a k-th TU group, the second embodiment may be a method of extending and/or changing and applying the first embodiment as a method of indicating a (k,n)-th QCL reference RS for an n-th layer group of the k-th TU group.

The following two cases may be assumed for N-TU PDSCH scheduling. One is a case where layer grouping is not changed for N TUs, and the other is a case where layer grouping can be changed in a TU or TU group unit.

If layer grouping is not changed for N TUs, the two methods may be considered assuming that M layer groups are maintained for N TUs.

For example, Method 1 of the first embodiment may be extended and/or changed. In this case, when a base station configures K*M QCL reference RSs for a specific TCI state(s) (with respect to the same QCL parameter(s)) and indicates a corresponding state through DCI, a UE may map each QCL reference RS to an m-th layer group of a k-th TU group in an agreed sequence (e.g., first, a layer group and next a TU group or first a TU group and next a layer group), and may assume the QCL reference RS as a QCL source.

And/or Method 2 of the first embodiment may be extended and/or changed. In this case, when a base station configures and/or indicates K*MTCI states for a specific N-TU PDSCH, a UE may map a QCL reference RS (for a specific QCL parameter(s)), indicated in each TCI state, to an m-th layer group of a k-th TU group in an agreed sequence (e.g., first, a layer group and next a TU group or first a TU group and next a layer group), and may assume the QCL reference RS as a QCL source.

And/or if layer grouping can be changed in a TU or TU group unit, assuming that a total number of layer groups in a k-th TU group are M(k), the following methods may be considered.

For example, Method 1 of the first embodiment may be extended and/or changed. In this case, when a base station configures $\Sigma_{k=1}^{K} M(k)$ QCL reference RSs for a specific TCI state(s) (with respect to the same QCL parameter(s)) and then indicates a corresponding state through DCI, a UE may map each QCL reference RS to an m-th layer group of a k-th TU group in an agreed sequence (e.g., first, a layer group and next a TU group or first a TU group and next a layer group), and may assume the QCL reference RS as a QCL source.

And/or Method 2 of the first embodiment may be extended and/or changed. In this case, when a base station configures and/or indicates $\Sigma_{k=1}^{K} M(k)$ TCI states for a specific N-TU PDSCH, a UE may map a QCL reference RS for (a specific QCL parameter(s)), indicated in each TCI state, to an m-th layer group of a k-th TU group in an agreed sequence (e.g., first, a layer group and next a TU group or first a TU group and next a layer group), and may assume the QCL reference RS as a QCL source.

In the application of the methods, in order to reduce signaling overhead, a rule by which only a specific set (or TCI states) of QCL reference RSs smaller than $\Sigma_{k=1}^{K} M(k)$ is indicated and/or configured and a corresponding QCL reference RS set is mapped to an m-th layer group of a k-th TU group may be predetermined. If a plurality of the rules is regulated, a base station may configure and/or indicate which one of the plurality of rules will be applied. For example, it may be assumed that only two QCL reference RS sets are configured and/or indicated. That is, it may be assumed that a QCL reference RS #0 and a QCL reference RS #1 are indicated and/or configured. Furthermore, it may be assumed that a maximum of two layer groups are permitted. In this case, the following two rules for an N-TU PDSCH may be regulated. A base station may indicate, for a UE, which method of the two rules will be applied through RRC, a MAC-CE and/or DCI.

In a rule 1 (shuffle RSs over TUs), an RS #0 for the $1^{st}$ layer groups of even-numbered TU groups, an RS #1 for the $2^{nd}$ layer groups of the even-numbered TU groups, an RS #1 for the $1^{st}$ layer groups of odd-numbered TU groups, and an RS #0 for the $2^{nd}$ layer groups of the odd-numbered TU groups may be mapped.

In a rule 2 (not shuffle RSs over TUs), an RS #0 for the $1^{st}$ layer groups of all TU groups and an RS #1 for the $2^{nd}$ layer groups of all the TU groups may be mapped.

Furthermore, for example, it may be assumed that a total of three QCL reference RS #0, 1, 2 have been indicated and/or configured. Furthermore, it may be assumed that a maximum of two layer groups are permitted. In this case, the following two rules are regulated for an N-TU PDSCH, and a base station may indicate, for a UE, which method of the two rules will be applied through RRC, a MAC-CE and/or DCI. Hereinafter, in RS #(i,j), i may mean a QCL reference RS to be applied to the $1^{st}$ layer group, and j may mean a QCL reference RS to be applied to the $2^{nd}$ layer group.

A rule1 (shuffle RSs over TUs): an RS #{0,1} for k-th TU groups, wherein (k mod 3)=0. An RS #{1,2} for the k-th TU groups, wherein (k mod 3)=1. An RS #{2,0} for the k-th TU groups, wherein (k mod 3)=2.

A rule2 (multi-TRP/beam+single TRP/beam): an RS #{0,1} for N1 TU groups, an RS #{2,2} for other N2 TU groups.

If the proposed method is applied, signaling overhead can be greatly reduced because only a small number of RSs are indicated.

Third Embodiment

Next, a method of mapping N TUs that configure a PDSCH to K QCL reference RSs (for the same QCL parameter(s)) is specifically described.

Hereinafter, the proposed method may correspond to an operation of dividing an N-TU into K TU groups (and/or an operation of configuring and/or indicating a QCL reference RS in each of the divided TU groups through mapping information) in the illustrated base station operation. And/or hereinafter, the proposed method may correspond to an operation of obtaining division information for dividing an N-TU into K TU groups with respect to an N-TU PDSCH (and/or an operation of obtaining QCL reference RS (mapping information) matched with each TU group) in the UE operation.

In order to maximize reliability, it may be preferred to configure TU groups in an equal number as much as possible based on a total number N of TUs (aggregationFactorDL) forming a PDSCH and the number K of QCL reference RSs for the same QCL parameter(s). For example, assuming that N□{2,4,8,16}, K□{1,2,3,4}, the number N_k of TUs included in a k-th TU group may be configured as follows. Values in the following table mean {N_1, . . . , N_K} in combinations of corresponding N values and K values. That is, it may be more preferred to configure N_k values (k=1, . . . K) so that a deviation between the N_k values is small as much as possible. Table 14 below illustrates an example in which the number of TUs for each TU group is configured in an equal number.

TABLE 14

|  | K = 1 | K = 2 | K = 3 | K = 4 |
| --- | --- | --- | --- | --- |
| N = 2 | {2} | {1, 1} | — | — |
| N = 4 | {4} | {2, 2} | {2, 1, 1} | {1, 1, 1, 1} |
| N = 8 | {8} | {4, 4} | {3, 3, 2} | {2, 2, 2, 2} |
| N = 16 | {16} | {8, 8} | {6, 5, 5} | {4, 4, 4, 4} |

The present disclosure may be extended and used in addition to uses for increasing reliability.

That is, the present disclosure may be used to transmit a different TB without repeatedly transmitting the same TB in each TU with respect to a multi-TU PDSCH.

In this case, different TRPs, panels and/or beams may transmit different TBs to a UE for each TU group. When such a purpose is considered, the application of a combination having a great deviation may be considered according to circumstances in addition to a combination having a small deviation between the N_k values (k=1, . . . K) as proposed above. Accordingly, a base station may configure and/or indicate a TU number distribution method (and a QCL reference RS mapping method for each TU on a corresponding distribution method) for the UE for each TU group to be applied. That is, the base station may configure and/or indicate a method of distributing the number of TUs for each TU group (and a QCL reference RS mapping method for each TU on a corresponding distribution method) for the UE.

Various methods may be present in performing TU grouping based on Table 14. If synchronization between TRPs is well performed and cell coverage is small, there may be no need for muting between TUs as described above. In such a case, time diversity may be maximized by frequently and alternately transmitting a TRP, a panel and/or a beam as much as possible. That is, a rule may be defined, agreed and/or configured so that a TU group transmitted by one TRP is transmitted at a time interval as wide as possible. An example of such a method is shown in Table 15. In Table 15, values may mean {K_1, . . . , K_N} in combinations of corresponding N values and K values. K_n may mean the index of a QCL reference RS to be applied in an n-th TU.

K_n⊂{1, . . . , K}. The proposed method of Table 15 has a characteristic in which a QCL reference RS index is sequentially (or cyclically) mapped for each TU index. The present method may be referred to as a "full shuffling method (or cyclic mapping method)", for convenience sake.

TABLE 15

|        | K = 1 | K = 2 | K = 3 | K = 4 |
|---|---|---|---|---|
| N = 2  | {1, 1} | {1, 2} | — | — |
| N = 4  | {1, 1, 1, 1} | {1, 2, 1, 2} | {1, 2, 3, 1} | {1, 2, 3, 4} |
| N = 8  | {1, 1, 1, 1, 1, 1, 1, 1} | {1, 2, 1, 2, 1, 2, 1, 2} | {1, 2, 3, 1, 2, 3, 1, 2} | {1, 2, 3, 4, 1, 2, 3, 4} |
| N = 16 | {1, 1, 1, 1, 1, 1, 1, 1, 1, 1, 1, 1, 1, 1, 1, 1} | {1, 2, 1, 2, 1, 2, 1, 2, 1, 2, 1, 2, 1, 2, 1, 2} | {1, 2, 3, 1, 2, 3, 1, 2, 3, 1, 2, 3, 1, 2, 3, 1} | {1, 2, 3, 4, 1, 2, 3, 4, 1, 2, 3, 4, 1, 2, 3, 4} |

Meanwhile, if synchronization between TRPs is not well performed and cell coverage is great, muting between TUs may be necessary as described above. In such a case, if the method of Table 15 is applied, there is a disadvantage in that a muted symbol occurs in each boundary of all TUs. Furthermore, the method of Table 15 has a disadvantage in that an implementation is difficult if a close scheduling coordination between TRPs is difficult. In such a case, a proposed method of Table 16 may be more preferred. A characteristic of the method of Table 16 is a characteristic in which a QCL reference RS change number is minimized by mapping a k-th TU group to contiguous N_k TUs. The present method may be referred to as a "sequential mapping method", for convenience sake.

TABLE 16

|        | K = 1 | K = 2 | K = 3 | K = 4 |
|---|---|---|---|---|
| N = 2  | {1, 1} | {1, 2} | — | — |
| N = 4  | {1, 1, 1, 1} | {1, 1, 2, 2} | {1, 1, 2, 3} | {1, 2, 3, 4} |
| N = 8  | {1, 1, 1, 1, 1, 1, 1, 1} | {1, 1, 1, 1, 2, 2, 2, 2} | {1, 1, 1, 2, 2, 2, 3, 3} | {1, 1, 2, 2, 3, 3, 4, 4} |
| N = 16 | {1, 1, 1, 1, 1, 1, 1, 1, 1, 1, 1, 1, 1, 1, 1, 1} | {1, 1, 1, 1, 1, 1, 1, 1, 2, 2, 2, 2, 2, 2, 2, 2} | {1, 1, 1, 1, 1, 1, 2, 2, 2, 2, 2, 3, 3, 3, 3, 3} | {1, 1, 1, 1, 2, 2, 2, 2, 3, 3, 3, 3, 4, 4, 4, 4} |

A mapping method having a form in which the advantages and disadvantages of the methods of Tables 15 and 16 are mutually supplemented may also be considered. For example, when K=2 and N=8, the QCL reference RS change number may be made smaller than that in the method of Table 15 as in {1,1,2,2,1,1,2,2}, and time diversity may be obtained compared to the method of Table 16. A characteristic of such a method is to configure a k-th TU group with a plurality of non-contiguous TU sub-groups configured in contiguous TUs. The present method may be referred to as a "hybrid mapping method", for convenience sake.

A base station may configure one of various TU group configuration methods (or QCL reference RS mapping methods) for a UE (through a RRC message, etc.) as proposed above. And/or a TU group configuration method suitable for a specific use case may be regulated. For example, upon multi-TU scheduling, the full shuffling method may be regulated to be used when a TB is repetitively transmitted (corresponding to a URLLC use case), and the sequential mapping method may be regulated to be used if a TB is not repetitively transmitted.

Likewise, a UE may be configured with one of various TU group configuration methods (or QCL reference RS mapping methods) (through a RRC message, etc.) from a base station. Or a TU group configuration method suitable for a specific use case may be regulated for the UE.

FIG. 25 is a flowchart for describing an operating method of a UE which is proposed in the present disclosure.

Referring to FIG. 25, first, a UE (1000/2000 of FIGS. 27 to 30) may receive downlink control information (DCI) that schedules downlink data in a first time unit and a second time unit (S2501). Each of the first time unit and the second time unit may include at least one of one or more slots and/or one or more symbols.

For example, the operation of receiving, by the UE, the DCI in step S2501 may be implemented by apparatuses of FIGS. 27 to 30 to be described hereinafter. For example, referring to FIG. 28, one or more processors 1020 may control one or more memories 1040 and/or one or more RF units 1060 in order to receive the DCI. The one or more RF units 1060 may receive the DCI.

Next, the UE (1000/2000 of FIGS. 27 to 30) may receive mapping information between a layer group (or layer) and a transmission configuration indication (TCI) state (S2502). And/or the UE may match a layer and a TCI state based on previously stored mapping information, without receiving mapping information between a layer group (or layer) and a TCI state.

For example, the operation of receiving, by the UE, the mapping information in step S2502 may be implemented by the apparatuses of FIGS. 27 to 30 to be described hereinafter. For example, referring to FIG. 28, the one or more processors 1020 may control the one or more memories 1040 and/or the one or more RF units 1060 in order to receive the mapping information. The one or more RF units 1060 may receive the mapping information.

Next, the UE (1000/2000 of FIGS. 27 to 30) may receive downlink data related to a first layer group (or layer) based on a first TCI state in the first time unit (S2503). The downlink data related to the first layer group may mean data received through the first layer group, among data received in the first time unit. The present disclosure may be implemented by substituting the "layer group" with a "layer."

For example, the operation of receiving, by the UE, the downlink data related to the first layer group based on the first TCI state in the first time unit in step S2503 may be implemented by the apparatuses of FIGS. 27 to 30 to be described hereinafter. For example, referring to FIG. 28, the one or more processors 1020 may control the one or more memories 1040 and/or the one or more RF units 1060 in order to receive the downlink data related to the first layer group in the first time unit. The one or more RF units 1060 may receive the downlink data related to the first layer group.

Next, the UE (1000/2000 of FIGS. 27 to 30) may receive downlink data related to a second layer group based on a second TCI state in the first time unit (S2504). The downlink data related to the second layer group may mean data received through the second layer, among the data received in the first time unit.

For example, the operation of receiving, by the UE, the downlink data related to the second layer group based on the second TCI state in the first time unit in step S2504 may be implemented by the apparatuses of FIGS. 27 to 30 to be described hereinafter. For example, referring to FIG. 28, the one or more processors 1020 may control the one or more memories 1040 and/or the one or more RF units 1060, in order to receive the downlink data related to the second layer group in the first time unit. The one or more RF units 1060 may receive the downlink data related to the second layer group.

Next, the UE (1000/2000 of FIGS. 27 to 30) may receive downlink data related to a third layer group based on a third TCI state in the second time unit (S2505). The downlink data related to the third layer group may mean data received through the third layer group, among data received in the second time unit.

For example, the operation of receiving, by the UE, the downlink data related to the third layer group based on the third TCI state in the second time unit in step S2505 may be implemented by the apparatuses of FIGS. 27 to 30 to be described hereinafter. For example, referring to FIG. 28, the one or more processors 1020 may control the one or more memories 1040 and/or the one or more RF units 1060 in order to receive the downlink data related to the third layer group in the second time unit. The one or more RF units 1060 may receive the downlink data related to the third layer group.

The mapping information may include information indicating mapping between the first layer group and the first TCI state, mapping between the second layer group and the second TCI state, and mapping between the third layer group and the third TCI state.

The TCI state may include information for a quasi co-location (QCL) reference signal and information for a QCL type. A demodulation reference signal antenna port (or demodulation reference signal antenna ports) of downlink data related to each layer group may be assumed to have a QCL relation with an antenna port of a QCL reference signal mapped to each layer group.

And/or layers included in each layer group may be determined according to a previously defined rule based on a transmission rank.

And/or layers included in each layer group may be determined by a configuration of the base station (or a specific transmission point) based on a transmission rank.

And/or the UE may receive downlink data related to a fourth layer group based on a fourth TCI state in the second time unit.

In this case, the third layer group may be the same as the first layer group, and the fourth layer group may be the same as the second layer group. In other words, the third layer group may be the same as the first layer group or the second layer group, and the fourth layer group may be the same as a layer group not identical with the third layer group among the first layer group and the second layer group. And/or the third TCI state may be the same as the first TCI state. The fourth TCI state may be the same as the second TCI state. In other words, the third TCI state may be the same as the first TCI state or the second TCI state, and the fourth TCI state may be the same as a TCI state not identical with the third TCI state among the first TCI state and the second TCI state.

The downlink data may be received from different transmission points, panels, or beams for each time unit. In the present disclosure, the "time unit" may be substituted with a time unit group. The time unit group may mean a set of time units in which data is transmitted and received from the same transmission point, panel, or beam.

And/or the UE may receive information for a plurality of TCI states.

For example, the operation of receiving, by the UE, the information for the plurality of TCI states may be implemented by the apparatuses of FIGS. 27 to 30 to be described hereinafter. For example, referring to FIG. 28, the one or more processors 1020 may control the one or more memories 1040 and/or the one or more RF units 1060 in order to receive the information for the plurality of TCI states. The one or more RF units 1060 may receive the information for the plurality of TCI states.

The operation of the UE described with reference to FIG. 25 is the same as the operations (e.g., the first embodiment to the third embodiment) of the UE described with reference to FIGS. 1 to 24, and thus other detailed description is omitted.

The aforementioned signaling and operation may be implemented by apparatuses (e.g., FIGS. 27 to 30) to be described hereafter. For example, the aforementioned signaling and operation may be processed by the one or more processors 1010, 2020 of FIGS. 27 to 30. The aforementioned signaling and operation may be stored in a memory (e.g., 1040, 2040) in the form of an instruction/program (e.g., instruction, executable code) for driving at least one processor (e.g., 1010, 2020) of FIGS. 27 to 30.

FIG. 26 is a flowchart for describing an operating method of a base station, which is proposed in the present disclosure.

Referring to FIG. 26, first, a base station (1000/2000 of FIGS. 27 to 30) may transmit, to a UE, downlink control information (DCI) that schedules downlink data in a first time unit and a second time unit (S2601). Each of the first time unit and the second time unit may include at least one of one or more slots and/or one or more symbols.

For example, the operating of transmitting, by the base station, the DC in step S2601 may be implemented by the apparatuses of FIGS. 27 to 30 to be described hereinafter. For example, referring to FIG. 28, the one or more processors 1020 may control the one or more memories 1040 and/or the one or more RF units 1060 in order to transmit the DCI. The one or more RF units 1060 may transmit the DCI to the UE.

Next, the base station (1000/2000 of FIGS. 27 to 30) may transmit mapping information between a layer group and a transmission configuration indication (TCI) state to the UE (S2602). And/or the UE may match the layer group and the TCI state based on previously stored mapping information without receiving the mapping information between the layer group and the TCI state.

For example, the operation of transmitting, by the base station, the mapping information to the UE in step S2602 may be implemented by the apparatuses of FIGS. 27 to 30 to be described hereinafter. For example, referring to FIG. 28, the one or more processors 1020 may control the one or more memories 1040 and/or the one or more RF units 1060 in order to transmit the mapping information. The one or more RF units 1060 may transmit the mapping information to the UE.

Next, the base station (1000/2000 of FIGS. 27 to 30) may transmit, to the UE, downlink data related to a first layer group based on a first TCI state in the first time unit (S2603). The downlink data related to the first layer group may mean data received through the first layer group, among data received in the first time unit.

For example, the operation of transmitting, by the base station, the downlink data related to the first layer group to the UE based on the first TCI state in the first time unit in step S2603 may be implemented by the apparatuses of FIGS. 27 to 30 to be described hereinafter. For example, referring to FIG. 28, the one or more processors 1020 may control the one or more memories 1040 and/or the one or more RF units 1060 in order to transmit the downlink data related to the first layer group in the first time unit. The one or more RF units 1060 may transmit, to the UE, the downlink data related to the first layer group.

Next, the base station (1000/2000 of FIGS. 27 to 30) may transmit, to the UE, downlink data related to a second layer group based on a second TCI state in the first time unit (S2604). The downlink data related to the second layer group may mean data received through the second layer group among the data received in the first time unit.

For example, the operation of transmitting, by the base station, the downlink data related to the second layer group to the UE based on the second TCI state in the first time unit in step S2604 may be implemented by the apparatuses of FIGS. 27 to 30 to be described hereinafter. For example, referring to FIG. 28, the one or more processors 1020 may control the one or more memories 1040 and/or the one or more RF units 1060 in order to transmit the downlink data related to the second layer group in the first time unit. The one or more RF units 1060 may transmit, to the UE, the downlink data related to the second layer group.

Next, the base station (1000/2000 of FIGS. 27 to 30) may transmit, to the UE, downlink data related to a third layer group based on a third TCI state in the second time unit (S2605). The downlink data related to the third layer group may mean data received through the third layer group among the data received in the second time unit.

For example, the operation of transmitting, by the base station, the downlink data related to the third layer group to the UE based on the third TCI state in the second time unit in step S2605 may be implemented by the apparatuses of FIGS. 27 to 30 to be described hereinafter. For example, referring to FIG. 28, the one or more processors 1020 may control the one or more memories 1040 and/or the one or more RF units 1060 in order to transmit the downlink data related to the third layer group in the second time unit. The one or more RF units 1060 may transmit, to the UE, the downlink data related to the third layer group.

The mapping information may include information indicating mapping between the first layer group and the first TCI state, mapping between the second layer group and the second TCI state, and mapping between the third layer group and the third TCI state.

The TCI state may include information for a quasi co-location (QCL) reference signal and information for a QCL type. A demodulation reference signal antenna port (or demodulation reference signal antenna ports) of downlink data related to each layer group may be assumed to have a QCL relation with an antenna port of a QCL reference signal mapped to each layer group.

And/or layers included in each layer group may be determined according to a previously defined rule based on a transmission rank.

And/or layers included in each layer group may be determined by a configuration of the base station (or a specific transmission point) based on a transmission rank.

And/or the UE may receive downlink data related to a fourth layer group based on a fourth TCI state in the second time unit.

In this case, the third layer group may be the same as the first layer group, and the fourth layer group may be the same as the second layer group. In other words, the third layer group may be the same as the first layer group or the second layer group, and the fourth layer group may be the same as a layer group not identical with the third layer group, among the first layer group and the second layer group. And/or the third TCI state may be the same as the first TCI state, and the fourth TCI state may be the same as the second TCI state. In other words, the third TCI state may be the same as the first TCI state or the second TCI state, and the fourth TCI state may be the same as a TCI state not identical with the third TCI state, among the first TCI state and the second TCI state.

The downlink data may be received from different transmission points, panels, or beams for each time unit. In the present disclosure, the "time unit" may be substituted with the time unit group. The time unit group may mean a set of time units in which data is transmitted and received from the same transmission point, panel, or beam.

And/or the base station may transmit information for a plurality of TCI states to the UE.

For example, an operation of transmitting, by the base station, the information for the plurality of TCI states to the UE may be implemented by the apparatuses of FIGS. 27 to 30 to be described hereinafter. For example, referring to FIG. 28, the one or more processors 1020 may control the one or more memories 1040 and/or the one or more RF units 1060 in order to transmit the information for the plurality of TCI states. The one or more RF units 1060 may transmit the information for the plurality of TCI states to the UE.

The operation of the UE described with reference to FIG. 26 is the same as the operations (e.g., the first embodiment to the third embodiment) of the UE described with reference to FIGS. 1 to 25, and thus other detailed description is omitted.

The aforementioned signaling and operation may be implemented by the apparatuses (e.g., FIGS. 27 to 30) to be described hereafter. For example, the aforementioned signaling and operation may be processed by the one or more processors 1010, 2020 of FIGS. 27 to 30. The aforementioned signaling and operation may be stored in a memory (e.g., 1040, 2040) in the form of an instruction/program (e.g., instruction, executable code) for driving at least one processor (e.g., 1010, 2020) of FIGS. 27 to 30.

Example of a Communication System to which the Present Disclosure is Applied

The present disclosure is not limited thereto, and the various descriptions, functions, procedures, proposals, methods and/or operating flowcharts disclosed in the present disclosure may also be applied to various fields which require wireless communication/connection (e.g., 5G) between devices.

Hereinafter, the present disclosure is more specifically illustrated with reference to drawings. In following drawings/descriptions, a reference numeral may illustrate a corresponding hardware block, software block or function block unless the same reference numeral is described otherwise.

FIG. 27 illustrates a communication system 10 to which the present disclosure is applied.

Referring to FIG. 27, the communication system 10 to which the present disclosure is applied includes a wireless device, a base station and a network. In this case, the wireless device means a device performing communication by using radio access technologies (e.g., 5G new RAT (NR)) or long term evolution (LTE)), and may be denoted as a communication/wireless/5G device. The present disclosure is not limited thereto, and the wireless device may include a robot 100a, vehicles 1000b-1 and 1000b-2, an extended reality (XR) device 1000c, a handheld device 1000d, home appliances 1000e, an Internet of Thing (IoT) device 1000f, and an AI device/server 4000. For example, the vehicle may include a vehicle having a wireless communication function, an autonomous vehicle, a vehicle capable of performing communication between vehicles, etc. In this case, the vehicle may include an unmanned aerial vehicle (UAV) (e.g., drone). The XR device includes an augmented reality (AR)/virtual reality (VR)/mixed reality (MR) device, and may be implemented in the form of a head-mounted device (HMD), a head-up display (HUD) included in a vehicle, television, a smartphone, a computer, a wearable device, a home appliance device, digital signage, a vehicle, a robot, etc. The handheld device may include a smartphone, a smart pad, a wearable device (e.g., a smart watch and smart glasses), a computer (e.g., a notebook), etc. The home appliances may include TV, a refrigerator, a washing machine, etc. The IoT device may include a sensor, a smart meter, etc. For example, the base station or the network may be implemented as a wireless device. A specific wireless device 2000a may operate as a base station/network node with respect to another wireless device.

The wireless devices 1000a to 1000f may be connected to a network 3000 through a base station 2000. An artificial intelligence (AI) technology may also be applied to the wireless devices 1000a to 1000f. The wireless devices 1000a to 1000f may be connected to the AI server 4000 over the network 300. The network 3000 may be configured using a 3G network, a 4G (e.g., LTE) network, a 5G (e.g., NR) network, etc. The wireless devices 1000a to 1000f may communicate with each other through the base station 2000/network 3000, but may directly communicate with each other (e.g. sidelink communication) without the intervention of the base station/network. For example, the vehicles 1000b-1 and 1000b-2 may directly communicate with each other (e.g. vehicle to vehicle (V2V)/vehicle to everything (V2X) communication). Furthermore, the IoT device (e.g., a sensor) may directly communicate with another IoT device (e.g., a sensor) or other wireless devices 1000a to 1000f.

Wireless communication/connection 1500a, 1500b, and 1500c may be performed between the wireless devices 1000a to 1000f/base station 2000, the base station 2000/base station 2000. In this case, the wireless communication/connection may be performed through various radio access technologies (e.g., 5G NR), such as uplink/downlink communication 1500a and sidelink communication 1500b (or D2D communication), and communication 1500c between base stations (e.g. relay, integrated access backhaul (IAB). The wireless device and the base station/wireless device, the base station and the base station may transmit/receive radio signals to one another through the wireless communication/connection 1500a, 1500b, or 1500c. For example, signals may be may be transmitted/received using the wireless communication/connection 1500a, 1500b, or 1500c through various physical channels. To this end, at least some of various configuration information configuration processes for the transmission/reception of a radio signal, various signal processing processes (e.g., channel encoding/decoding, modulation/demodulation, and resource mapping/demapping), a resource allocation process, etc. may be performed based on various proposals of the present disclosure.

Example of a Wireless Device to which the Present Disclosure is Applied

FIG. 28 illustrates a wireless device to which the present disclosure may be applied.

Referring to FIG. 28, the first wireless device 1000 and the second wireless device 2000 may transmit and receive radio signals by using various radio access technologies (e.g., LTE, NR). In this case, {the first wireless device 1000, the second wireless device 2000} may correspond to {wireless device 1000x, base station 2000} and/or {wireless device 1000x, wireless device 1000x} of FIG. 27.

The first wireless device 1000 includes the one or more processors 1020 and the one or more memories 1040, and may further include the one or more transceivers 1060 and/or the one or more antennas 1080. The processor 1020 may be configured to control the memory 1040 and/or the transceiver 1060 and to implement the description, function, procedure, proposal, method and/or operating flowchart disclosed in the present disclosure. For example, the processor 1020 may generate a first information/signal by processing information within the memory 1040, and may then transmit a radio signal including the first information/signal through the transceiver 1060. Furthermore, the processor 1020 may receive a radio signal including a second information/signal through the transceiver 1060, and may then store, in the memory 1040, information obtained by the signal processing of the second information/signal. The memory 1040 may be connected to the processor 1020, and may store various types of information related to an operation of the processor 1020. For example, the memory 1040 may store a software code, including instructions for performing some or all of processes controlled by the processor 1020 or performing the description, function, procedure, proposal, method and/or operating flowchart disclosed in the present disclosure. In this case, the processor 1020 and the memory 1040 may be a part of a communication modem/circuit/chip designed to implement a wireless communication technology (e.g., LTE or NR). The transceiver 1060 may be connected to the processor 1020, and may transmit and/or receive a radio signal through the one or more antennas 1080. The transceiver 1060 may include a transmitter and/or a receiver. The transceiver 1060 may be interchangeably used with a radio frequency (RF) unit. In the present disclosure, the wireless device may mean a communication modem/circuit/chip.

The second wireless device 2000 includes one or more processors 2020 and one or more memories 2040, and may further include one or more transceivers 2060 and/or one or more antennas 2080. The processor 2020 may be configured to control the memory 2040 and/or the transceiver 2060 and to implement the description, function, procedure, proposal, method and/or operating flowchart disclosed in the present disclosure. For example, the processor 2020 may generate a third information/signal by processing information within the memory 2040, and may then transmit a radio signal including the third information/signal through the transceiver 2060. Furthermore, the processor 2020 may receive a radio signal including a fourth information/signal through the transceiver 2060, and may then store, in the memory 2040, information obtained by the signal processing of the fourth information/signal. The memory 2040 may be connected to the processor 2020, and may store various types of information related to an operation of the processor 2020. For example, the memory 2040 may store a software code, including instructions for performing some or all of processes controlled by the processor 2020 or performing the description, function, procedure, proposal, method and/or operating flowchart disclosed in the present disclosure. In this case, the processor 2020 and the memory 2040 may be a part of a communication modem/circuit/chip designed to implement a wireless communication technology (e.g., LTE or NR). The transceiver 2060 may be connected to the processor 2020, and may transmit and/or receive a radio signal through the one or more antennas 2080. The transceiver 2060 may include a transmitter and/or a receiver. The transceiver 2060 may be interchangeably used with an RF unit. In the present disclosure, the wireless device may mean a communication modem/circuit/chip.

Hereinafter, hardware elements of the wireless devices 1000 and 2000 are more specifically described. The present disclosure is not limited thereto, and one or more protocol layers may be implemented by the one or more processors 1020, 2020. For example, the one or more processors 1020, 2020 may implement one or more layers (e.g., functional layers such as PHY, MAC, RLC, PDCP, RRC, and SDAP). The one or more processors 1020, 2020 may generate one or more protocol data units (PDUs) and/or one or more service data units (SDUs) according to the description, function, procedure, proposal, method and/or operating flowchart disclosed in the present disclosure. The one or more processors 1020, 2020 may generate a message, control information, data or information according to the description, function, procedure, proposal, method and/or operating flowchart disclosed in the present disclosure. The one or more processors 1020, 2020 may generate a signal (e.g., a baseband signal), including a PDU, an SDU, a message, control information, data or information, according to the function, procedure, proposal and/or method disclosed in the present disclosure, and may provide the signal to the one or more transceivers 1060, 2060. The one or more processors 1020, 2020 may receive a signal (e.g., a baseband signal) from the one or more transceivers 1060, 2060, and may obtain a PDU, an SDU, a message, control information, data or information according to the description, function, procedure, proposal, method and/or operating flowchart disclosed in the present disclosure.

The one or more processors 1020, 2020 may be denoted as a controller, a micro controller, a micro processor or a micro computer. The one or more processors 1020, 2020 may be implemented by hardware, firmware, software, or a combination of them. For example, one or more application-specific integrated circuits (ASICs), one or more digital signal processors (DSPs), one or more digital signal processing devices (DSPDs), one or more programmable logic devices (PLDs) or one or more field programmable gate arrays (FPGAs) may be included in the one or more processors 1020, 2020. The description, function, procedure, proposal, method and/or operating flowchart disclosed in the present disclosure may be implemented using firmware or software. The firmware or the software may be implemented to include a module, a procedure, a function, etc. The firmware or software configured to perform the description, function, procedure, proposal, method and/or operating flowchart disclosed in the present disclosure may be included in the one or more processors 1020, 2020 or may be stored in the one or more memories 1040, 2050 and driven by the one or more processors 1020, 2020. The description, function, procedure, proposal, method and/or operating flowchart disclosed in the present disclosure may be implemented using firmware or software in the form of a code, an instruction and/or a set of instructions.

The one or more memories 1040, 2050 may be connected to the one or more processors 1020, 2020, and may store various forms of data, signals, messages, information, programs, codes, indication and/or instructions. The one or more memories 1040, 2050 may be configured as a ROM, a RAM, an EPROM, a flash memory, a hard drive, a register, a cache memory, a computer-readable storage medium and/or a combination of them. The one or more memories 1040, 2050 may be positioned inside and/or outside the one or more processors 1020, 2020. Furthermore, the one or more memories 1040, 2050 may be connected to the one or more processors 1020, 2020 by using various technologies, such as a wired or wireless connection.

The one or more transceivers 1060, 2060 may transmit, to one or more other devices, user data, control information, a radio signal/channel, etc. described in the methods and/or the operating flowcharts of the present disclosure. The one or more transceivers 1060, 2060 may receive, from the one or more other devices, user data, control information, a radio signal/channel, etc. described in the description, the function, the procedure, the proposal, the method and/or the operating flowchart disclosed in the present disclosure. For example, the one or more transceivers 1060, 2060 may be connected to the one or more processors 1020, 2020, and may transmit and receive radio signals. For example, the one or more processors 1020, 2020 may control the one or more transceivers 1060, 2060 to transmit user data, control information or a radio signal to one or more other devices. Furthermore, the one or more processors 1020, 2020 may control the one or more transceivers 1060, 2060 to receive user data, control information or a radio signal from the one or more other devices. Furthermore, the one or more transceivers 1060, 2060 may be connected to the one or more antennas 1080, 2080. The one or more transceivers 1060, 2060 may be configured to transmit and receive user data, control information, a radio signal/channel, etc., described in the description, the function, the procedure, the proposal, the method and/or the operating flowchart disclosed in the present disclosure, through the one or more antennas 1080, 2080. In the present disclosure, the one or more antennas may be a plurality of physical antennas or a plurality of logical antennas (e.g., antenna ports). The one or more transceivers 1060, 2060 may convert a received radio signal/channel from an RF band signal to a baseband signal in order to process received user data, control information, a radio signal/channel, etc. by using the one or more processors 1020, 2020. The one or more transceivers 1060, 2060 may convert the user data, control information, radio signal/channel, etc., processed using the one or more processors 1020, 2020, from a baseband signal to an RF band signal. To this end, the one or more transceivers 1060, 2060 may include an (analog) oscillator and/or a filter.

Example of a Wireless Device to which the Present Disclosure is Applied

FIG. 29 illustrates another example of a wireless device to which the present disclosure is applied.

The wireless device may be implemented in various forms depending on a use-example/service (refer to FIG. 27). Referring to FIG. 29, the wireless device 1000, 2000 corresponds to the wireless device 1000, 2000 of FIG. 28, and may be configured as various elements, components, parts/units and/or modules. For example, the wireless device 1000, 2000 may include a communication unit 1100, a control unit 1200, a memory unit 1300 and additional components 1400. The communication unit may include a communication circuit 1120 and a transceiver(s) 1140. For example, the communication circuit 1120 may include the one or more processors 1020, 2020 and/or the one or more memories 1040, 2040 of FIG. 28. For example, the transceiver(s) 1140 may include the one or more transceivers 1060, 2060 and/or the one or more antennas 1080, 2080 of FIG. 28. The control unit 1200 is electrically connected to the communication unit 1100, the memory unit 1300 and the additional components 1400, and controls an overall operation of the wireless device. For example, the control unit 1200 may control an electrical/mechanical operation of the wireless device based on a program/code/instruction/information stored in the memory unit 1300. Furthermore, the control unit 1200 may transmit, through a wireless/wired interface, information stored in the memory unit 1300 to the outside (e.g., another communication device) through the communication unit 1100, or may store, in the memory unit 1300, information through a wireless/wired interface from the outside (e.g., another communication device) through the communication unit 1100.

The additional components 1400 may be variously configured depending on the type of wireless device. For example, the additional components 1400 may include at least one of a power unit/battery, an input/output (I/O) unit, a driving unit and a computing unit. The present disclosure is not limited thereto, and the wireless device may be implemented in the form of the robot (1000*a* in FIG. 27), the vehicle (1000*b*-1, 1000*b*-2 in FIG. 27), the XR device (1000*c* in FIG. 27), the handheld device (1000*d* in FIG. 27), the home appliances (1000*e* in FIG. 27), the IoT device (1000*f* in FIG. 27), a terminal for digital broadcasting, a hologram device, a public safety device, an MTC device, a medical device, a Fintech device (or financial device), a security device, a weather/environment device, the AI server/device (4000 in FIG. 27), the base station (2000 in FIG. 27), a network node, etc. The wireless device may be movable or used at a fixed place depending on a use-example/service.

In FIG. 29, all of the various elements, components, parts/units and/or modules within the wireless device 1000, 2000 may be interconnected through a wired interface or at least some thereof may be wirelessly connected through the communication unit 1100. For example, the control unit 1200 and the communication unit 1100 may be connected through wires within the wireless device 1000, 2000. The control unit 1200 and a first unit (e.g., 1300, 1400) may be wirelessly connected through the communication unit 1100. Furthermore, each of the elements, components, parts/units and/or modules within the wireless device 1000, 2000 may further include one or more components. For example, the control unit 1200 may be configured as a set of one or more processors. For example, the control unit 1200 may be configured as a set, such as communication control processors, application processors, electronic processors (ECUs), graphic processing processors, or memory control processors. Furthermore, for example, the memory unit 1300 may be configured as a random access memory (RAM), a dynamic RAM (DRAM), a read only memory (ROM), a flash memory, a volatile memory, a non-volatile memory and/or a combination of them.

FIG. 30 illustrates a handheld device to which the present disclosure is applied.

The handheld device may include a smartphone, a smart pad, a wearable device (e.g., a smart watch or a smart glasses), and a portable computer (e.g., a notebook). The handheld device may be denoted as a mobile station (MS), a user terminal (UT), a mobile subscriber station (MSS), a subscriber station (SS), an advanced mobile station (AMS) or a wireless terminal (WT).

Referring to FIG. 30, the handheld device 1000 may include an antenna unit 1080, a communication unit 1100, a control unit 1200, a memory unit 1300, a power supply unit 1400*a*, an interface unit 1400*b*, and an input/output (I/O) unit 1400*c*. The antenna unit 1080 may be configured as a part of the communication unit 1100. The blocks 1100 to 1300/1400*a* to 1400*c* correspond to the blocks 1100 to 1300/1400 of FIG. 29, respectively.

The communication unit 1100 may transmit and receive signals (e.g., data or control signals) to and from other wireless devices or base stations. The control unit 1200 may perform various operations by controlling components of the handheld device 1000. The control unit 1200 may include an application processor (AP). The memory unit 1300 may store data/parameters/programs/codes/instructions necessary for the driving of the handheld device 1000. Furthermore, the memory unit 1300 may store input/output data/information, etc. The power supply unit 1400*a* supplies power to the handheld device 1000, and may include a wired/wireless charging circuit, a battery, etc. The interface unit 1400*b* may support a connection between the handheld device 1000 and another external device. The interface unit 1400*b* may include various ports (e.g., an audio input/output port and a video input/output port) for a connection with an external device. The input/output unit 1400*c* may receive or output image information/signal, audio information/signal, data and/or information by a user. The input/output unit 1400*c* may include a camera, a microphone, a user input unit, a display 1400*d*, a speaker and/or a haptic module.

For example, in the case of data communication, the input/output unit 1400*c* may obtain information/signal (e.g., a touch, text, a voice, an image, or video) input by a user. The obtained information/signal may be stored in the memory unit 1300. The communication unit 1100 may convert, into a radio signal, information/signal stored in the memory, and may directly transmit the converted radio signal to another wireless device or may transmit the converted radio signal to a base station. Furthermore, after receiving a radio signal from another wireless device or the base station, the communication unit 1100 may restore the received radio signal to the original information/signal. The restored information/signal may be stored in the memory unit 1300 and output in various forms (e.g., text, a voice, an image, video, and haptic) through the input/output unit 1400*c*.

In the aforementioned embodiments, the components and characteristics of the present disclosure have been combined in a specific form. Each of the components or characteristics may be considered to be optional unless otherwise described explicitly. Each of the components or characteristics may be implemented in a form to be not combined with other components or characteristics. Furthermore, some of the components or the characteristics may be combined to form an embodiment of the present disclosure. The sequence of the operations described in the embodiments of the present disclosure may be changed. Some of the components or characteristics of an embodiment may be included in another embodiment or may be replaced with corresponding components or characteristics of another embodiment. It is evident that an embodiment may be constructed by combining claims not having an explicit citation relation in the claims or may be included as a new claim by amendments after filing an application.

The embodiment according to the present disclosure may be implemented by various means, for example, hardware, firmware, software or a combination of them. In the case of an implementation by hardware, the embodiment of the present disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

INDUSTRIAL APPLICABILITY

In the wireless communication system of the present disclosure, the scheme for transmitting and receiving downlink data (e.g., PDSCHs) has been described based on an example in which the scheme is applied to a 3GPP LTE/LTE-A system and a 5G system (new RAT system), but may be applied to various wireless communication systems in addition to the 3GPP LTE/LTE-A system and the 5G system (new RAT system).

The invention claimed is:

1. A method of receiving, by a user equipment (UE), downlink data in a wireless communication system, the method comprising:
receiving, in a first time unit and a second time unit, downlink control information scheduling the downlink data;
receiving mapping information between a layer group and a transmission configuration indication (TCI) state;
receiving, in the first time unit, downlink data related to a first layer group based on a first TCI state;
receiving, in the first time unit, downlink data related to a second layer group based on a second TCI state; and
receiving, in the second time unit, downlink data related to a third layer group based on a third TCI state.

2. The method of claim 1,
wherein the TCI state includes information for a quasi co-location (QCL) reference signal and information for a QCL type.

3. The method of claim 2,
wherein a demodulation reference signal antenna port of downlink data related to each layer group is assumed to have a QCL relation with an antenna port of a QCL reference signal mapped to each layer group.

4. The method of claim 1,
wherein layers included in each layer group are determined according to a predefined rule based on a transmission rank.

5. The method of claim 1,
wherein layers included in each layer group are determined by a configuration of a base station based on a transmission rank.

6. The method of claim 1, further including receiving, in the second time unit, downlink data related to a fourth layer group based on a fourth TCI state,
wherein the third layer group is identical with the first layer group, and
wherein the fourth layer group is identical with the second layer group.

7. The method of claim 6,
wherein the third TCI state is identical with the first TCI state, and
wherein the fourth TCI state is identical with the second TCI state.

8. The method of claim 1,
wherein each of the first time unit and the second time unit includes at least one of one or more slots and/or one or more symbols.

9. The method of claim 1,
wherein the downlink data is received from a different transmission point, panel, or beam for each time unit.

10. The method of claim 1, further comprising receiving information for a plurality of TCI states.

11. A user equipment (UE) receiving downlink data in a wireless communication system, comprising:
a transceiver for transmitting and receiving radio signals, and
a processor functionally coupled to the transceiver,
wherein the processor is configured to control to:
receive, in a first time unit and a second time unit, downlink control information scheduling the downlink data,
receive mapping information between a layer group and a transmission configuration indication (TCI) state,
receive, in the first time unit, downlink data related to a first layer group based on a first TCI state,
receive, in the first time unit, downlink data related to a second layer group based on a second TCI state, and
receive, in the second time unit, downlink data related to a third layer group based on a third TCI state.

12. A base station transmitting downlink data in a wireless communication system, comprising:
a transceiver for transmitting and receiving radio signals, and
a processor functionally coupled to the transceiver,
wherein the processor is configured to control to:
transmit, to a user equipment (UE), downlink control information scheduling the downlink data in a first time unit and a second time unit,
transmit, to the UE, mapping information between a layer group and a transmission configuration indication (TCI) state,
transmit, to the UE, downlink data related to a first layer group in the first time unit based on a first TCI state,
transmit, to the UE, downlink data related to a second layer group in the first time unit based on a second TCI state, and
transmit, to the UE, downlink data related to a third layer group in the second time unit based on a third TCI state.

13. The base station of claim 12,
wherein the TCI state includes information for a quasi co-location (QCL) reference signal and information for a QCL type.

14. The base station of claim 13,
wherein a demodulation reference signal antenna port of downlink data related to each layer group is assumed to have a QCL relation with an antenna port of a QCL reference signal mapped to each layer group.

15. The base station of claim 12,
wherein each of the first time unit and the second time unit includes at least one of one or more slots and/or one or more symbols.

16. The base station of claim 12,
wherein the downlink data is received from a different transmission point, panel, or beam for each time unit.

17. The base station of claim 12,
wherein the processor is configured to control to transmit information for a plurality of TCI states to the UE.

* * * * *